(12) United States Patent
Davis et al.

(10) Patent No.: US 10,262,356 B2
(45) Date of Patent: Apr. 16, 2019

(54) METHODS AND ARRANGEMENTS INCLUDING DATA MIGRATION AMONG COMPUTING PLATFORMS, E.G. THROUGH USE OF STEGANOGRAPHIC SCREEN ENCODING

(71) Applicant: Digimarc Corporation, Beaverton, OR (US)

(72) Inventors: Bruce L. Davis, Lake Oswego, OR (US); Geoffrey B. Rhoads, West Linn, OR (US); Eoin C. Sinclair, Portland, OR (US); Brian T. MacIntosh, Lake Oswego, OR (US)

(73) Assignee: Digimarc Corporation, Beaverton, OR (US)

( * ) Notice: Subject to any disclaimer, the term of this patent is extended or adjusted under 35 U.S.C. 154(b) by 93 days.

(21) Appl. No.: 15/427,632

(22) Filed: Feb. 8, 2017

(65) Prior Publication Data

US 2017/0221121 A1    Aug. 3, 2017

Related U.S. Application Data

(63) Continuation of application No. PCT/US2015/047486, filed on Aug. 28, 2015, which is a continuation of application No. 14/597,895, filed on Jan. 15, 2015, now Pat. No. 9,978,905.

(Continued)

(51) Int. Cl.
*G06Q 30/00* (2012.01)
*G06Q 30/06* (2012.01)
*G06F 17/30* (2006.01)

(52) U.S. Cl.
CPC ... *G06Q 30/0639* (2013.01); *G06F 17/30277* (2013.01); *G06Q 30/0627* (2013.01)

(58) Field of Classification Search
CPC .................................................. G06Q 30/06
(Continued)

(56) References Cited

U.S. PATENT DOCUMENTS 6,449,377 B1   9/2002   Rhoads
6,650,761 B1   11/2003  Rodriguez et al.
(Continued)

FOREIGN PATENT DOCUMENTS

WO    WO2016033495    3/2016

OTHER PUBLICATIONS

Howe, Jeannette: "Reverse Showrooming: Introducing CustomRetailer EXC!TE Award Winner Tailbase Website Solutions for Specialty Electronics Nationwide Members," CustomRetailer 11.12: 8.; 2012; ProQuest Dialog #1266507115, 4pgs. (Year: 2012).*

(Continued)

*Primary Examiner* — Robert M Pond
(74) *Attorney, Agent, or Firm* — Digimarc Corporation

(57) ABSTRACT

An illustrative implementation of the technology includes three primary components: a desktop application, a mobile phone application, and connections to retailer inventory and pricing APIs (e.g., for Walmart and/or Best Buy). The experience begins with the consumer going to an online retailer's website (e.g., Amazon) to search for a product. The desktop application automatically searches for the same product using the APIs of Walmart and/or Best Buy. If matches and near-matches of the product are found, the product name, model, price, and local availability at affiliate locations is shown. With a mobile phone camera-scan of the product page, relevant information is transferred to the consumer's phone. From there, the consumer can interact with the options on the mobile phone to be directed to the nearby brick and mortar store of choice carrying that product at the price they want. Along the way, the retailer can present (Continued)

offers and additional product information directly to the consumer. A great variety of other technologies and arrangements are also detailed.

12 Claims, 36 Drawing Sheets

Related U.S. Application Data

(60) Provisional application No. 62/101,722, filed on Jan. 9, 2015, provisional application No. 62/092,666, filed on Dec. 16, 2014, provisional application No. 62/089,739, filed on Dec. 9, 2014, provisional application No. 62/083,115, filed on Nov. 21, 2014, provisional application No. 62/079,428, filed on Nov. 13, 2014, provisional application No. 62/072,356, filed on Oct. 29, 2014, provisional application No. 62/066,531, filed on Oct. 21, 2014, provisional application No. 62/044,736, filed on Sep. 2, 2014, provisional application No. 62/044,206, filed on Aug. 30, 2014.

(58) Field of Classification Search
USPC ...................................................... 705/26, 27
See application file for complete search history.

(56) References Cited

U.S. PATENT DOCUMENTS

| | | | |
|---|---|---|---|
| 6,947,571 | B1 | 9/2005 | Rhoads et al. |
| 7,123,740 | B2 | 10/2006 | McKinley |
| 7,143,949 | B1 | 12/2006 | Hannigan |
| 8,787,707 | B1 | 7/2014 | Steves et al. |
| 9,129,327 | B1 * | 9/2015 | Cheung .............. G06Q 30/0631 |
| 2004/0044894 | A1 | 3/2004 | Lofgren et al. |
| 2007/0091376 | A1 | 4/2007 | Calhoon et al. |
| 2008/0300011 | A1 | 12/2008 | Rhoads et al. |
| 2011/0161076 | A1 | 6/2011 | Davis et al. |
| 2011/0212717 | A1 | 9/2011 | Rhoads et al. |
| 2011/0270697 | A1 | 11/2011 | Sunkada |
| 2012/0218444 | A1 | 8/2012 | Stach |
| 2012/0284012 | A1 | 11/2012 | Rodriguez et al. |
| 2012/0284593 | A1 | 11/2012 | Rodriguez |
| 2013/0250048 | A1 | 9/2013 | Aller |
| 2013/0262979 | A1 | 10/2013 | Gu et al. |
| 2013/0332317 | A1 | 12/2013 | Boncyk et al. |
| 2014/0188882 | A1 | 7/2014 | Wang et al. |
| 2014/0198240 | A1 | 7/2014 | Rhoads |
| 2014/0244494 | A1 | 8/2014 | Davis et al. |
| 2014/0304107 | A1 | 10/2014 | McAllister |
| 2014/0378810 | A1 | 12/2014 | Davis et al. |
| 2015/0235297 | A1 * | 8/2015 | Cheung .............. G06Q 30/0631 705/26.7 |

OTHER PUBLICATIONS

Sun, Wal-Mart's Savings Catcher Is a Step in the Wrong Direction, Motley Fool, Jun. 7, 2014.
Mazo, How to Use Motion Gestures on the Galaxy S3, Aug. 5, 2012.
International Search Report, and Written Opinion of the International Searching Authority, dated Apr. 21, 2016, in corresponding PCT application PCT/US2015/047486 (published as WO2016033495).

* cited by examiner

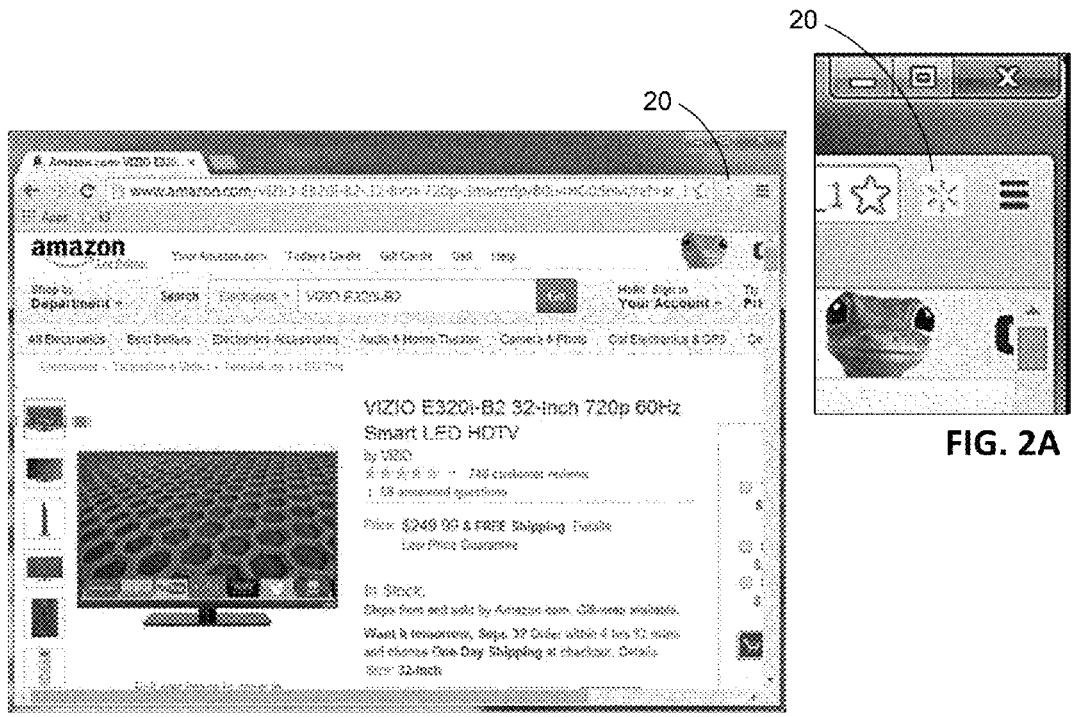
FIG. 2
FIG. 2A
FIG. 3

```
NSString *chromeScript =
@"if application \"Google Chrome\" is running then\n"
"  tell application \"Google Chrome\"\n"
"    get URL of active tab of first window\n"
"  end tell\n"
"end if";
NSAppleScript *script = [[NSAppleScript alloc] initWithSource:chromeScript];
NSDictionary *scriptExecuteError;
NSAppleEventDescriptor *result = [script executeAndReturnError:&scriptExecuteError];
if(scriptExecuteError) {
   NSLog(@"Error: %@", scriptExecuteError);
} else {
   NSLog(@"Output: %@", result.stringValue);
}
```

FIG. 3A

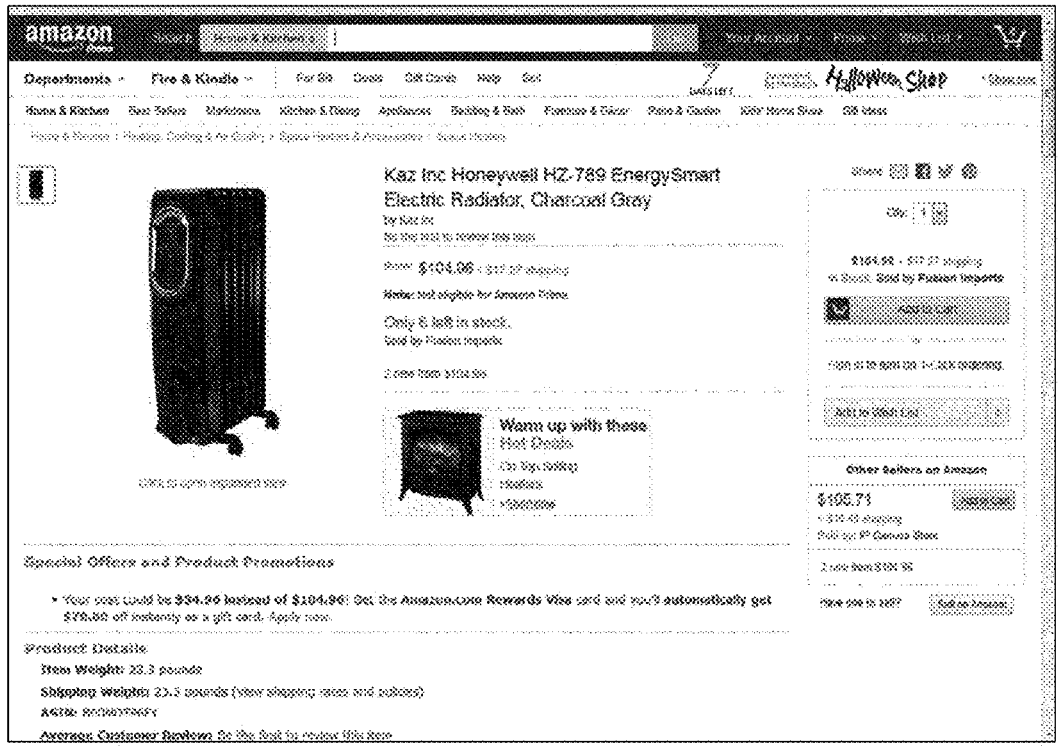
FIG. 5
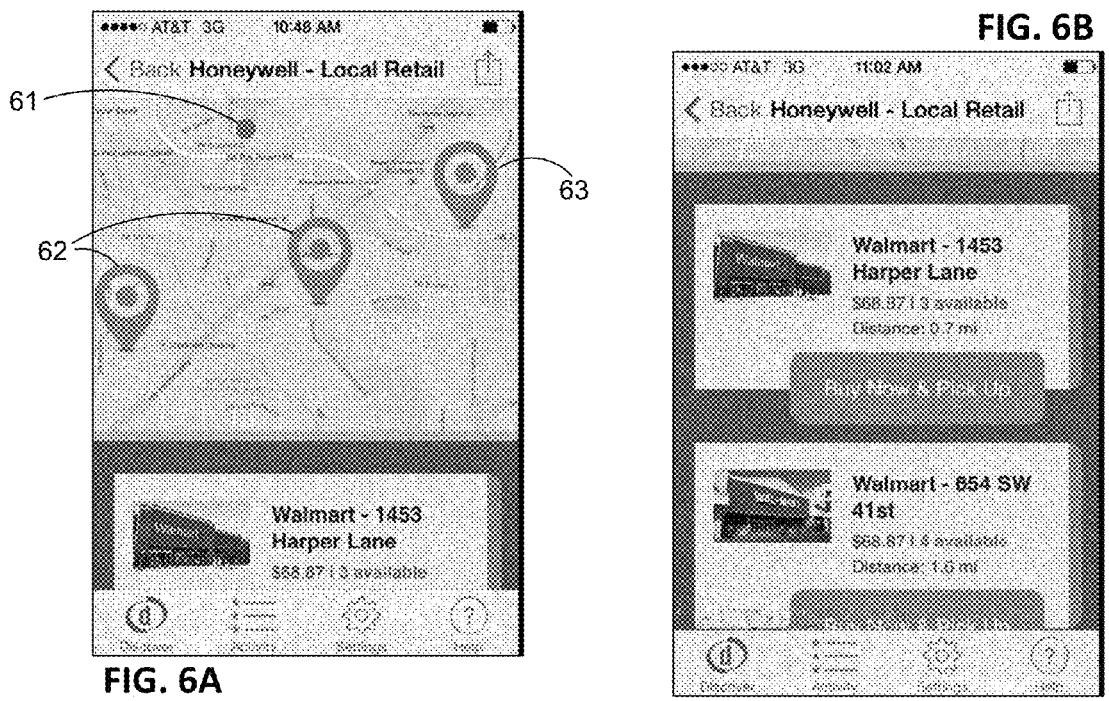
FIG. 6A
FIG. 6B

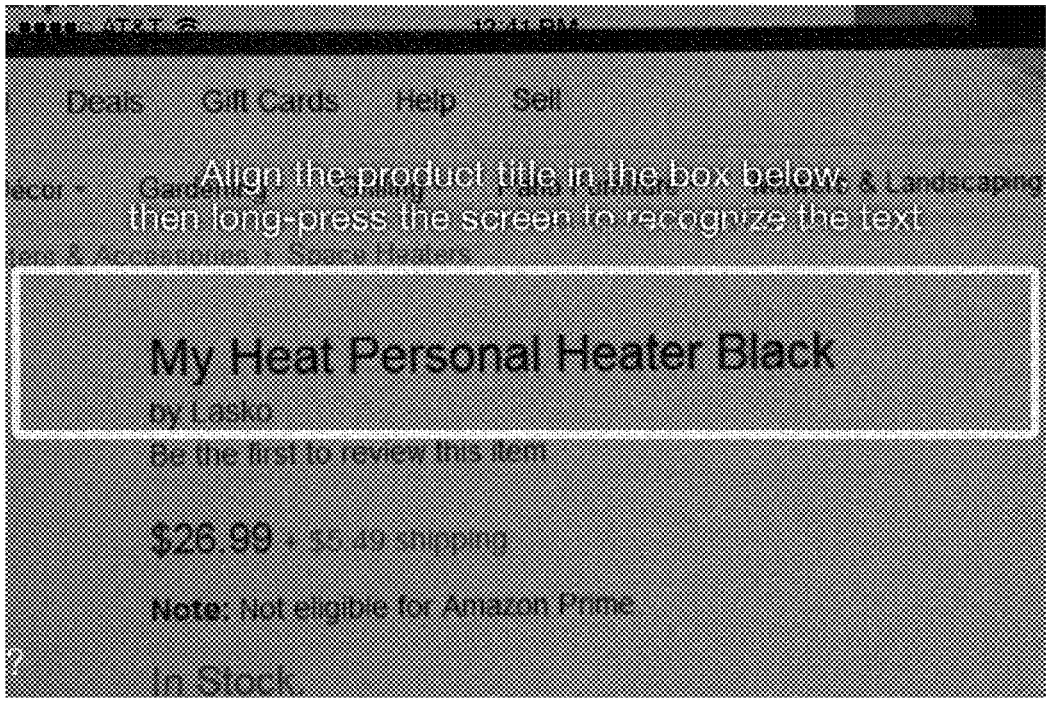
FIG. 8
FIG. 9
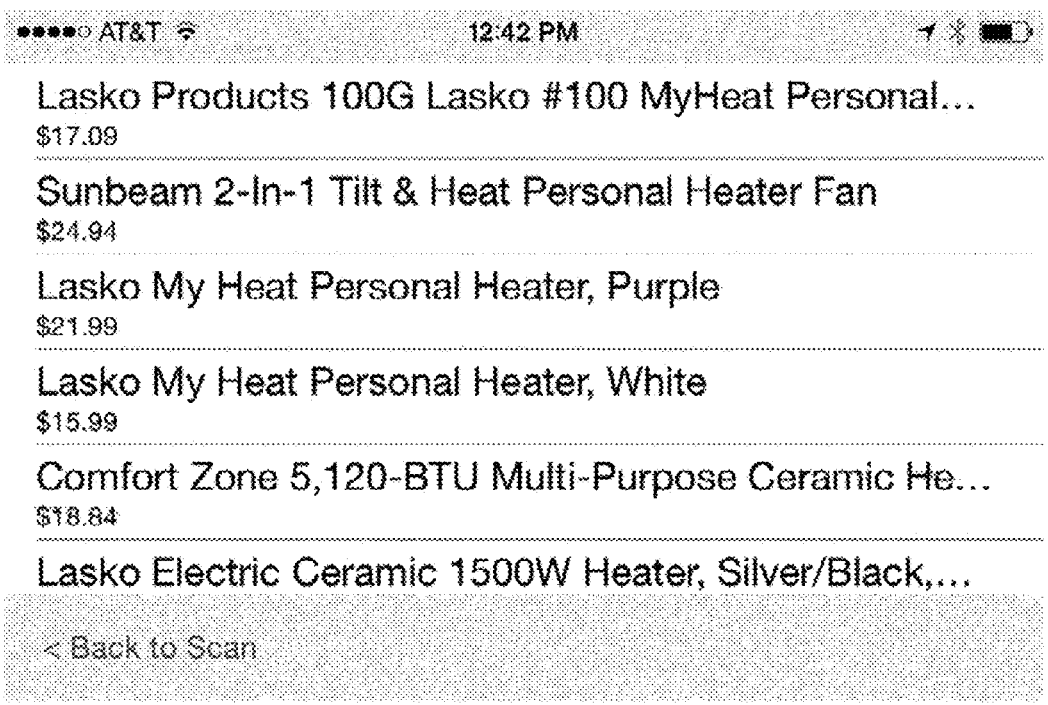

•••• ○ AT&T 📶　　　　12:42 PM　　　　✈ 🔋

Lasko Products 100G Lasko #100 MyHeat Personal Ceramic Heater

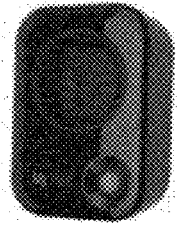

UPC: 046013764409　　Sale price: $17.09

Stay warm during the cold season with the Lasko Electric My Heat Personal Heater 100. It offers 200 watts of warmth, which is just enough to keep one or two people comfortable. The Lasko My Heat personal heater is designed with a three-step ceramic safety system and comes fully assembled. It is also both ETL listed and Energy Smart. This device will come in handy in an office, inside a tent on a camping trip, when you're in the car or in any other small space.

<< Back to Scan　　< Back to List　　View on Walmart.com

Lasko Products 100G Lasko #100 MyHeat Personal Ceramic Heater

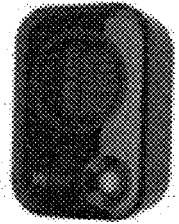

UPC: 046013764409　　Sale price: $17.09
in any other small space.

Lasko Products My Heat Personal Heater 100:

- My Heat personal ceramic heater is Energy Smart
- Portable heater offers 200 watts of warmth
- 3-step ceramic safety system
- Ships fully assembled
- ETL listed for safety << Back to Scan　　< Back to List　　View on Walmart.com

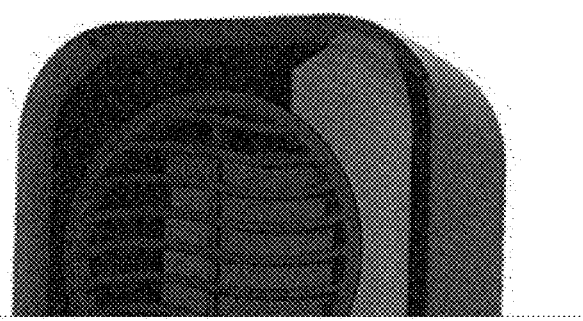
FIG. 12

```
#define kGyroMinBottomLimit      1.2f
#define kGyroMinTopLimit         0.9f
#define kSineWaveMaxTimeLength   0.8f
#define kGyroMinStart            0.5f
#define kGyroMinEnd              (kGyroMinStart/1.5f)
define kMotionUpdateInterval    0.01f enum DMDSinePortionName {
    DMDSinePortionNameFirst  = 1,
    DMDSinePortionNameSecond = 2,
    DMDSinePortionNameThird  = 3,
    DMDSinePortionNameNoSine = -1
};

-(void)initialize {
    self.motionManager.gyroUpdateInterval = kMotionUpdateInterval;
    [self resetTrackingToZero];
    [self updateMotionData];
}

-(void)updateMotionData {
    [self.motionManager startGyroUpdatesToQueue:self.motionQueue withHandler:^(CMGyroData *gyroData, NSError *error) {
        [self pushNewGyroData:gyroData.gyroData.rotationRate.x];
    }];
}
```

FIG. 16A

```
-(void)pushNewGyroData:(CGFloat)gx {
    if (gx <= -kGyroMinStart && !_tracking) {
        NSLog(@"Starting tracking");
        _tracking = YES;
        [self setCurrentSinePortion:DMDSinePortionNameFirst];
        _sineDataCount ++;
    }
    else if (_tracking && (_sineDataCount * kMotionUpdateInterval) > kSineWaveMaxTimeLength) {
        [self resetTrackingToZero];
    }
    else if (_tracking) {
        if (_currentSinePortion == DMDSinePortionNameFirst) {
            NSLog(@"Entered first section");
            if (_lastGX > gx) {
                _sineDataCount ++;
            }
            else if ((_lastGX <= gx) && (gx > -kGyroMinBottomLimit)) {
                [self resetTrackingToZero];
            }
            else if (_lastGX <= gx) {
                [self setCurrentSinePortion:DMDSinePortionNameSecond];
                _sineDataCount ++;
            }
        }
```

FIG. 16B

```
else if (_currentSinePortion == DMDSinePortionNameSecond) {
    NSLog(@"Entered second section");
    if (_lastGX < gx)
        _sineDataCount ++;
    else if ((_lastGX >= gx) && (gx < kGyroMinTopLimit))
        [self resetTrackingToZero];
    else if (_lastGX >= gx) {
        [self setCurrentSinePortion:DMDSinePortionNameThird];
        _sineDataCount ++;
    }
}
else if (_currentSinePortion == DMDSinePortionNameThird) {
    NSLog(@"Entered third section");
    if (_lastGX > gx)
        _sineDataCount ++;
    else if ((_lastGX <= gx) && (gx > kGyroMinEnd))
        [self resetTrackingToZero];
    if (gx <= kGyroMinEnd)
        [self reportTap];
}
_lastGX = gx;
}
-(void)reportTap {
    NSLog(@"Tap reported");
    // Report tap
    [self resetTrackingToZero];
}
-(void)resetTrackingToZero {
    NSLog(@"Tap reset");
    tracking = NO;
    [self setCurrentSinePortion:DMDSinePortionNameNoSine];
    _sineDataCount = 0;
    _lastGX = 0;
}
```

FIG. 16C

```
#import "DMMotionManager.h"

#define kGyroMinBottomLimit              1.2f
#define kGyroMinTopPercentageOfBottom    0.33f
#define kSineWaveMaxTimeLength           0.5f
#define kGyroMinStart                    0.5f
#define kGyroMinEndPercentageOfTop       0.66f
#define kMotionUpdateInterval            0.01f
define kMaxInaccurateTime               0.05f enum DMDSinePortionName {
    DMDSinePortionNameFirst    = 1,
    DMDSinePortionNameSecond   = 2,
    DMDSinePortionNameThird    = 3,
    DMDSinePortionNameNoSine   = -1
};

@interface DMMotionManager ()

@property (retain)   CMMotionManager      *motionManager;
@property (retain)   NSOperationQueue     *motionQueue;
@property            BOOL                 tracking;
@property            BOOL                 updating;
@property            NSInteger            currentSinePortion;
@property            CGFloat              lastGX;
@property            CGFloat              backgroundLastGX;
@property            BOOL                 candidateForSineStart;
@property            CGFloat              currentSineBottom;
@property            CGFloat              currentSineTop;
@property            NSUInteger           sineDataCount;
@property            NSUInteger           totalIgnoredValues;

@property (retain)   NSDate               *lastTapDate;

@end

@implementation DMMotionManager
```

FIG. 17A

```
-(id)init {
    self = [super init];
    if (self) {
        self.motionManager = [[CMMotionManager alloc] init];
        if (!self.motionManager.gyroAvailable)
            return nil;
        self.motionManager.gyroUpdateInterval = kMotionUpdateInterval;

[self resetTrackingToZero];

self.motionQueue = [[NSOperationQueue alloc] init];
        self.motionQueue.maxConcurrentOperationCount = 1;
    }
    return self;
}

-(void)startUpdating { if (!_updating) {

_updating = YES;

if (_motionManager) {
            [_motionManager startGyroUpdatesToQueue:_motionQueue
withHandler:^(CMGyroData *gyroData, NSError *error) { if (_backgroundLastGX > -kGyroMinStart &&
-kGyroMinStart >= gyroData.rotationRate.x)
                    _candidateForSineStart = YES;
                else
                    _candidateForSineStart = NO;

[self pushNewGyroData:gyroData.rotationRate.x];

_backgroundLastGX = gyroData.rotationRate.x;

```
-(void)pushNewGyroData:(CGFloat)gx {
    BOOL ignoreIncomingValue = NO;
    if (_candidateForSineStart) {
        NSLog(@"Starting tracking");

[self willChangeValueForKey:@"isTrackingTap"];
        _tracking = YES;
        [self didChangeValueForKey:@"isTrackingTap"];

[self setCurrentSinePortion:DMDSinePortionNameFirst];
        _sineDataCount ++;
    }
    else if (_tracking && (_sineDataCount * kMotionUpdateInterval) >
kSineWaveMaxTimeLength) {
        [self resetTrackingToZero];
    }
    else if (_tracking) {
        if (_currentSinePortion == DMDSinePortionNameFirst) {
            NSLog(@"Entered first section");
            if (_lastGX > gx)
                _sineDataCount ++;
            else if ( _lastGX <= gx && gx > -kGyroMinBottomLimit ) {
                if (_totalIgnoredValues < (kMaxInaccurateTime /
kMotionUpdateInterval))
                    ignoreIncomingValue = YES;
                else
                    [self resetTrackingToZero];
            }
            else if (_lastGX <= gx) {
                [self setCurrentSinePortion:DMDSinePortionNameSecond];
                _sineDataCount ++;
                _currentSineBottom = _lastGX;
                _currentSineTop = (fabsf(_currentSineBottom) *
kGyroMinTopPercentageOfBottom);
            }
        }
    }
```

FIG. 17C

```
        else if (_currentSinePortion == DMDSinePortionNameSecond) {
            NSLog(@"Entered second section");
            if (_lastGX < gx)
                _sineDataCount ++;
            else if ( _lastGX >= gx && gx < _currentSineTop ) {
                if (_totalIgnoredValues < (kMaxInaccurateTime / kMotionUpdateInterval))
                    ignoreIncomingValue = YES;
                else
                    [self resetTrackingToZero];
            }
            else if (_lastGX >= gx) {
                [self setCurrentSinePortion:DMDSinePortionNameThird];
                _sineDataCount ++;
            }
        }
        else if (_currentSinePortion == DMDSinePortionNameThird) {
            NSLog(@"Entered third section");
            if (_lastGX > gx)
                _sineDataCount ++;
            else if ( _lastGX <= gx && gx > (_currentSineTop * kGyroMinEndPercentageOfTop) ) {
                if (_totalIgnoredValues < (kMaxInaccurateTime / kMotionUpdateInterval))
                    ignoreIncomingValue = YES;
                else
                    [self resetTrackingToZero];
            }
            if ( gx <= (_currentSineTop * kGyroMinEndPercentageOfTop) )
                [self reportTap];
        }
    }
    if (ignoreIncomingValue)
        _totalIgnoredValues ++;
    else
        _lastGX = gx;
}
```

FIG. 17D

```objc
-(void)reportTap {
    NSLog(@"Tap reported");
    [self willChangeValueForKey:@"lastTap"];
    _lastTapDate = [NSDate date];
    [self didChangeValueForKey:@"lastTap"];

[self resetTrackingToZero];
}

-(void)resetTrackingToZero {
    NSLog(@"Tap reset");
    [self willChangeValueForKey:@"isTrackingTap"];
    _tracking = NO;
    [self didChangeValueForKey:@"isTrackingTap"];
    [self setCurrentSinePortion:DMDSinePortionNameNoSine];
    _sineDataCount = 0;
    _lastGX = 0;
    _currentSineBottom = 0;
    _currentSineTop = 0;
    _totalIgnoredValues = 0;
}

-(NSDate *)getLastTap {
    return _lastTapDate;
}

-(BOOL)isTrackingTap {
    return _tracking;
}

-(void)stopUpdating {
    if (_updating) {
        if (_motionManager) {
            [_motionManager stopGyroUpdates];
        }
        [_motionQueue cancelAllOperations];
        _updating = NO;
    }
}

-(void)dealloc {
    [self stopUpdating];
}

@end
```

FIG. 17E

RED ///  GREEN ▦  BLUE ＼＼＼

| VERDANA FONT OCR DICTIONARIES ||||
| FONT HEIGHT (PIXELS) | DISPLAY=PLASMA1 | DISPLAY=LCD1 | DISPLAY=LCD2 | DISPLAY=CRT1 |
|---|---|---|---|---|
| 5 | VP15 | VL15 | VL25 | VC15 |
| 5.25 | VP1525 | VL1525 | VL2525 | VC1525 |
| 5.5 | VP155 | VL155 | VL255 | VC155 |
| 5.75 | VP1575 | VL1575 | VL2575 | VC1575 |
| 6 | VP16 | VL16 | VL26 | VC16 |
| 6.25 | VP1625 | VL1625 | VL2625 | VC1625 |
| 6.5 | VP165 | VL165 | VL265 | VC165 |
| 6.75 | VP1675 | VL1675 | VL2675 | VC1675 |
| 7 | VP17 | VL17 | VL27 | VC17 |
| 7.33 | VP1733 | VL1733 | VL2733 | VC1733 |
| 7.67 | VP1767 | VL1767 | VL2767 | VC1767 |
| 8 | VP18 | VL18 | VL28 | VC18 |
| 8.33 | VP1833 | VL1833 | VL2833 | VC1833 |
| 8.67 | VP1867 | VL1867 | VL2867 | VC1867 |
| 9 | VP19 | VL19 | VL29 | VC19 |
| 9.33 | VP1933 | VL1933 | VL2933 | VC1933 |
| 9.67 | VP1967 | VL1967 | VL2967 | VC1967 |
| 10 | VP110 | VL110 | VL210 | VC110 |
| 10.5 | VP105 | VL1105 | VL2105 | VC1105 |
| 11 | VP111 | VL111 | VL211 | VC111 |
| ... | ... | ... | ... | ... |
| 18 | VP118 | VL118 | VL218 | VC118 |
| 19 | VP119 | VL119 | VL219 | VC119 |
| 20 | VP120 | VL120 | VL220 | VC120 |

FIG. 25

| ARIAL FONT OCR DICTIONARIES ||||
| FONT HEIGHT (PIXELS) | DISPLAY=PLASMA1 | DISPLAY=LCD1 | DISPLAY=LCD2 | DISPLAY=CRT1 |
|---|---|---|---|---|
| 5 | AP15 | AL15 | AL25 | AC15 |
| 5.25 | AP1525 | AL1525 | AL2525 | AC1525 |
| 5.5 | AP155 | AL155 | AL255 | AC155 |
| ... | ... | ... | ... | ... |

FIG. 26

```
NSRect viewRect = [[NSScreen mainScreen] frame];
_overlayWindow = [[NSWindow alloc] init];
[_overlayWindow setFrame:viewRect display:YES];
[_overlayWindow setContentView:[[DSCEmbeddedOverlayView alloc] initWithFrame:
    viewRect opacity:1.0]];
[_overlayWindow setDelegate:self];
[_overlayWindow setStyleMask:NSBorderlessWindowMask];
[_overlayWindow setMovableByWindowBackground:NO];
[_overlayWindow setMovable:NO];
[_overlayWindow makeKeyAndOrderFront:self];
[_overlayWindow setOpaque:NO];
[_overlayWindow setAlphaValue:0.1];
[_overlayWindow setIgnoresMouseEvents:YES];
[_overlayWindow setLevel:NSFloatingWindowLevel];
```

FIG. 28

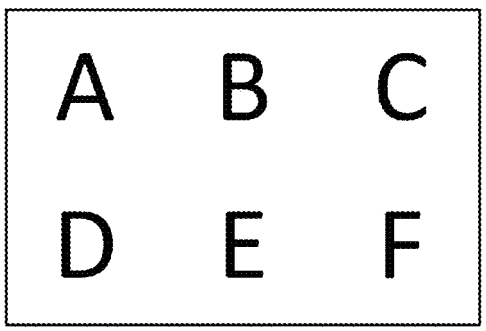

FIG. 29A

FIG. 29B

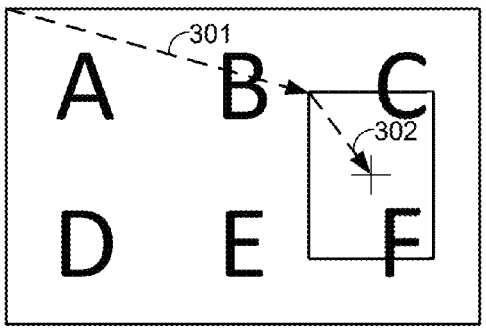

FIG. 31

METHODS AND ARRANGEMENTS INCLUDING DATA MIGRATION AMONG COMPUTING PLATFORMS, E.G. THROUGH USE OF STEGANOGRAPHIC SCREEN ENCODING

RELATED APPLICATION DATA

This application is a continuation of PCT application PCT/US2015/047486, filed Aug. 28, 2015 (published as WO2016/033495), which is a continuation of application Ser. No. 14/597,895, filed Jan. 15, 2015 (published as 20160063611), which claims priority to provisional applications 62/044,206, filed Aug. 30, 2014; 62/044,736, filed Sep. 2, 2014; 62/066,531, filed Oct. 21, 2014; 62/072,356, filed Oct. 29, 2014; 62/079,428, filed Nov. 13, 2014; 62/083,115, filed Nov. 21, 2014; 62/089,739, filed Dec. 9, 2014; 62/092,666, filed Dec. 16, 2014; and 62/101,722, filed Jan. 9, 2015. The disclosures of these previous applications are expressly incorporated herein by reference, as if fully set forth herein.

INTRODUCTION

Conventional bricks and mortar retailers have difficulty competing against online retailers. The latter don't incur the costs of display space and customer service staff borne by the former. A further challenge has emerged with "showrooming"—a practice in which shoppers visit stores of conventional retailers to examine samples of physical products, but then make their purchases online.

Amazon and other online retailers provide smartphones and software that abet diversion of conventional retailers' investments in people and places, to the online retailers' advantages. With such a phone, a shopper takes a picture of a product (or product barcode) in a conventional retailer's store, and the phone links to a web page enabling the purchase to be completed from the online retailer.

Although online retailers can market to customers in physical stores—competing to make a sale, bricks and mortar retailers have not had the means to market to customers in the online stores of competitors.

One enduring advantage of conventional retailers is their network of local stores. 90% of the American population is said to live within a 15 minute drive of a Walmart store. Other stores are similarly ubiquitous. If a customer wants a particular product this afternoon, Walmart, BestBuy, Costco, Target, Kohl's, J.C. Penney, Dick's Sporting Goods, Macy's, and countless other local retailers offer the possibility of near-immediate customer satisfaction.

In accordance with one embodiment of the present technology, the practice of "showrooming" is turned to the local retailers' favor, in what applicant terms its "Digital Showrooming" service. A shopper visits the web site of an online retailer, to investigate a potential purchase. After taking advantage of the rich assortment of online information offered on the online merchant's web site (e.g., including numerous user reviews), and after settling on a particular product to purchase, the shopper employs the present technology to quickly check local availability options.

The user's experience can be as simple as viewing the product web page with a smartphone. The present technology processes various features and data to discern the identity of the product, and uses information provided by participating retailers to discern local availability, prices, and other information. A moment after viewing the web page imagery, the smartphone presents the results, including maps identifying nearby locations where the product is available, and associated price information. With such information in-hand, the shopper can then drive to a store to pick up the item. (In some embodiments, the smartphone reports the user's driving progress to the store, enabling the local merchant to have the item prepared for hassle-free pickup at a drive-through location when the shopper arrives.) By such arrangement, the shopper gets the best of both worlds—the ease of using a big screen to navigate the wealth of online information in researching a product purchase, and the convenience of a small screen to guide the shopper's journey to a prompt satisfaction at a local merchant—with a seamless transition between these two phases.

Moreover, the consumer can make an informed choice as to whether to purchase the product online and wait for delivery (and risk it being stolen from the door), or patronize a local store, do first hand final diligence—possibly including demonstration and explanation by store personnel—and get the product immediately.

A great variety of other features and embodiments are also detailed; the foregoing is just a sampling.

BRIEF DESCRIPTION OF THE DRAWINGS

FIG. 2 shows an Amazon product page in a browser window that also includes a toolbar button to check local prices.

FIG. 2A is an enlargement of the button shown in FIG. 2.

FIG. 3 shows how the browser opened a second page, presenting price and availability information about the product shown in the FIG. 2 Amazon web page, but at Walmart.

FIG. 3A details exemplary software instructions for obtaining the URL of the active tab of a Chrome browser window.

FIG. 5 shows an Amazon product page for a Honeywell heater.

FIGS. 6A and 6B show illustrative responses of the Digimarc Discover smartphone app to the FIG. 5 web page, identifying local vendors carrying the Honeywell heater.

FIGS. 7-12 illustrate another embodiment employing aspects of the present technology.

FIGS. 16A, 16B and 16C show computer instructions used to detect a twitch movement, in one embodiment.

FIGS. 17A-17E show computer instructions used to detect a twitch movement, in another embodiment.

FIGS. 25 and 26 show exemplary data structures that identify particular OCR dictionaries to be used, given certain types of display screens, and certain physical sizes of displayed text.

FIG. 28 details exemplary computer instructions for overlaying a low-opacity window across a screen display, to steganographically-encode information displayed on the screen with a digital watermark.

FIG. 29A shows exemplary imagery presented on a computer display screen.

FIG. 29B shows a smartphone-captured image of part of the FIG. 29A screen display, after affine dewarping.

FIG. 31 shows how the FIG. 29B image can be mapped to the FIG. 29A image, to effect pointing to a particular location on a computer display screen.

DETAILED DESCRIPTION

The present disclosure encompasses a variety of methods, which can be implemented in a variety of ways, depending on the needs of particular situations. For example, a shopper may use a mobile device (e.g., a smartphone or tablet) to research a potential purchase at a website of an online merchant, or the shopper may prefer using a larger screen device (e.g., a desktop or laptop computer) for such online investigation. Or the shopper may begin by imaging a sample of a product, or a depiction of the product (e.g., in a printed advertising circular). Moreover, some shoppers may prefer to have information about local store offers presented on a big screen device; others may prefer to have results presented on a mobile device.

For clarity's sake, this disclosure will refer to Amazon as a representative online vendor, and Walmart as a representative bricks and mortar vendor.

Consider a hypothetical shopper "Ryan," who is looking to purchase a 39 inch LED TV. Ryan uses his laptop to visit to the Amazon web site, and types "39 inch LED TV" into the search box. Up pops the first several of 1,668 results. Overwhelmed, Ryan uses the "Sort by" capability of the web site to display the "New and Popular" results first. (Curiously, he sees Amazon has taken liberty with his search instructions: the first result is a 42 inch TV, and the third result is a 32 inch TV. He presumes Amazon has crunched the numbers and learned that so-doing enhances Amazon's revenue.)

Ryan pokes around, looking at the "star" ratings assigned by Amazon, and focusing on those TVs that offer many hundreds of reviews. After browsing the reviews, he likes the look of a Samsung 39 inch model, which has a 4.5 star rating, and 257 reviews. Among the 169 "answered questions," Ryan is glad to see that this model features a tilt stand that allows it to be tilted down—since he plans to mount it on a shelf that is above eye level.

Ryan is disappointed, however, to see that no price is given on the Amazon product page. In another apparent revenue-enhancement measure, Amazon says "To see our price, add this item to your cart. You can always remove it later." He chafes at such marketing gimmicks, but goes ahead and adds the TV to his cart—hoping not to somehow accidentally complete the order. Finally—there's the price: $391.69. Not bad, but free shipping takes 3-5 business days. To get it in two days will add a shipping and handling fee of $106.97. Ouch. He removes the TV from his cart.

Ryan has a significant advantage over other online shoppers. He has downloaded and installed applicant's Digital Showrooming technology on his computer. He notices, on his display, that Walmart has the same TV at its store 1.4 miles away. The price is $396.14. That's more than a hundred dollars cheaper than the two day delivery offered by Amazon, and he'll have it unpacked and installed in time for the football game tonight. Off to the car!

Figure 1:
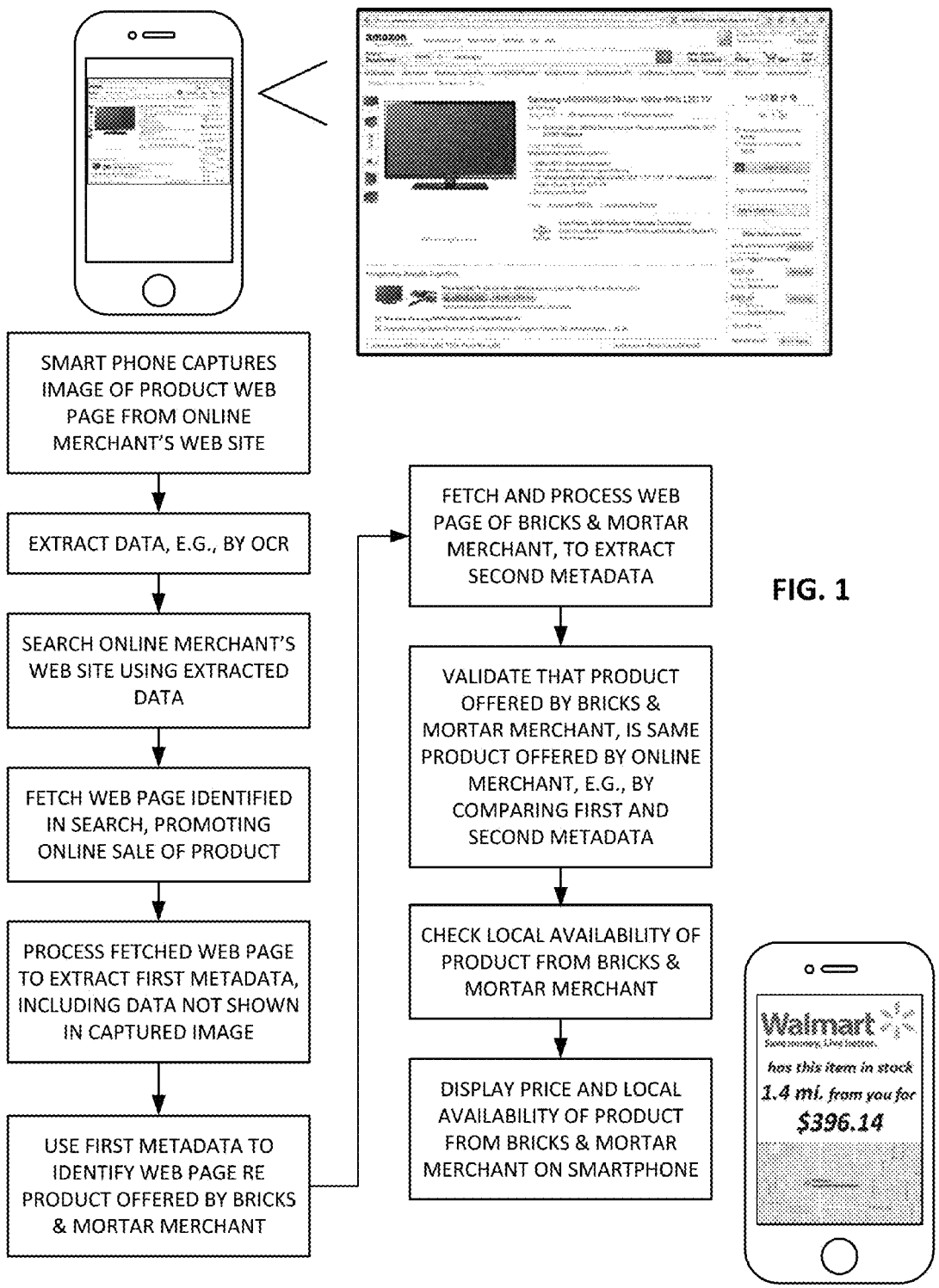
FIG. 1 shows an illustrative embodiment employing certain aspects of the present technology.

In another embodiment, instead of pressing a button on the laptop screen, Ryan simply images the laptop screen with his smartphone camera. An associated app figures out what he's looking at, and again determines local price and availability. Again, the good news appears: that TV is available locally, at a good price (FIG. 1). His smartphone application notifies the retailer of his interest and provides driving directions to the store. The retailer notifies Ryan that there is a special price on Tivos today for buyers of Samsung TVs. Bricks and mortar wins.

How does it work? To start, the product that Ryan is viewing must be identified. This can be done in various ways, including image recognition, parsing HTML, and/or performing OCR—such as on imagery captured by a camera, or on pixel information scraped (copied) from a frame buffer.

The Amazon product web page is rendered by Ryan's laptop from HTML instructions. If security considerations permit, software can access and parse this HTML source data to obtain the product identification. For example, the bolded title ("Samsung UN39FH5000 39-Inch 1080p 60 Hz LED TV") in the web page, is specified in the HTML source between this tag:
    <span id="productTitle" class="a-size-large">
and this tag:
    </span>

Thus, the HTML source can be searched, or parsed, to identify the Amazon productTitle string.

In some operating systems, security measures may limit access to the underlying HTML. In such case, the laptop's frame buffer (from which the screen is driven) can be copied, yielding an array of pixel data. This frame of image data, or a sub-part, can be OCR-analyzed to extract the productTitle string. (The Amazon page is laid out accordingly to a standardized template, with a familiar style, that allows the product title to be readily located. For example, the product title appears beneath the Amazon page banner (which includes the navigation bar), in a larger font than other text. It appears in Verdana font of a standard size. It is black. It appears above a series of stars (indicating consumer rankings). It appears above a manufacturer or distributor name, which appears in blue. Etc., etc. Using such landmarks and attributes, the product title can reliably be identified in the OCR data.)

The same OCR approach can be used with imagery captured by a shopper's mobile device camera, depicting the Amazon web page.

While the product title is useful, it often is not sufficient to uniquely identify a desired product. For example, some products come in different colors, and the color may not be specified in the displayed product title. Accordingly, it is desirable to obtain product metadata in addition to the product title for identification purposes.

If the HTML is available, it can be parsed to look for additional product-identifying information. This can include searching the text for terms such as "color," "dimensions," "width," "weight," etc. Such information is typically provided by the manufacturer, so Amazon and Walmart, for example, will both report the same data.

Another useful item of metadata is the Amazon Standard Item Number. This identifier appears in the Amazon product page under the "Additional Information" heading (as "ASIN"). For the noted Samsung TV, the ASIN is B00CALLZK6. While unique to Amazon, third parties offer online databases that correlate many ASIN numbers with more familiar GTIN and UPC product identifiers. (One such database is at the web address upcbarcodes<dot>com/dashboard/asin-gtin-converter/.) Alternatively, Amazon pages for the most popular products can be crawled to independently compile data that cross-references Amazon ASINs to GTINs, manufacturers' model numbers, and other identifying data.

Another third party service that is useful in determining UPC product identifiers from product title information is Symantics3<dot>com.

The obtained metadata is then used to determine if Walmart offers the same product. This can be done via a public interface, such as the public Walmart web site, or by some private form of data access. In one embodiment, the product title for the desired TV (i.e., "Samsung UN39FH5000 39-Inch 1080p 60 Hz LED TV") is entered by the present system into the search box of the Walmart public web site, and the site is instructed to begin a search.

Perversely, providing many search terms in a search dialog box often yields worse search results than providing fewer terms, because some web sites "OR" the descriptors together. So in some embodiments, the product title string is first processed to eliminate common descriptors. In a particular embodiment, such lexical processing identifies the longest "word" in the product title, and checks whether such "word" is in a dictionary. (The dictionary can comprise an English language dictionary, supplemented by terms and abbreviations common to product listings, e.g., 1080p, 60 Hz, etc.) If the longest "word" is not found in such dictionary, it is taken to be a manufacturer's product identifier, and is entered—alone—in the Walmart search box. In the present example, "UN39FH5000" would be entered. (If such "word" is found in the dictionary, the next-longest "word" is checked, etc. If all words are found in the dictionary, the entire product title can be used.)

If an apparent product match is found in the Walmart search, the page is loaded and examined to confirm that it is actually the same product that Ryan was examining on the Amazon web page, e.g., by confirming correspondence between metadata on the Amazon and Walmart product web pages (e.g., weight, color, etc.). Correspondence between the Amazon ASIN identifier, and a corresponding identifier used by Walmart, can also be checked.

A further check is gross correspondence of cost. The Walmart price can be compared to the Amazon price, and if they differ by more than a threshold amount (e.g., 50%, 100%, or more of the lower price), then something is amiss. (This can occur when one of the pages offers a grouping of products—such as a carton of 12 items, whereas the other page offers the item singly.)

While the searching and matching have been described as based on text, marketing imagery depicting the product on the web site can also be used, both to identify the product, and as a further element of metadata to cross-check between the web pages—to help confirm that the product offered by Walmart is the same as the one earlier reviewed on the Amazon page. (Such imagery is typically provided by the manufacturer as stock imagery, so is often common across different web sites.) For example, a color histogram of the product image on the Amazon page can be computed, and compared with a similar histogram computed from the product image on the Walmart web page. Alternatively or additionally, image fingerprinting can be used to identify distinctive features in the two images, which can be compared to confirm they correspond.

In a particular embodiment, a score is computed to indicate confidence that the product offered by Walmart is the same as the product offered by Amazon. The data just reviewed, and others, can be factors. Some factors can be weighted more heavily than others. This confidence score (which may range, e.g., from 1-100) can be tested against a threshold (e.g., 90), and if the score exceeds the threshold, the process continues.

Once the Walmart-offered product has been confirmed to match the Amazon-offered product with the requisite degree of confidence, a check is conducted to determine if product is available locally. Again, this can be performed using the public Walmart website, or via a private channel, e.g., to a Walmart inventory database.

Product pages on the Walmart web site have a "Store Availability" button that can be clicked to determine, by zip code, the closest Walmart store(s) carrying a product. As with other web page interactions, the present system can script such a button press, and enter Ryan's zip code. (Ryan's location can be determined in various ways, such as by his ISP's location, by GPS, by profile information Ryan entered, etc.) The Walmart web site responds with a new screen of information identifying the nearest stores stocking the item, and providing a map link for each. The present system harvests this information.

A display of the gathered information is then presented to Ryan, e.g., identifying the price and local availability of the Samsung TV. (Meanwhile, once the technology has identified that Ryan is interested in a particular Samsung TV, participating retailers may obtain access to such information—enabling them to employ personalized marketing techniques, where appropriate, to encourage further local shopping.)

FIG. 1 illustrates a variant of the foregoing method, in which Ryan's smartphone captures imagery of the Amazon product web page, and he is presented a responsive screen detailing price and local availability from Walmart.

FIGS. 2, 2A and 3 illustrate another embodiment, in which Ryan is searching for a Vizio model E320i-B2 TV on a computer (which may be a desktop or laptop computer, or a portable device—such as a tablet or phone). In this embodiment, a plug-in for the Chrome web browser presents a button 20 near the top of the browser window, which Ryan selects to activate comparison shopping at one or more nearby Walmart stores. In response, the system opens a new web page 30 (FIG. 3) in the browser, presenting price and availability of the same Vizio product from Walmart.

Between sensing activation of button 20, and opening the new web page 30, software in Ryan's computer parses the HTML source of the displayed Amazon page, and uses it as described above to identify a corresponding page on the Walmart web site, harvest information, and format same for presentation to Ryan as the new web page 30.

Rather than undertake these operations itself, software on Ryan's computer may simply transmit the URL of the Amazon web page being viewed to a remote computer. (FIG. 3A shows illustrative computer instructions for obtaining the URL of the active tab of a browser window—in this example a Chrome browser window, on a computer running the Apple OS X operating system.) The remote computer that receives this URL (the remote computer may be Ryan's smartphone) loads the indicated Amazon web page, and performs the above-detailed processing to determine price and local availability at Walmart. The results of such processing can be returned for display on Ryan's desktop computer, or on his mobile phone. In some cases, the returned information is a URL to a web page (either at the Walmart site, or otherwise) that contains the local price/availability information.

Figure 4:
FIG. 4 shows how the browser can alternatively overly a graphic on the FIG. 2 Amazon web page, detailing local price and availability of the product at Walmart.

FIG. 4 shows still another arrangement. Again, Ryan selects the button 20 at the top of the browser window. However, instead of spawning a new window, the software instead presents Walmart price and local availability information in a display box or window 40 that overlays the Amazon web page. (The variants discussed in connection with FIGS. 2, 2A and 3, can naturally be used.)

In yet another arrangement, Ryan clicks the button 20 at the top of the Amazon web page, and the resulting comparison shopping information is sent to Ryan's mobile device, e.g., as a text message including the local availability and price at Walmart (or including a URL/link that—when selected—loads a web page in the mobile browser, or launches an app, that presents such information).

(The depicted tool bar button is optimized for use with the Amazon web site, e.g., relying on known Amazon HTML tags to identify the product title. However, the underlying JavaScript code is arranged to work with web sites other than Amazon, if the user simply highlights the product name or identifier.)

In embodiments in which the Amazon web page information is obtained by image capture (e.g., by a camera, or by copying the frame buffer), only a fraction of the Amazon page is available. As is familiar, such web pages typically do not fit vertically in a single screen; scrolling is required to reveal their entire contents. Since some of the metadata useful in confirming a product match between the Amazon and Walmart web pages may not be in the part of the page presented on the screen, further actions may be taken.

For example, from OCR'd metadata such as product title information (or ASIN, or the web page URL text from the address bar at the top of the browser), a device (e.g., the laptop, a smartphone, or a remote "cloud" processor) can conduct a search in the Amazon web site, to load a version of the same Amazon web page that Ryan is viewing. (The page may be different in some respects. For example, if a cloud processor is used, the page it is served may lack certain customization added by Amazon to Ryan's page on account of Ryan's geographic location, as inferred from his IP address. Similarly, unless the page is loaded in association with cookie data from Ryan's laptop, the page will lack certain product recommendations that might be based on Ryan's previous purchasing and/or browsing history.) From this second version of the Amazon web page, the device can parse the page's HTML, as described above. Or, if OCR is used, the device can be scripted to successively "Page-Down" through the page, so different parts of it are in the frame buffer, and each part can be separately OCR'd—again allowing harvesting of metadata that is not within the initially-displayed part of the page. (This second version of the web page typically is not physically displayed; the data can be obtained from HTML or frame data in memory, without rendering to a display screen.)

In some embodiments, the product being viewed on Ryan's laptop is identified (e.g., using any of the techniques detailed above, by product title and/or other harvested metadata). The URL of a corresponding product page on the Walmart web site is identified, e.g., by a processor that checks product correspondence, and harvests the price and availability information. This information is stored in a remote database record, in association with an identifier. Meanwhile, a browser plug-in on Ryan's laptop applies a digital watermark signal across some or all of the displayed Amazon web page, steganographically encoding the database record identifier as a hidden payload in the web page pixels. Ryan captures imagery of the laptop-displayed web page with his mobile device (e.g., running the applicant's Digimarc Discover app), and watermark decoding software on the smartphone extracts the payload data. The phone then queries the cloud database for the price and availability information corresponding to that database record identifier, and presents such information to Ryan on the mobile device screen.

Figure 4A:
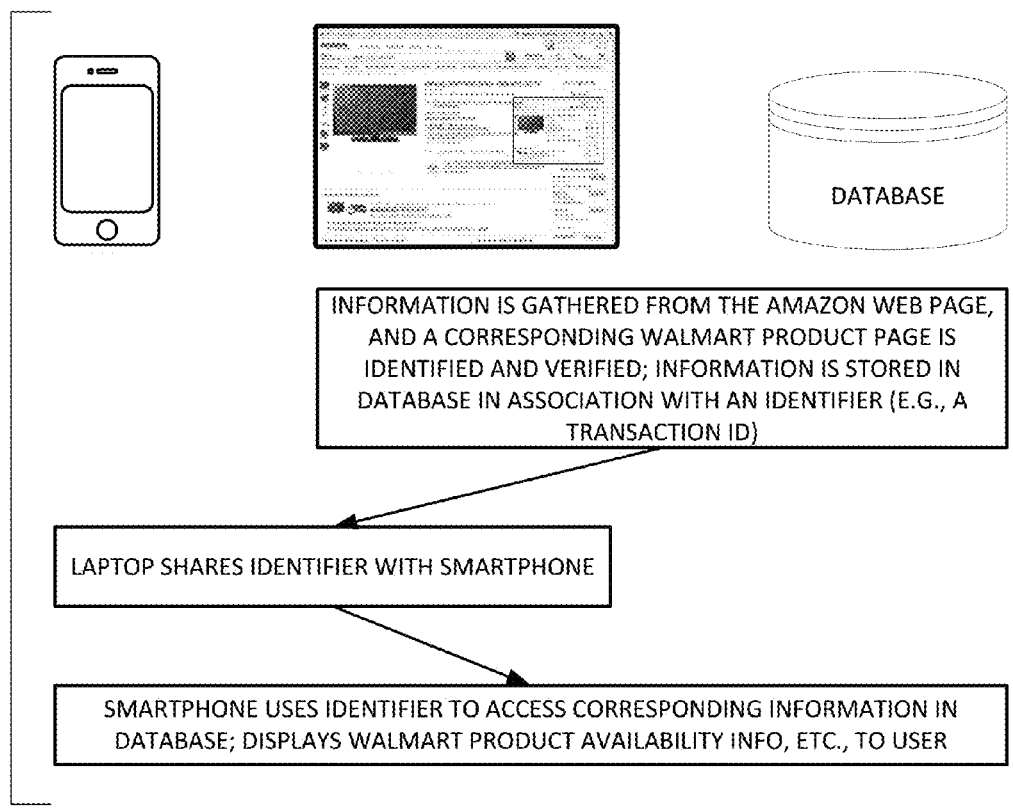
FIG. 4A shows another embodiment.

FIG. 4A depicts such an embodiment.

Instead of using digital image watermarking, the database record identifier can be conveyed from the laptop/desktop to the mobile device by audio, such as by a frequency shift keyed ultrasonic audio signal, or by a human-imperceptible noise signal that is spread-spectrum modulated with the identifier (i.e., by audio watermarking). In still other embodiments, the identifier can be conveyed by a wireless radio technology, such as WiFi or Bluetooth. Or the Bonjour (zeroconf) service discovery protocol can be used. Light transmission can also be employed (e.g., infrared). If desired, a visible barcode, visible watermark, or QR code can be presented on the screen for reading by the mobile device. Still further, vendor-specific technologies can be employed for sharing information between devices, such as Apple's iCloud and iDrop services, Google Drive technology. So, too, can other networked sharing services, including Reddit, Digg, Pinterest, Evernote, etc.

In some embodiments, the identifier is established by the laptop computer, and is provided to the database. In some such cases, a hardware identifier can be used, such as a MAC address, or an NFC/RFID identifier, or other laptop device identifier. A user identifier can be employed similarly. In other embodiments, the identifier is established by a remote server (or by the database), and is then provided to the laptop, for relaying on to the smartphone.

(The just-noted techniques for communicating between the desktop/laptop and the mobile device can be used to communicate information other than a database record identifier. For example, the computer (or the browser, or other software) can be configured to communicate a URL of a webpage-being-viewed, or product-identifying data (e.g., title, ASIN), etc. The mobile device can be configured to sense and act on such a signal in response to user instruction, such as a tap or gesture.)

FIGS. 5, 6A and 6B show another form of implementation. FIG. 5 shows an Amazon web page for a Honeywell heater product. The product isn't sold by Amazon, per se, but rather by its partner, Kaz. The price on Amazon is $104.96 (plus $17.27 for shipping).

FIG. 6A shows a smartphone app (the Digimarc Discover product) after it has imaged the FIG. 5 web page. Without further user action, the app gives results showing local availability. In particular, the top part of the results page shows a local map, with the user's location indicated by a blue dot 61. Also presented on the map are pins 62 and 63 indicating locations of stores carrying the Honeywell heater. Pins 62 are presented in green, and indicate that the heater is presently in-stock at those locations. Pin 63 is presented in red, indicating that the heater is available with a short wait (e.g., hours or days).

Below the map is more information, with addresses for the indicated stores, and the price for the Honeywell product at each. In the depicted example, this further information extends beyond a single visible screen. Additional information is revealed by a swiping (scrolling) gesture on the touch screen, e.g., showing the further information shown in FIG. 6B. (Still further information is further down the depicted FIG. 6B display, revealed by further scrolling.)

Figure 7:
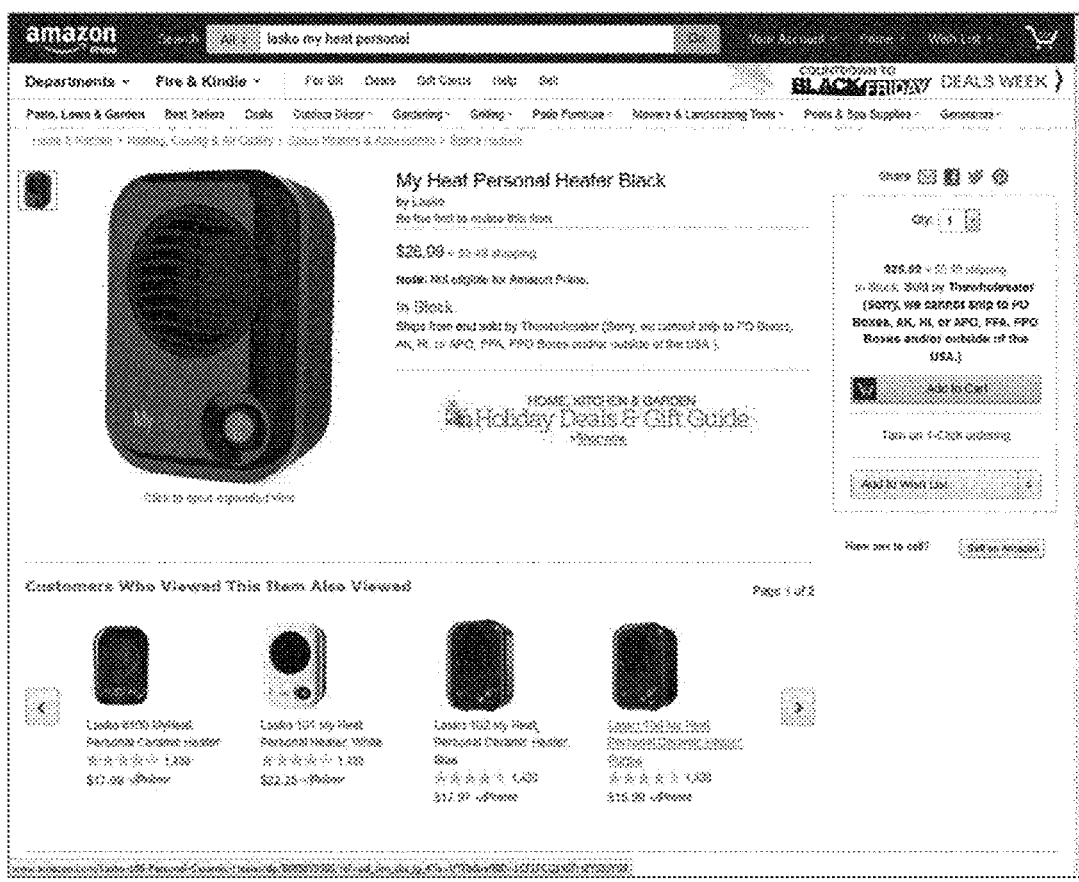

FIGS. 7-12 illustrate another illustrative implementation. FIG. 7 shows the Amazon web page for a Lasko "My Heat" personal heater. FIG. 8 shows the user interface (UI) of a smartphone comparison shopping app employing aspects of the present technology. The app's UI presents a bounding box which the user employs to frame the product title (or the Amazon ASIN identifier). Text instructions indicate the user should "long-press" the screen once the desired information is within the bounding box. (A "long-press" is any screen touch exceeding 0.7 seconds.)

In response to such actions, the system performs OCR recognition on one or more captured bounding box image excerpts (e.g., from the frames captured after the user's finger has touched the screen beyond 0.7 seconds). The OCR'd text is applied to a Walmart API, to identify products with the same or similar titles. (If an ASIN identifier is imaged instead, the OCR'd string is first mapped to a corresponding GTIN or UPC code, and such code is applied to the Walmart API.)

The results of such search of Walmart are presented to the user by the app display of FIG. 9. The top-listed item is typically the desired item.

Note that, here again, the price of the product from Walmart ($17.09) is less than that offered by Amazon ($26.99).

When the user taps the first entry of the displayed FIG. 9 listing, the app presents a new page, illustrated by FIGS. 10 and 11. This page is not from the Walmart web site, per se. Rather, it is composed by the smartphone app, using information returned from Walmart servers in response to another call to the Walmart API. Part of the page is scrollable (the smaller font text), while the title, UPC, price, and photo are static in the displayed frame. FIG. 11 shows text than can be scrolled into view following display of the FIG. 10 text.)

At the bottom of the FIGS. 10 and 11 display is a link "View on Walmart.com." Tapping this link causes the smartphone's browser to load the corresponding Walmart web page, as shown in FIG. 12. (Again, the page is scrollable.) Lower parts of the screen detail local availability of the product (or mail ordering options).

Justap

In accordance with a further aspect of the present technology, a distinctive "Justap" gesture cues a mobile phone to initiate a discovery action.

An illustrative gesture has two parts. The first part is a so-called "sweep" motion, during which a user moves the phone from an initial position, to an end position in which its camera is oriented towards a subject of interest (e.g., pointing to a product page on the Amazon web site, or to the product itself). The second part is a so-called "twitch" (or "tap") motion, in which the top of the phone typically nods briefly towards, and back away, from the subject. (In some embodiments, the "twitch" motion alone comprises the gesture.)

Figure 13:
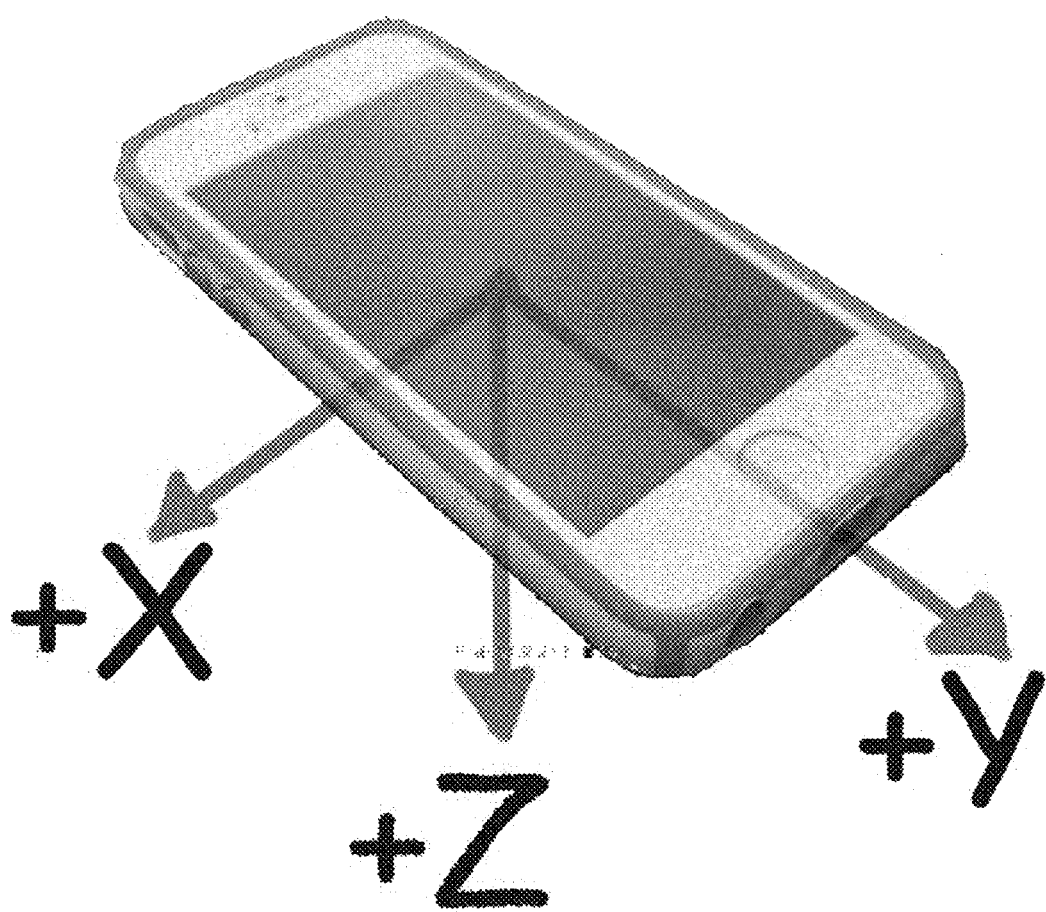
FIG. 13 illustrates a geometrical frame of reference.

The sweep motion usually includes translational movement of the phone in x-, y- and z-directions, often with a rise in elevation ("z") between the starting and ending positions, as the phone screen is raised into position for viewing by the user. Commonly the translational movements will exceed 4, 8 or 12 inches in two or more of these three dimensions. The sweep motion also typically includes rotation around the x-, y- and z-axes, often exceeding 10, 25 or 60 degrees in two or more of these three rotational directions. (FIG. 13 illustrates the geometrical frame of reference. By convention, the positive "z" direction is downward, since that is the direction of gravity. The "bottom" edge of the depicted phone is nearest the viewpoint; the "front" face of the phone is facing upwards.)

The sweep usually begins with the phone substantially at rest, e.g., lying horizontally on a surface, or in a user's purse or pocket. The end position of the sweep is commonly with the bottom of the phone approximately horizontal, as the user holds the phone for viewing of the front touchscreen display. ("Approximately" is used to mean within 15 degrees.) The ending x-y plane of the phone may be at any orientation, although near-vertical, or near-horizontal are most common. The duration of the sweep movement is usually less than two seconds, and is often less than one second. The sweep movement starts and stops with the phone being substantially stationary. ("Substantially stationary" is used to mean movement of less than a quarter-inch in a 100 millisecond interval.) Although the word "sweep" commonly connotes a smooth, curvilinear motion, no such requirement is intended here; a sweep can follow a tortuous path, e.g., as a user digs the phone out of a pocket and moves it to a desired end position.

The second part of the gesture, the "twitch" motion, is a flick of the top of the phone towards the subject, and usually at least partway back again. In the geometry of FIG. 13, it is primarily a negative rotation around the "x" axis, with the top of the phone initially moving in a positive z direction. The magnitude of the twitch movement can be small, e.g., with the top of the phone moving less than 2 inches—more commonly less than 1 inch (or less than a half inch). But the movement should be large enough to evidence an intentional "tap" movement, e.g., at least a quarter-inch. A familiar analogy is a subtle tap of a salt shaker to emit a slight sprinkle of salt. The duration of the twitch movement is generally less than a second, and is commonly less than a half-second.

The just-described gesture indicates, to the phone, that the user is interested in discovering information about a subject towards which the twitch motion is directed. Once the gesture has been detected, the phone launches the necessary follow-on operations (e.g., image processing, etc.).

Such an arrangement is particularly advantageous because it is thrifty with power. In alternative visual search or discovery arrangements, the phone may incessantly try to make sense of dozens of frames per second output by the phone camera. For example, the phone may perform FFTs and other high power operations to try and recognize an object or symbology depicted in each frame of the captured imagery—analyzing each frame in turn until it gets results. In the described arrangement, the camera needn't even be activated (e.g., woken from an unpowered or sleep state) until the first or second part of the gesture has been completed. So, too, with activation of the phone's display screen.

The described operations can be sensed by the 3D accelerometers, 3D gyroscopes, and other motion sensors with which the phone is typically equipped, in conjunction with a low power processor (e.g., the Qualcomm Hexagon DSP chip) that governs their operation and interprets their output data. In the exemplary embodiment, only if such a low power processor discerns the component motions of the described gesture does it invoke the higher-powered tasks (e.g., waking an application processor, such as the Qualcomm Snapdragon chip, performing the necessary image processing, and activating the phone's wireless transceiver) that may be required to complete the desired discovery operation. The present arrangement can use between ten and a hundred times less power in these preliminary sensing steps leading to a successful image-based discovery operation.

The detailed arrangement is also advantageous because it signals the user's intent in a manner that is not prone to false-positive interpretation. The "envelope" of actions that signals the user's desire to engage in visual discovery can be well-parameterized (e.g., using various sensor data available from the phone), so that such discovery action is triggered in error (i.e., false positive) less than one percent (or a tenth, or a hundredth of one percent) of the time that the user manipulates the phone. Yet the "Justap" manipulation is much more fluid to the user than alternative unambiguous signals that have previously been used—such as touching a button displayed on the touchscreen of the phone.

The foregoing will be made clearer by consideration of a particular example, which considers an exemplary detection of the "twitch" movement in more detail.

As is familiar, smart phones typically include 3-axis accelerometers and gyroscopes. The accelerometers output data indicating acceleration along the three axes. For a smartphone at rest, with the touchscreen facing up, the acceleration values are {0,0,−1}. The gyroscopes output data indicating the rate of rotation around the x-, y- and z-axis, in radians per second. (It will be recognized that the accelerometer values are bounded between −1 and 1. The gyroscope values are essentially unbounded.) In Apple smartphones, these parameters are accessed through the Core Motion framework.

Figure 14:
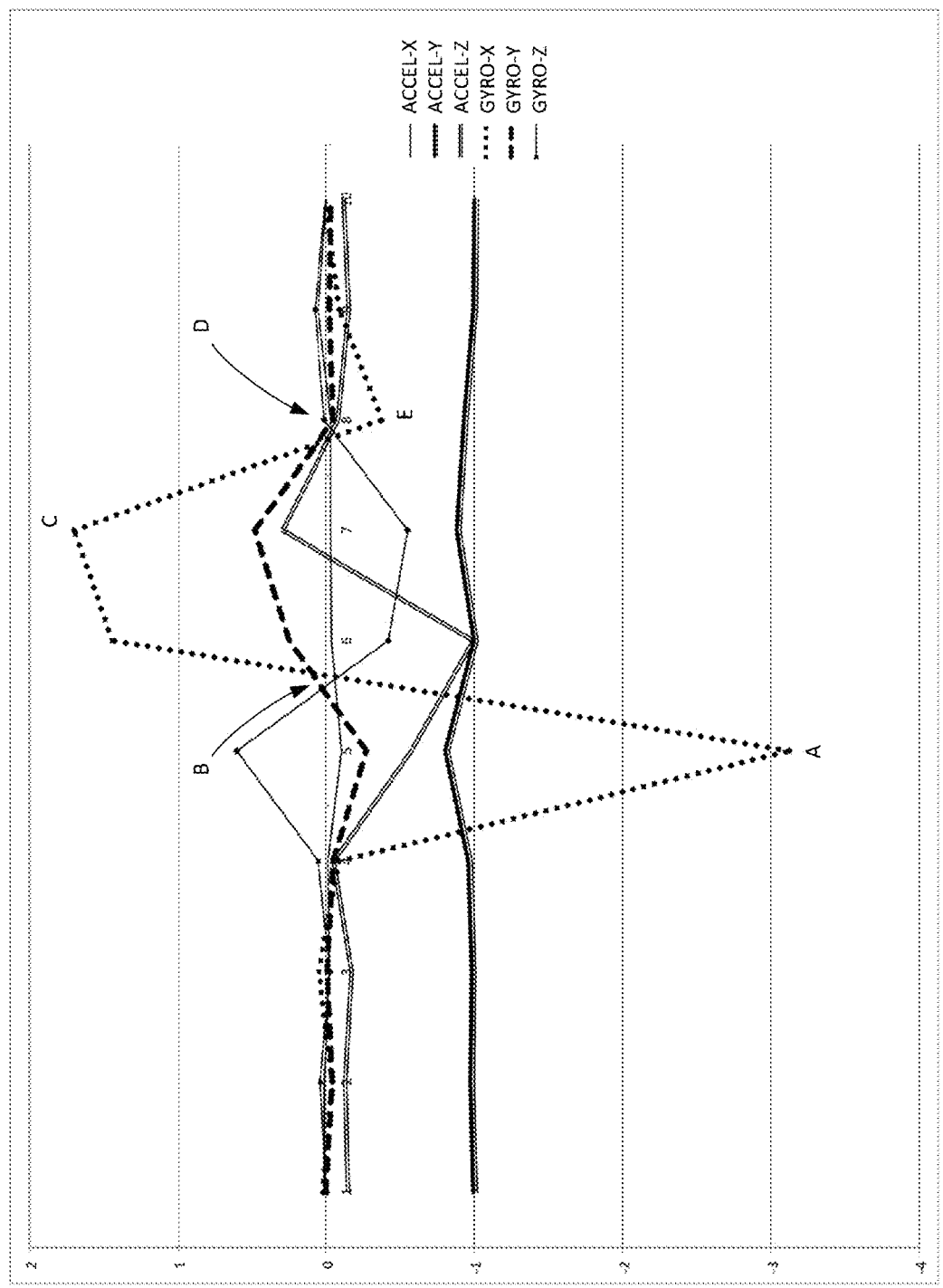
FIG. 14 details smartphone sensor data corresponding to a twitch movement.

FIG. 14 is a plot of these six parameters, sampled at 10 points during a single twitch movement (i.e., at about every tenth of a second).

All of the values start near zero, except the y-accelerometer data. (It is at −1, because the phone—in this example—is being held with the x-y plane vertical, and with the bottom edge of the phone closest to the ground.)

During the twitch movement, the data that changes most dramatically is the x-gyroscope data (shown in the dotted line). This makes sense, as the twitch movement is a somewhat sudden (i.e., high rate of change) movement around the phone's x-axis. This data first trends sharply negative (indicating a fast movement of the top of the phone, rotating away from the user). At time point "A" this rate of rotary change is at its maximum, and then begins slowing. At time point "B" the rate of change crosses the zero axis. This is the point of maximum deflection of the twitch, at which point the user has succeeded in arresting rotation of the top edge of the phone in an away direction, and begins a counter-movement—with the top edge of the phone thereafter moving back towards the user. Its rotary rate of change again increases from zero to a maximum value (this time a positive value) at time point "C," before slowing again to zero at time point "D." Point D is typically back at (or near) the starting position, with the phone stationary in a generally vertical orientation. (In the FIG. 14 example, when the user applied a slowing force to the phone as it was returning to the starting position, there was a subtle over-compensation, so that the phone didn't cleanly stop, but instead rotated forward a slight bit—as shown at time point "E.")

The asymmetry of the x-accelerometer data in FIG. 14 (i.e., a larger excursion in the negative direction than in the positive direction) is not unusual. In performing a twitch movement, users commonly perform the first part of the movement (i.e., rotating the top of the phone away from the user) with more vigor than the second part of the movement (i.e., returning the top of the phone back towards its original position).

Figure 15:
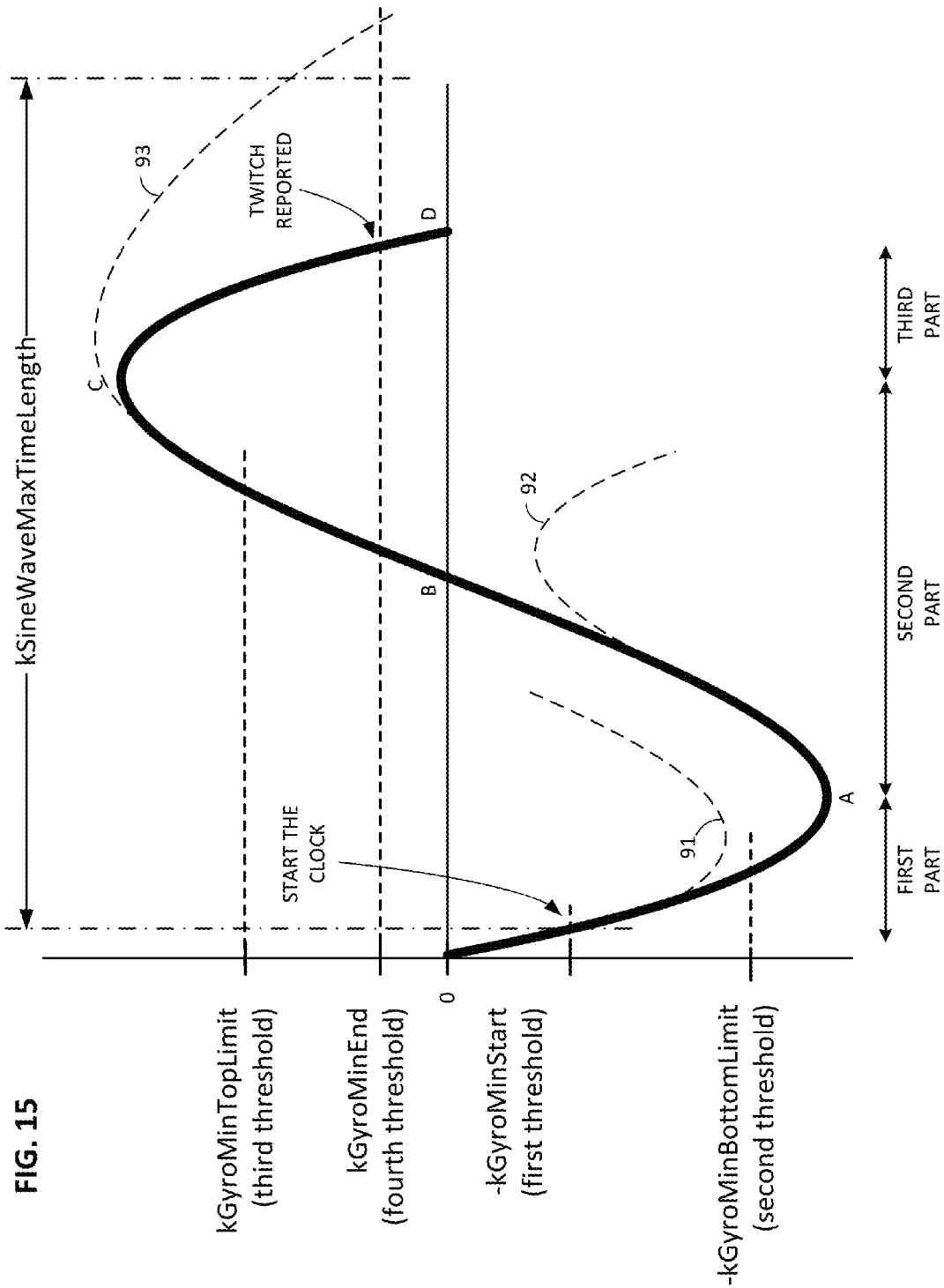
FIG. 15 shows an idealized x-gyroscope signal during a twitch movement, and certain parameters by which such movement can be characterized.

FIG. 15 shows an idealized x-gyroscope signal during a twitch movement, and certain parameters by which such movement can be detected.

Like the actual data of FIG. 14, this idealized x-gyroscope signal has the general shape of an inverted sine wave, beginning with a negative excursion, and transitioning to a positive excursion, before returning to zero. Also as in FIG. 14, the first part of the movement is more vigorous than the second part.

Four variables are shown along the axis on the left edge. These establish threshold values against which the x-gyroscope data are tested, to determine progress through different aspects of the expected waveform.

During an initial phase of testing, the x-gyroscope data ("gx" for short) is examined to detect whether it drops to a value less than -kGyroMinStart. (Software that implements this functionality, discussed below, defines this value as a positive number; it is negated for use as a threshold.)

Crossing this first threshold begins a tracking phase of operation. Once the tracking phase has started, all of the below-detailed tests must be successively met within a specified time interval, for a valid twitch to be detected. This specified time interval is termed kSineWaveMaxTimeLength, and is depicted at the top of FIG. 15. A clock value is computed at each sample value, and is checked to ensure that its value is less than the kSineWaveMaxTimeLength interval.

The tracking phase of operation also involves testing the data samples to ensure their values are trending in prescribed directions. In a first part of the twitch, the trend is downward. At each successive sampling point, the gx data is checked to confirm that its value is more negative than at the immediately-preceding sampling point. If any such test fails, the process is reset to its initial condition, again looking for a drop in gx below -kGyroMinStart.

If gx continues to drop, it may eventually reach a value below that of a second threshold value, -kGyroMinBottomLimit. Crossing this threshold is a further requirement of the twitch test.

At some point, the rate of rotary change begins to slow. That is, the value of gx at one sampling point is less negative than its value at an immediately preceding sampling point.

This is indicated by "A" in FIG. 15 (which corresponds to "A" in FIG. 14.) While such a reversal in trend of the gx value would otherwise have reset the test (as shown by the alternate curve 91 in FIG. 15), such slowing of angular rotation rate is expected once the data falls below the -kGyroMinBottomLimit value threshold value.

This slowing in angular rate marks the end of the first part of the twitch, and the beginning of a second part.

In this second part, the data is tested for rising gx values. That is, each new gx value is tested to ensure its value is more positive than that of its predecessor. This requirement is enforced until the value of gx rises above a third threshold, kGyroMinTopLimit.

If the value of gx does not continue to rise until this third threshold is met (e.g., if it starts to drop, as exemplified by alternative curve 92 in FIG. 15), the process is again reset.

(It may be noted that, in this example implementation, the second and third thresholds (kGyroMinBottomLimit and kGyroMinTopLimit) are not symmetrical (i.e., equal). This reflects the difference in vigor discussed above. That is, the initial movement—rotating the top of the phone away from the user—is typically a sharper (higher angular speed) movement than the reciprocal return movement.)

The point "C," at which the gx data has an inflection point (e.g., a gx value is less than its predecessor) marks the end of the second part of the twitch, and the beginning of a third part. During this third part, each gx datum is once again checked to confirm that its value is lower than the value of its predecessor. If this condition is violated, the test is reset. Such testing continues until a gx value drops below a fourth threshold, kGyroMinEnd.

When a gx value drops below this fourth threshold, a proper twitch is deemed to have been completed. Responsive action is then taken (e.g., capturing imagery, or processing earlier-captured imagery, etc.).

As referenced earlier, all of the foregoing testing must be concluded within a specified interval, kSineWaveMaxTimeLength, which starts when gx first drops below -kGyroMinStart. If this specified interval concludes before gx descends below the fourth threshold (e.g., as is the case with alternate curve 93), the process is reset, and again waits for a gx sample with a value below the first threshold (-kGyroMinStart).

It should be recognized that the foregoing is just one particular example. Others will doubtless employ variants, e.g., to make the testing more or less rigorous (e.g., relaxing the requirement of uniform negative, positive, and negative monoticity in successive gx values, in the first, second, and third parts, respectively). Some implementations may characterize a twitch by detecting just the rotary movement-away from the user, alone; or just the rotary movement-towards the user, alone. In some embodiments, the first and last thresholds can be essentially equal (but opposite in sign)—rather than asymmetrical, as depicted. So, too, with the second and third thresholds.

Moreover, some users may prefer to hold the phone in a horizontal orientation. In such case, detection of a twitch gesture would involve analysis of the y-gyroscope signal, rather than the x-gyroscope signal.

(Although gyroscope signals are used in this example, it will be recognized that signals from other sensors can alternately be employed to detect the gesture.)

FIGS. 16A, 16B, and 16C detail a particular software implementation of the above-discussed twitch-testing. FIG. 16A includes the code that initializes the different variables and sets up the testing process. The code contemplates that gx values are reported at a recurring interval named kMotionUpdateInterval, which is set to 0.01 seconds. The values of the first, second and third thresholds are −0.5, −1.2, and 0.9 radians/second. The fourth threshold is scaled to be equal to two-thirds of the first (but of opposite sign), i.e., 0.33.

FIG. 16B details code that immediately follows the FIG. 16A code. It starts by examining each gx sample to see if its value is below the first threshold, kGyroMinStart. If so, tracking is started. Tracking includes assigning a serial number (_sineDataCount) to each successive gx sample. The time elapsed since tracking started is also computed, i.e., the product of this serial number and the update interval. If the elapsed time is greater than the predetermined maximum time interval (kSineWaveMaxTimeLength), the process is reset.

This code also checks that each gx value is more negative than its predecessor (_lastGX). Such checking occurs until a gx value is more positive than its predecessor. This either signals the end of the first part of the twitch, or is an event that resets the process, depending on whether the gx value is more negative than the second threshold value (-kGyroMinBottomLimit).

FIG. 16C details code that immediately follows the FIG. 16B code. It details the second and third parts of the twitch testing. The second part checks each gx sample to ensure its value is greater than its predecessor. If not, a check is made whether the gx sample value exceeds the third threshold, kGyroMinTopLimit. If so, the third part of testing is begun; else, the process is reset.

In the third part of testing, each gx sample is checked to ensure its value is less than its predecessor. A failure of this test causes the process to reset, unless the value of gx is below the fourth threshold, kGyroMinEnd. In the latter case, the process concludes that a proper twitch (termed a "tap" in the code) has been completed.

As will be understood, each new gx sample is processed through code beginning at the bottom of FIG. 16A, and concluding with FIG. 16C—skipping the first, second or third parts that don't apply. FIG. 16C concludes by assigning the value of gx to _lastGX. The last lines of FIG. 16C detail actions that occur when one of the detailed tests fails, and the process resets.

Particular threshold values can be empirically determined, through use. For example, in one such arrangement, the user is invited to make a series of twitch gestures to train the phone. The phone responds by setting the value of -kGyroMinBottomLimit to be 95% (or 85%) of the smallest x-gyroscope value sensed during the first part of any of the training gestures, and by setting the value of kGyroMinTopLimit to be 95% (or 85%) of the smallest x-gyroscope value sensed during the second part of any of the training gestures. This way, each of the training twitches would be recognized if repeated later.

(The GyroMinStart threshold is less critical, since any x-gyroscope value that crosses the -kGyroMinBottomLimit threshold will first cross any -kGyroMinStart value (assuming it is more positive than -kGyroMinBottomLimit). Thus, there is nil chance that an intended gesture will not be recognized (i.e., a false-negative error) on account of the -kGyroMinStart threshold. The kGyroMinEnd threshold matters primarily because the phone should be relatively stable at the end of the twitch, when imagery may be captured.)

In another embodiment, a user interface is presented during set-up and asks the user to select a preferred gesture strength (e.g., small, medium, or large). The threshold values shown in FIG. 16A are then scaled based on such selection (e.g., by a factor of 0.5 for small, 1.0 for medium, and 2.0 for large).

In another embodiment, some or all of the threshold values are set adaptively, based on historical context.

Consider a user with a phone in hand, who is jogging down a sidewalk, and is curious about an unfamiliar model of car he's approaching. The user can twitch the phone towards the car to initiate a discovery operation (a fast camera exposure is presumed . . . ). In this instance, however, the jogging activity produces gyroscope sensor signals of its own. To distinguish the user's intended twitch from this cacophony of ongoing sensor noise, a baseline of recent x-gyroscope sensor data is collected, and the absolute value of each is stored in a buffer memory (e.g., containing 10, 20 or 30 seconds of historical data). Every two or four seconds, a new first threshold value (kGyroMinStart) is computed, by taking a maximum value in the buffer memory, and scaling it by a factor, e.g., of 1.2, 1.5 or 2.0. Alternatively, the maximum value from the buffer memory may simply be increased by a delta value, e.g., 0.5, 1.0 or 2.0 radians/second, and the result used as the first threshold. The same delta value can be used irrespective of history. Alternatively, different delta values can be used based on history. For example, a delta of 0.5 can be used if the maximum buffer value is less than 1.0; a delta of 1.0 can be used if such maximum value is between 1.0 and 2.0; and a delta of 3.0 can be used if such value is above 2.0. By this latter arrangement, the first threshold adapts appropriately, whether the smartphone was previously at rest on a table, or was moving chaotically.

The second threshold can similarly be set based on recent historical context. As just discussed, a scaling factor can be applied, or a delta factor can be summed. For example, the maximum value in the buffer memory can be scaled by a factor of 1.5, 2.0 or 3.0, to serve as the second threshold value. Or this maximum value can be summed with a delta value of, e.g., 1.0, 2.0 or 3.0 radians/second to serve as the second threshold value.

The third threshold value can be set using the same historical approach. But now the history includes the maximum x-gyroscope value produced by the first part of the twitch (i.e., the value at point "A" in FIG. 15). A variant approach is to adapt the third threshold based on this "A" value (which can be stored by the software). For example, the third threshold value can be set to 50%, 80%, or 100% of the absolute value of this "A" value. By such arrangement, if the user makes a strong away-twitch motion, a commensurately strong towards-twitch motion will be expected. (And conversely if the user's away-twitch motion is more subtle.)

In like fashion, the fourth threshold can be based on techniques described in connection with the first threshold. Or the fourth threshold can be set as a percentage (e.g., 20, 30% or 50%) of the x-gyroscope value sensed at extrema points "A" or "C" in FIG. 15.

FIGS. 17A-17E detail a second software implementation, including certain of the adaptive thresholding principles discussed above.

Figure 18:
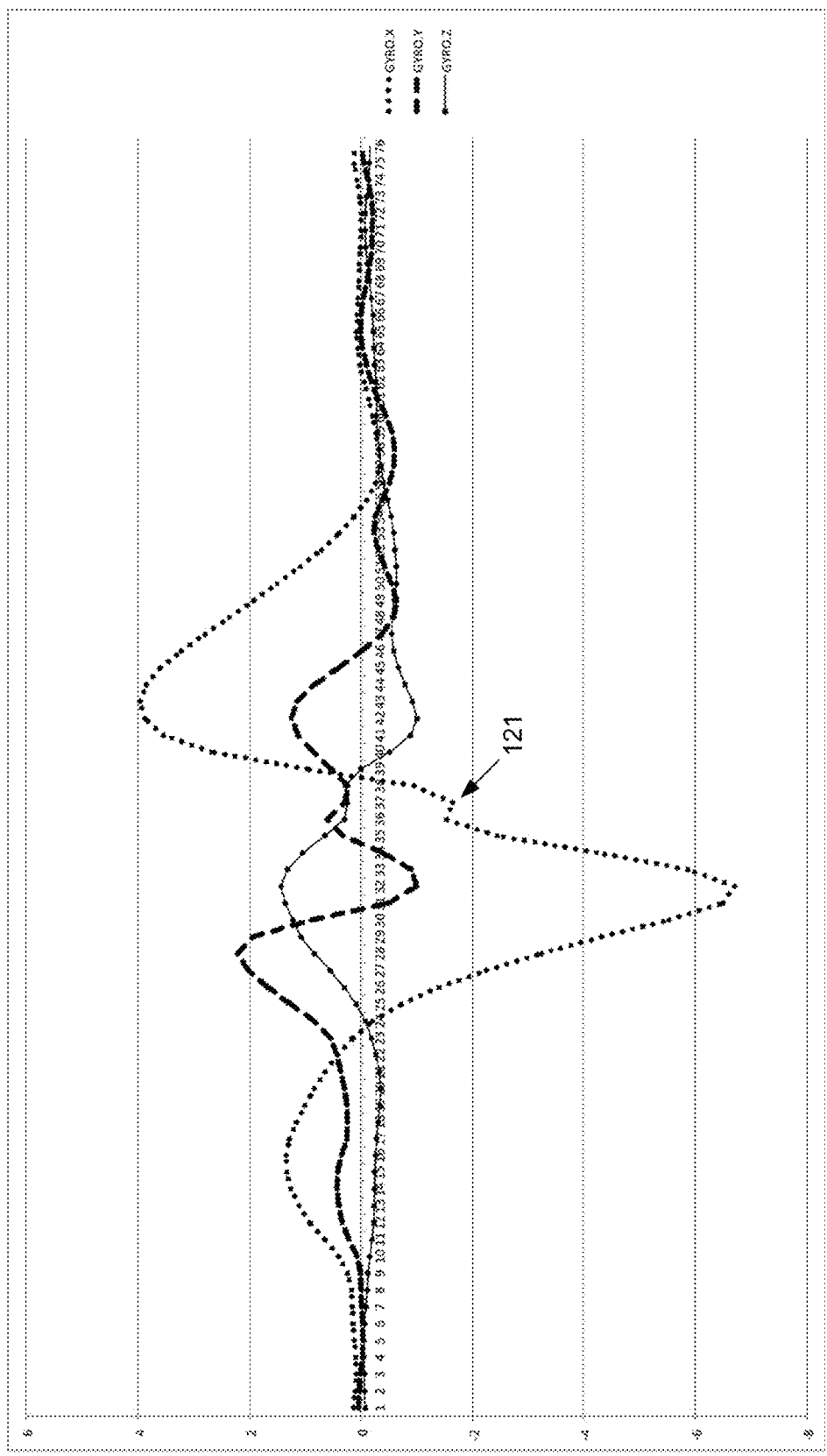
FIG. 18 shows sensor signals corresponding to a twitch movement, with an anomaly.

This second software implementation also is forgiving of slight violations of the earlier-noted monotonicity principles. Consider the x-gyroscope samples shown by the dotted line in FIG. 18. At point 121 there is an aberration, where the gx values do not consistently increase, sample-to-sample. This would cause the software of FIGS. 16A-16C to reset before sensing a twitch. But the second software implementation defines a parameter (kMaxInaccurateTime) that specifies a cumulative period of the twitch interval where such aberrant values can be ignored (0.05 seconds in the exemplary code, or 5 sample values). If this threshold is exceeded, then the process resets.

Rather than numerically parameterizing the movements of the twitch gesture as detailed above, another method of their characterization employs machine learning. A group of users is shown, by a trainer, the twitch gesture (or the full, two-part, Justap gesture). The users then repeatedly undertake the gesture themselves, while motion-sensor data from their phones are logged. This data serves as positive ground-truth information, and is used to train a classifier to recognize the gesture—in an operational envelope that includes all its variant forms across the different users.

Negative ground truth is also collected from these users, i.e., all of the other motions of their phones arising from day-to-day use, that were not intended to signal invocation of the discovery operation. This data, too, is used to train the classifier—in this instance so it can recognize motions that do not signal the discovery intent.

Once trained, the classification data is used, by a Qualcomm Hexagon DSP chip, in analyzing motion sensor data, to determine whether the phone's motion are closer to the positive ground truth, or the negative ground truth (i.e., inside or outside of the detection envelope). If the former, the DSP chip invokes the image discovery operation.

In some embodiments, the machine learning proceeds as described above, but is used to train two different classifiers—one that recognizes the first, "sweep," part of the gesture, and one that recognizes the second, "twitch," part of the gesture. (The same negative ground-truth may be used for both.) In use, the first classifier examines sensor data to discern the sweep part of the gesture. If a sweep is detected, the second classifier is invoked. Only if it senses the twitch part of the gesture within a threshold interval (e.g., within less than one, or three, seconds) of detecting the sweep part, is the full discovery operation invoked. Else, the classifiers are reset and the first classifier again awaits detection of the first part of the gesture.

Using two classifiers in this fashion allows the camera to be activated (e.g., powered, or woken from sleep) as soon as the sweep part of the gesture is detected. Some frames may thus be captured in the brief interval before the "twitch" part of the gesture commences. These frames will be the sharpest captured frames until the "twitch" motion stops, and the camera is again at rest. In some embodiments, image quality checks can be performed on such captured image frames while waiting for the second classifier to detect the twitch part of the gesture. One such quality check is to compute a histogram of pixel values (each typically having a value between 0 and 255). Blurred images tend to have more pixels at intermediate values, since each camera pixel sweeps across darker and lighter parts of the scene, resulting in a mid-valued output; higher histogram counts at the highest- and lowest-pixel values indicate sharper images. A simple implementation is to count the number of pixels in a frame that have values below 50 (or above 200). Higher counts indicate sharper images.

In such arrangement, when the second classifier detects a twitch movement, one of the image frames earlier captured has already been identified as best, and its data can then be passed immediately to the discovery application for further processing. (Meanwhile, high quality frames will again be captured after the twitch part of the gesture—when the camera once again is substantially stationary. That imagery can similarly be evaluated for quality, and a second frame can be queued for submission to the discovery process, if the first-submitted frame does not yield satisfactory results.)

In some embodiments, data from multiple captured frames may be passed to the discovery application. For example, super-resolution imagery may be generated from plural image frames—each taken with a slightly different pixel-to-scene mapping due to hand jitter, etc. (as taught, e.g., in published application 20080036886). Similarly, multiple images may be composited to overcome defects, such as glare, in certain image frames (as taught, e.g., in U.S. Pat. No. 7,346,184).

Screen Reading

Camera-based reading of text from a computer screen presents certain difficulties.

Examined close-up, the text on a computer screen does not appear on a uniform background. Instead, the screen commonly is pixelated, with sub-pixels of red, green and blue, bordered in black. FIGS. 19A-19D show illustrative pixilation geometries.

Figure 19A:
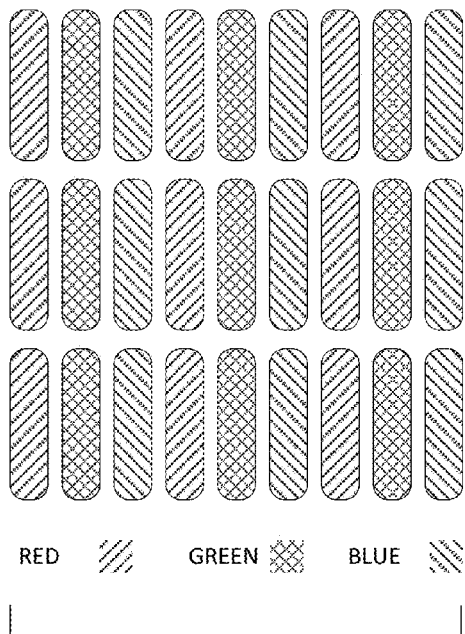
FIGS. 19A-19D show sub-pixel layouts on different display screens.
Figure 19B:
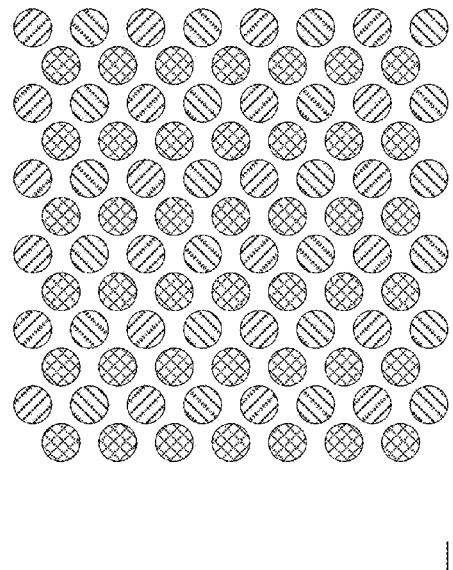
Figure 19C:
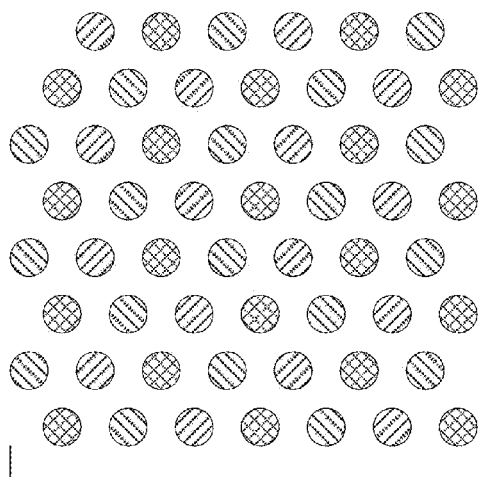
Figure 19D:
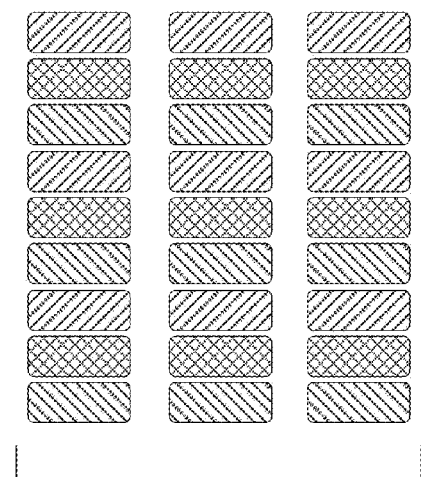

FIG. 19A shows a geometry commonly found on many LCD displays. FIG. 19B shows a geometry found in certain AMOLED displays on Samsung phones. FIG. 19C shows a geometry commonly found on computer CRT displays. FIG. 19D shows a variant LCD geometry found on certain Apple iPhones. (The key shown in FIG. 19A applies to FIGS. 19B-19D, as well.) While the areas between the sub-pixels are shown as white in the drawings, such areas are actually black, or near-black.

Figure 20A:
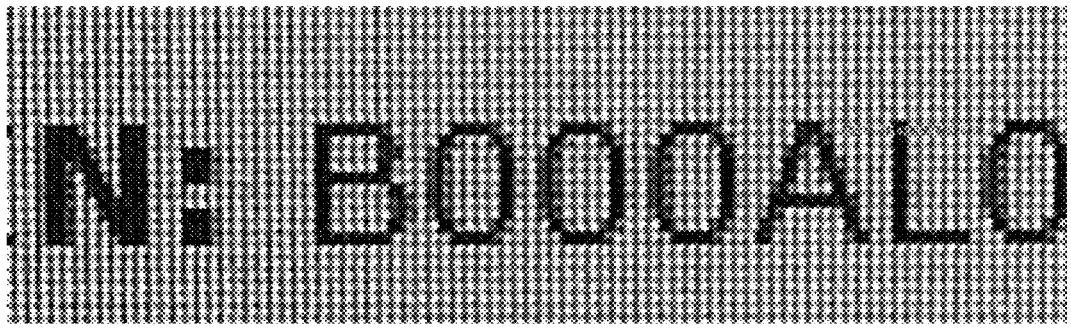
FIGS. 20A, 20B and 20C show details from red, green and blue image planes, when a smartphone captures an ASIN identifier from an LCD screen.
Figure 20B:
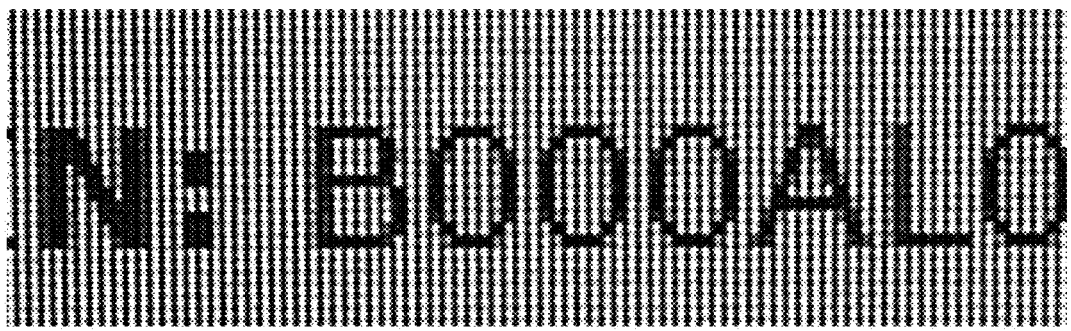
Figure 20C:
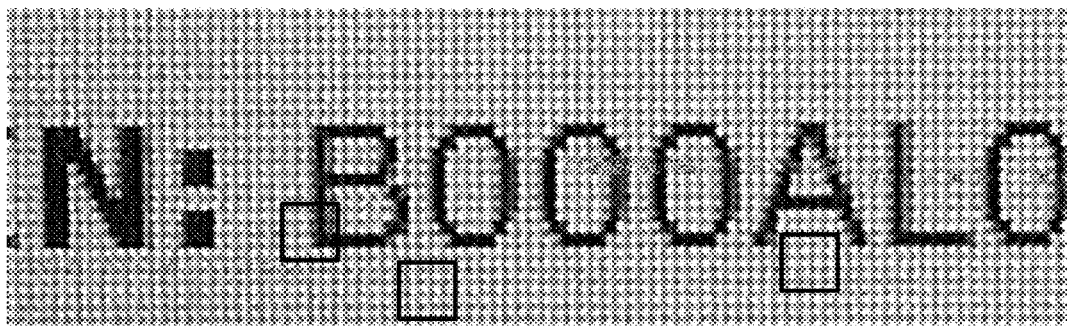

FIGS. 20A, B and C show excerpts of an ASIN identifier displayed on the FIG. 19A LCD display. The image was captured by a smartphone equipped with a color camera (i.e., with a CMOS sensor overlaid by a red/green/blue color filter array). FIG. 20A shows the red plane of imagery; FIG. 20B shows the green plane; and FIG. 20C shows the blue plane. (The squares in FIG. 20C are discussed below.)

(It should be recognized that the patent drawings do not reproduce the depicted screen displays with full fidelity. For example, the images have been enlarged for ease of viewing—a process involving resampling, based on certain statistical assumptions about the imagery. Moreover, the drawings have been rendered in bitonal fashion, with a diffusion dither pattern—again, a variance from the originals.)

Note that the ASIN excerpt appears somewhat different in each of FIGS. 20A-20C. This is due, in part, to the fact that a given edge of a text character ideally should appear along a single contour, but it must be represented by each of red, green and blue sub-pixels—at least two of which are commonly not positioned on the desired contour. Also contributing to the problem are rendering algorithms and display drivers that activate certain sub-pixels in intermediate states—neither fully on nor off—to deal with this sub-pixel-in-the-wrong-place phenomenon, and to help mitigate the "jaggies" that might otherwise be conspicuous when curved lines are approximated with, e.g., sub-pixels positioned in horizontal and vertical configurations.

To illustrate, in FIGS. 20A-C consider the left edge of the "L" character, which is sharpest (i.e., most clearly delineated) in the red plane (FIG. 20A). The green plane in contrast, presents something of a ghosted double-edge, as the rendering engine (display driver) partially illuminates a column of green pixels to the left of the desired contour. The blue plane presents this left edge of the "L" in a more blurred-looking fashion, with a column of blue pixels (again to the left of the true edge placement) partially illuminated (but closer than the partially-illuminated column of green pixels in FIG. 20B, which gave the double-edge appearance.)

Figure 21A:
FIGS. 21A, 21B and 21C are enlarged views showing excerpts from FIGS. 20A, 20B and 20C, respectively.
Figure 21B:
Figure 21C:
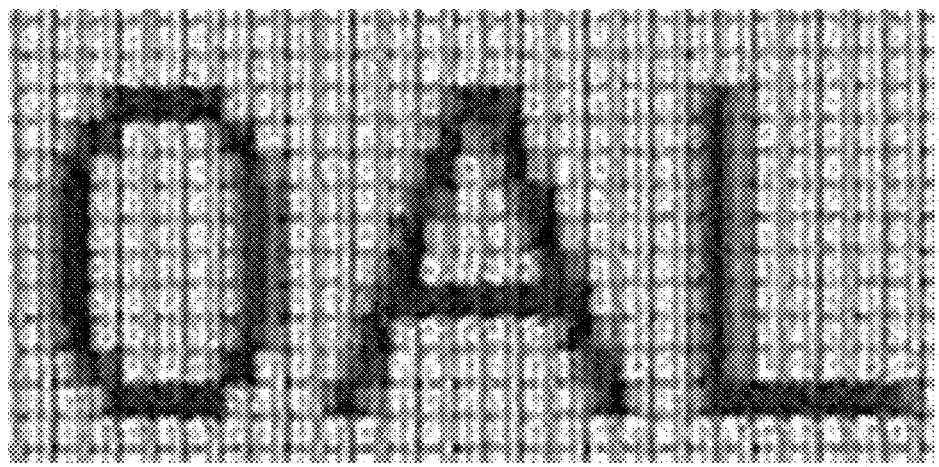

These and other differences between the different color planes are further illustrated by FIGS. 21A, 21B and 21C, which show excerpts from FIGS. 20A, 20B and 20C, respectively, at greater magnification.

Figure 22A:
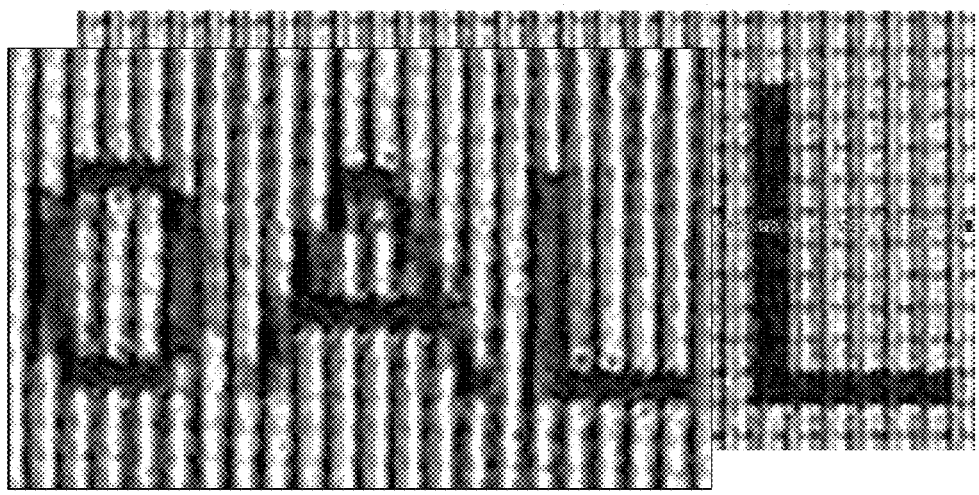
FIGS. 22A, 22B and 22C show red, green and blue planes imagery captured from an LCD display, when presenting an ASIN identifier as a smaller physical size than FIGS. 21A, 21B and 21C, overlaid on imagery from FIGS. 21A, 21B and 21C for comparison.
Figure 22B:
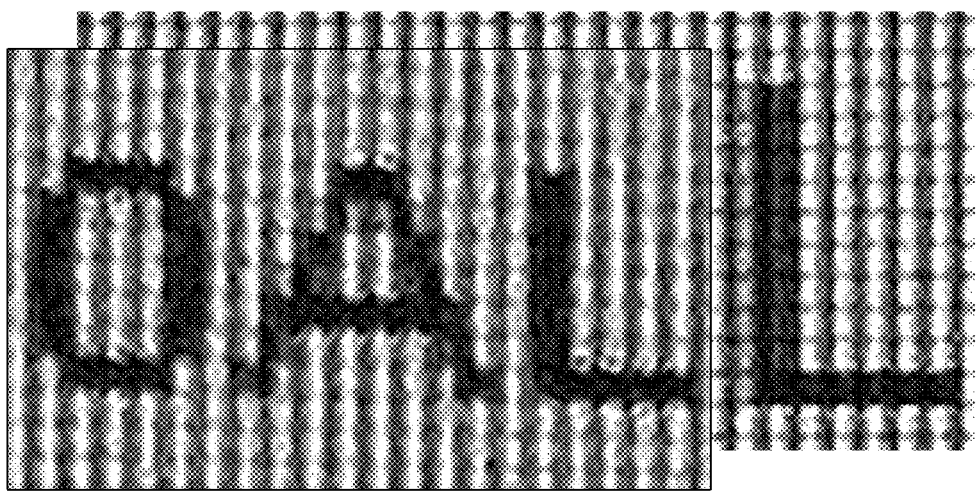
Figure 22C:

The height of text characters, in pixels, depends on various factors, including the font size specified in the HTML instructions, and the display zoom factor selected by the user. FIGS. 22A, 22B and 22C show the same text, on the same display, as the earlier-discussed figures, but at a smaller display zoom factor. These excerpts are overlaid on the excerpts of FIGS. 21A, 21B and 21C, respectively, to facilitate comparison of the "L" character. More text fits on the screen with this smaller display zoom factor, but each displayed feature is smaller. For example, these characters from the ASIN identifier are about 7 pixels in height, as compared to about 10 pixels for FIGS. 21A-C.

Notice that the upright part of the "L" character is sharper in FIG. 22B (the green plane) than FIG. 22A (the red plane). The ghosted double-edge on the left edge of the "L" shown in FIGS. 20B and 21B is absent in FIG. 22B. Thus, there is no color plane in which text characters are consistently sharpest.

(That said, the blue channel often provides more contrast than the red and green channels, because the backlight used with many LCD displays generally emits more blue light than red or green. This helps explain why the lighter parts of FIG. 22C, and the other blue channel illustrations, are lighter than the lighter parts of FIGS. 22A and 22B.)

Figure 23A:
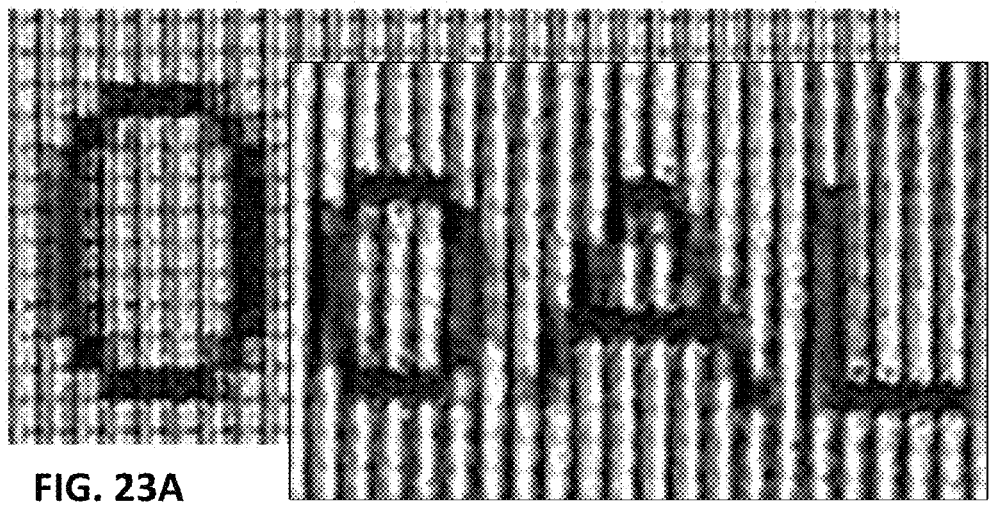
FIGS. 23A, 23B and 23C are like FIGS. 22A, 22B, and 22C, but overlaid differently on imagery from FIGS. 15A, 15B and 15C to further facilitate comparison.
Figure 23B:
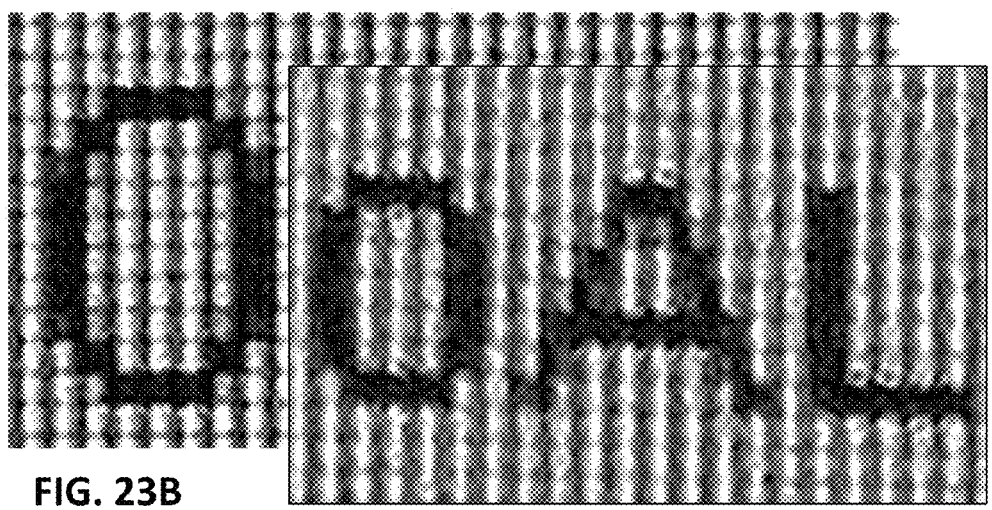
Figure 23C:
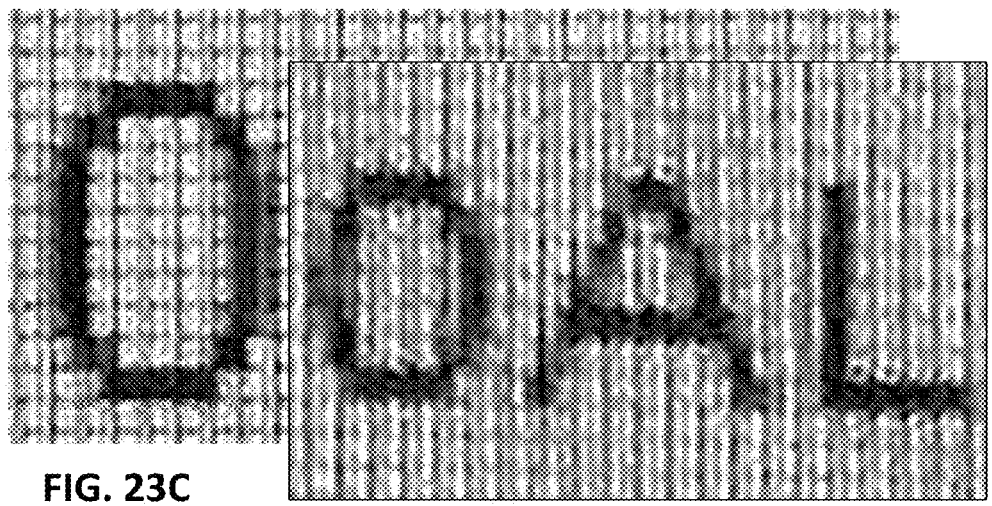

FIGS. 23A, 23B and 23C show the same smaller-zoom text as FIGS. 22A, 22B and 22B, but overlaid so as to facilitate comparison of the "O" character instead of the "L."

Figure 24:
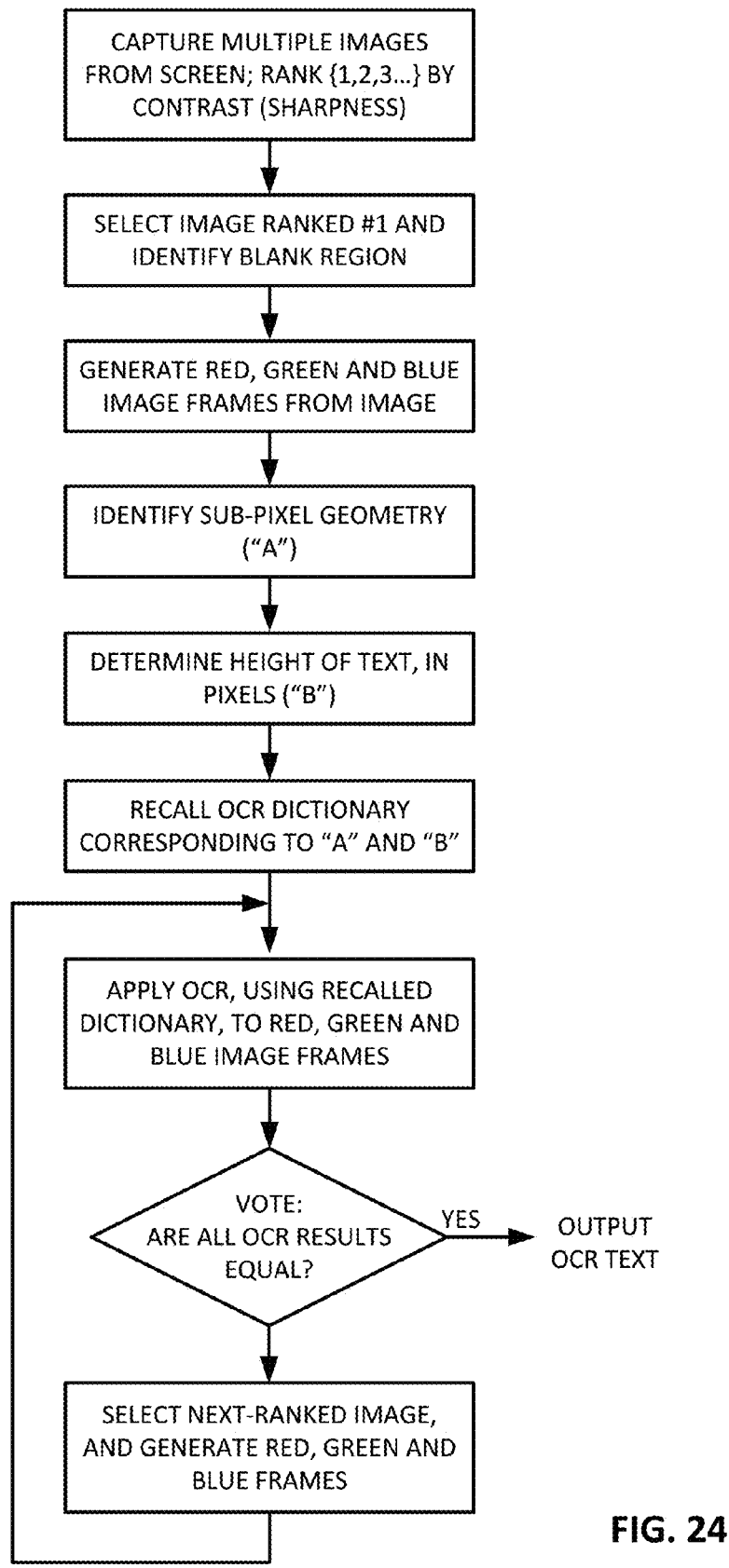
FIG. 24 details a particular computer algorithm employed in OCRing text imaged from a display screen.

One approach to dealing with these difficulties of imaging from computer displays is the algorithm shown in FIG. 24.

Several frames of imagery are captured, e.g., by a smartphone camera operating in a video mode. These frames are ranked by a simple quality metric, such as contrast. The image that is ranked most highly is examined to determine the sub-pixel geometry, and is OCR-processed.

The algorithm determines sub-pixel geometry by first finding one or more regions consisting just of background, without text. Various techniques can be used. One particular technique identifies a half-dozen small image regions at random locations in the image (a few of which are shown in FIG. 20C). The algorithm sums the values of pixels within each such region. Those regions that are devoid of text features will be the brightest, i.e., with the highest red, green and blue pixel values. The region with the highest summed-pixel value is taken as a sample of pure background.

The identified excerpt of just-background is then processed to identify the type of display screen (i.e., the sub-pixel geometry). Again, a variety of techniques can be used. One employs a classifier that previously has been trained with background excerpts of known types of display screens, enabling the classifier to categorize the input excerpt by type (i.e., to which known type of display screen does it appear most similar). Another particular technique performs an FFT on the image excerpt. The lowest frequency of the FFT indicates the repeating pitch of the display's sub-pixel pattern. The image excerpt is then scaled in accordance with the determined repeating pitch so that the pitch in the scaled image equals a reference value. The scaled image is then correlated against reference images—each depicting a known type of sub-pixel geometry at this same reference pitch value. The correlation that yields the highest value output indicates the reference excerpt—and thus the sub-pixel geometry—that most closely matches the input imagery.

In some arrangements, the captured imagery is next de-screened. If the pitch of the sub-pixel elements has been determined, the luminance within each red, green and blue sub-pixel can be determined (i.e., as sampled by the camera sensor at those locations), and combined to yield a greyscale counterpart for a triple of red/green/blue sub-pixels. A new greyscale image is thus formed, composed of grey elements that are each spatially coextensive with a red/green/blue sub-pixel triple. Binarization can again be performed on the greyscale image, by a thresholding operation. OCR is performed on the binary image.

OCR arrangements typically operate by reference to a dictionary. The dictionary includes a collection of reference symbols (glyphs), against which unknown input symbols are matched (e.g., by correlation, or other pattern matching operation). While some OCR techniques are agnostic to font, the best techniques operate by first identifying the font, and then using a dictionary specific to that font.

In many embodiments of the present technology (such as reading text from an Amazon product page), the text is presented in a known font (e.g., Verdana), or is presented in one of a few candidate fonts (e.g., Verdana or Arial). Thus, a dictionary specific to such font is desirably used.

In accordance with an aspect of the present technology, however, a more refined selection of dictionaries is made, to take into account the different distortions that may be associated with different sub-pixel geometries, and/or different font heights. That is, the Verdana font letter "A" as rendered on a Samsung AMOLED screen appears with different distortions than the same letter as rendered on a CRT screen. Similarly, the Verdana font letter "A" rendered at a height of six pixels exhibits different distortions than the Verdana font letter "A" rendered at a height of 20 pixels on the same display screen.

Thus, a particular embodiment of the technology categorizes the displayed text by type of pixel sub-geometry (as discussed above) and selects an OCR dictionary accordingly. Additionally, or alternatively, the technology senses the height of the displayed text (in terms of pixels or sub-pixels), and selects an OCR dictionary accordingly. (The dictionaries are previously-established, using known text, of known pixel height, displayed and imaged from known types of display screens.)

FIG. 25 shows an illustrative data structure identifying plural different dictionaries—all for use with the Verdana font. The data structure is indexed by display type (across the top) and character height (along the side), to identify one particular dictionary that is desirably used for a given combination of these two parameters. Thus, if the largest text characters (i.e., capitals) are 8 pixels in height, and are displayed on a screen of type "LCD2," then the dictionary named "VL28" should be used. (The dictionary itself is stored elsewhere, and is not particularly shown in FIG. 25.)

FIG. 26 is similar to FIG. 25, but for use with the Arial font.

(If the captured imagery has been de-screened, e.g., as described above, then a dictionary based on known text, of a known height, displayed on a known type of display screen—and also de-screened, is desirably used.)

OCR operations typically include a de-skewing step, to assure that the text is horizontally oriented, before character recognition is attempted. The pixilation pattern of the display screen, which is captured with the displayed text, serves as a reliable reference grid by which the angle of text can be determined. (Text is rendered parallel to the horizontal lines of the pixel geometry, and is perpendicular to the vertical lines of such geometry. An FFT can be performed on blank excerpts of the screen to establish the skew with which the horizontal and vertical lines depicted in the camera-captured imagery vary from their expected horizontal and vertical orientations.)

In the particular algorithm detailed by FIG. 24, red, green and blue frames of the imagery (e.g., FIGS. 20A, 20B and 20C) are separately OCR-processed, and the results are compared. If all three OCR operations yield the same output string, the results are taken as valid. Else, the next-ranked image frame is similarly OCR-processed, until unanimity is found between a frame's red-, blue- and green-OCR'd data.

In variant arrangements, majority-vote, rather than unanimity, can be used. In other variants, instead of OCRing different color planes within the same captured image frame, results from different image frames can be compared. For example, OCR can be performed on blue-plane data from the three sharpest frames, and the results compared. If the results aren't satisfactory (e.g., if unanimity is not achieved), the same operation can be performed on green-plane data from the three sharpest frames, followed—if necessary—by red-plane data from such frames. Or votes can be taken that include both different color-planes and different image frames, such as OCR'ing the nine color image planes in the three sharpest images, and treating the OCR results as valid if seven or eight of the nine match (or whatever majority may be required by a particular implementation).

Another approach to dealing with the above-noted image difficulties is to slightly blur the captured image, such as by processing with a low pass filter. (A Gaussian filter, with a radius of 1 or 2 pixels, can be used.) The resulting image is converted to greyscale (or a single color channel—such as blue—can be used), and a thresholding operation is applied. For example, pixels having a value greater than 100 (out of 255) are assigned a value of 255; all others are assigned a value of 0. The result is a black and white image suitable for OCRing.

The image that results from such procedure is again a function of the display screen from which it was imaged, and the height of the text characters (in pixels) on that display screen. Again, dictionaries specific to one or both of these parameters can be employed in OCRing.

Figure 27:
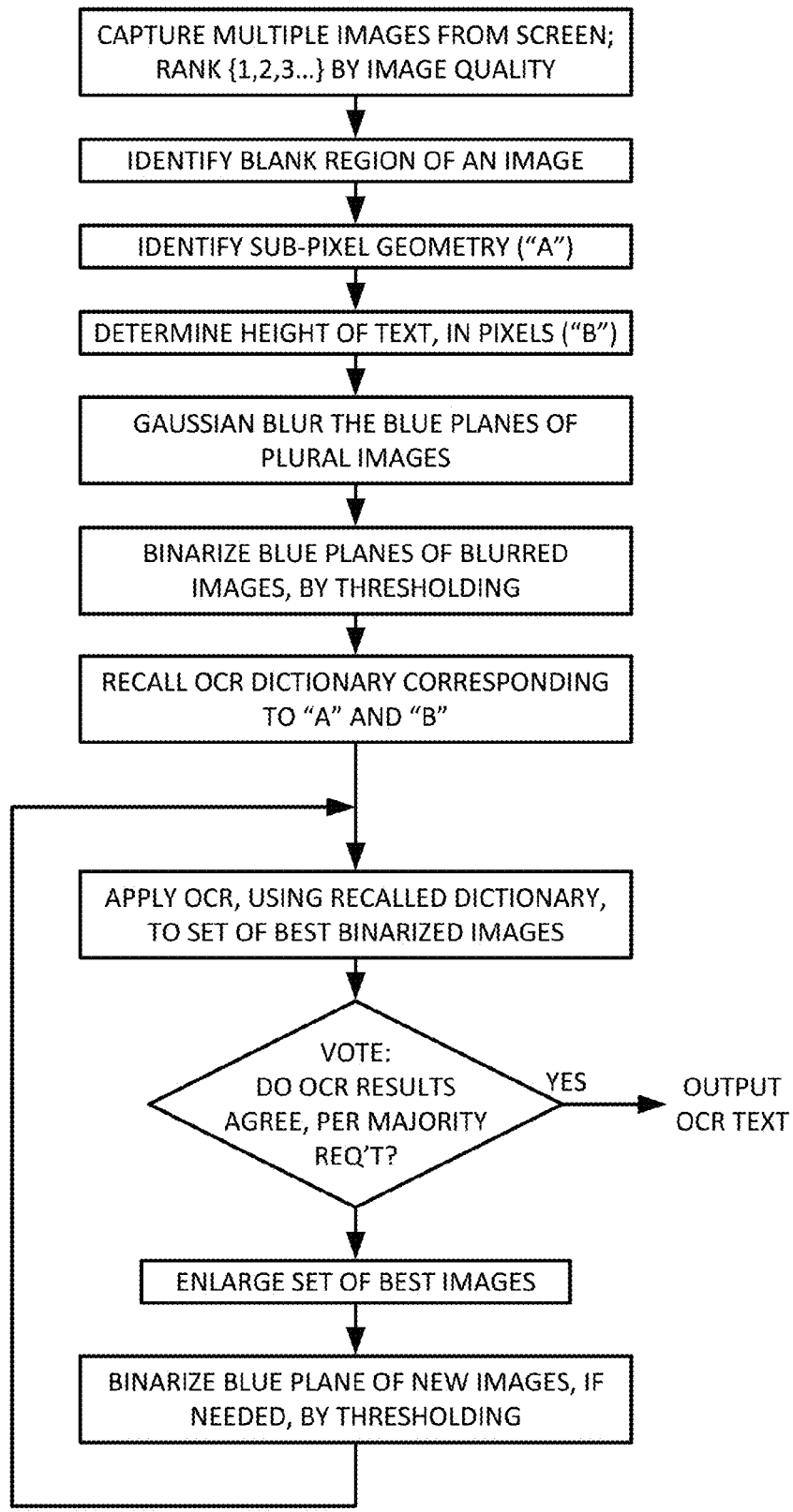
FIG. 27 details another particular algorithm employed in OCRing text imaged from a display screen.

Similarly, the text output that results from OCR-processing one image frame, or one color plane, can be combined/compared with results from other frames/color planes, in yielding a final results. For example, OCR results from three different binarized, blurred, blue planes can be checked for agreement. If agreement is not found, the set of image frames can be enlarged to five, and OCR performed on the two new frames. If four of the five binarized frames yield the same OCR results, then such results are treated as valid. Else, the set of images is enlarged to seven, and the process repeated—this time looking for agreement among five of the seven OCR results. Etc. FIG. 27 depicts such an arrangement.

By techniques such as the foregoing, consistently better OCR results can be achieved on text imaged from display screens, than by conventional methods.

More on Watermarking

The techniques of digital watermarking are presumed to be familiar to the artisan. Examples are detailed, e.g., in the applicant's U.S. Pat. Nos. 7,088,844, 6,614,914, 6,590,996, 6,122,403, 20100150434 and 20110274310. Such watermarks are commonly imperceptible, meaning they are not noticeable to a viewer examining watermarked content from a typical viewing distance, e.g., 20 inches (or to a listener hearing watermarked audio under typical listening conditions). Image watermarks commonly encode between 40 and 100 bits of information in a 2D block pattern, and plural such blocks are typically tiled across a screen or package for redundancy. If more than 40-100 bits of information are desired (as is often the case), the watermark can convey an identifier that identifies a record in a remote database. The identifier is sent to the database, which returns expanded information.

One technique for adding a digital watermark to a browser's screen display is detailed in pending patent application Ser. No. 14/522,150, filed Oct. 23, 2014, the text for which is submitted as an appendix. In that method, a block pattern of watermark data is fetched from a remote server, which earlier computed the pattern based on a desired payload (which may have been provided from the device running the browser, or which may have been determined otherwise). Browser plug-in code, or other software, then causes this block pattern to be tiled as an overlay across the screen imagery, with low opacity (i.e., high transparency, such as by alpha channel compositing). If, for some reason, a smartphone is unable to decode a watermark presented on the screen after attempting to do so (e.g., due to other artwork on the screen that somehow confounds the watermark detector), this circumstance can be noted, and used to trigger issuance of a new, different pattern from the remote server, for presentation on the screen.

Figure 30:
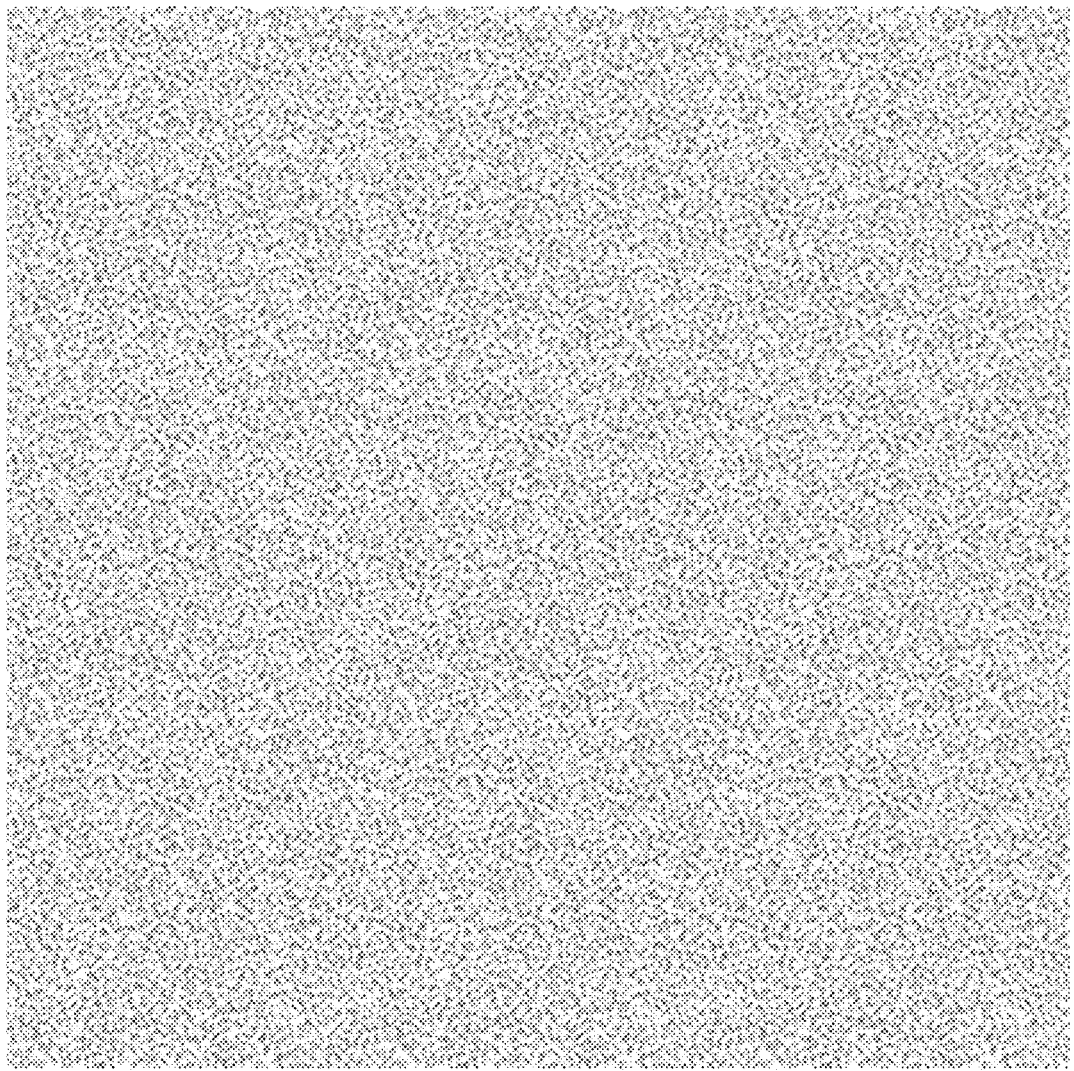
FIG. 30 shows an exemplary watermark tile.

(FIG. 30 depicts a representative watermark tile—greatly enlarged.)

In one particular method, the watermarking signal is presented in a top window in a windowing operating system (e.g., Apple's OS X), without a title bar, and with low opacity. This window is sized to overlay the entire screen, but its low opacity permits the user to view all other windows that are visible on the screen, including the web page of an online merchant, such as Amazon. Yet all these other windows are seen through the subtle veil of a payload-carrying watermark pattern. FIG. 28 details exemplary software instructions used in presenting such a low opacity overlay window.

While an image watermark typically conveys a short and static payload, this need not be the case. For example, a display screen is typically refreshed dozens of times each second. Each screen-refresh (or each second, third, etc., screen refresh) can be watermarked with a different payload, conveying an additional 40-100 bits. By such arrangements, a smartphone detector can extract hundreds, or a thousand or more bits of data from a short clip of video captured from the display screen that spans less than a second. Such a large payload capacity can obviate the need to query a remote database for additional information, and avoid the associated time delay. (Such a payload can convey, e.g., any of the information that might otherwise be fetched from a remote database, such as a URL in ASCII form, local availability information, etc.)

In addition to the time delay associated with querying a remote database, a further time delay is incurred by the smartphone launching a new browser window (or launching a browser app) to display a response associated with a detected watermark payload. This latter time delay can be avoided by providing a response (e.g., a display of a local merchant's product price and availability) directly in the app that sensed and decoded the watermark (e.g., the Digimarc Discover app), rather than employing a new browser window for this purpose.

In some arrangements, the usual short watermark payload is maintained, but it is used in accessing additional information from a local data store (e.g., in the memory of the phone), rather than accessing a remote server for such information. Or a hybrid arrangement can be used. To illustrate, if the watermark payload includes 20 bits, representing identifiers 0 through 1,048,575, then the software can treat different identifiers differently, e.g., resolving identifiers 1-10,000 using a local data store, and resolving identifiers 10,001-1,048,575 using a remote data store. The former group of identifiers constitute a premium tier of responsiveness. They can be made available for use, e.g., with a select group of web pages (e.g., Nordstrom<dot>com), and/or a select group of product packaging (e.g., from The Coca-Cola Company and Kraft Foods), perhaps in exchange for premium payments.

An alternative technique relies on a watermark signal presented on the computer's display screen. As known from applicant's cited patent filings, a watermark signal typically includes a constellation of impulses in the spatial frequency domain. These signal components serve as a known reference signal by which scale, rotation and translation of imagery captured from the watermarked screen can be determined. (See, e.g., U.S. Pat. Nos. 6,408,082, 6,424,725, 8,750,560 and 20120046071.) From these parameters, the smartphone position can be mapped to a corresponding position on the computer display screen, as discussed above, enabling the smartphone to be used in a mouse-like manner.

Exemplary Arrangement

Figure 32:
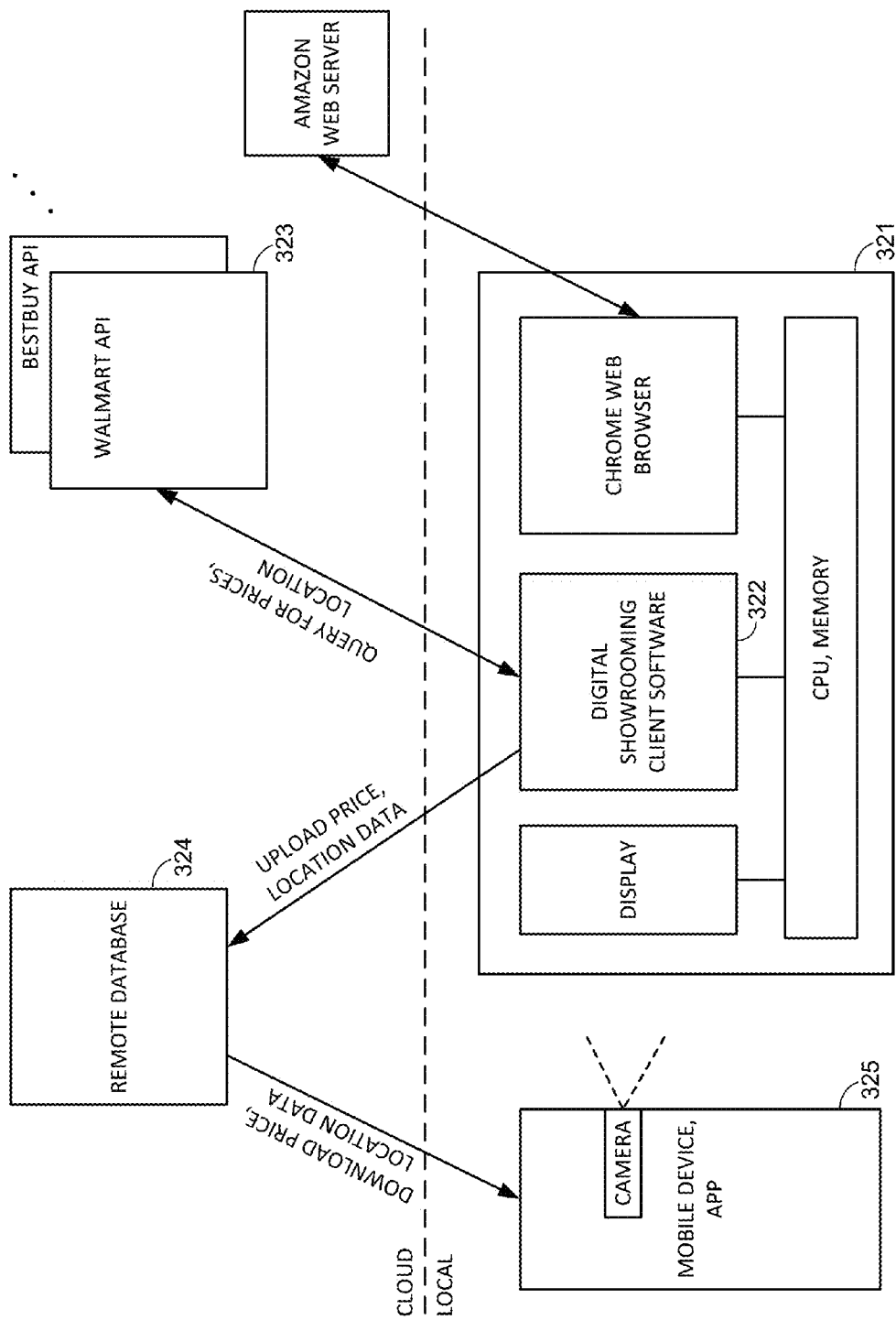
FIG. 32 shows a system according to one embodiment of the technology.

An exemplary arrangement is shown in FIG. 32 and includes a user computer 321 comprising a CPU, memory, display, browser software (e.g., Internet Explorer), and a Digital Showrooming client application 322. The browser loads a product web page, e.g., from Amazon, and renders the associated HTML instructions on the display screen. The Digital Showrooming client app monitors activity of the browser, and whenever it discerns an identifiable product (e.g., using one or more of the techniques detailed earlier), it queries one or more remote services 323 (e.g., a Walmart API and a BestBuy API) for information about local price and availability. The client software 322 displays this information to the user, on the screen, next to (or atop) the Amazon web page. It also transmits this information to a remote database 324, in association with an identifier that uniquely identifies the computer or the user. (One suitable identifier is a POSIX time string that is obtained when the client software is first run, and is stored for future use. Another is a public cryptographic key, associated with the user, or with that device.) The client software 322 also digitally watermarks the screen with the unique identifier, as described above.

As the user surfs to different shopping sites, the client app presents comparison shopping information on the screen in real time, without user involvement (typically with a lag of less than three seconds; often about one second). When the user is ready to leave the house and pick up the product locally, the user simply images the screen with an app (e.g., Digimarc Discover) on their mobile device 325, which decodes the identifier from the on-screen watermark, and obtains the relevant comparison shopping information from the remote database 324.

FIGS. 33, 33A, and 34A-D illustrate operation of one such system.

Figure 33:
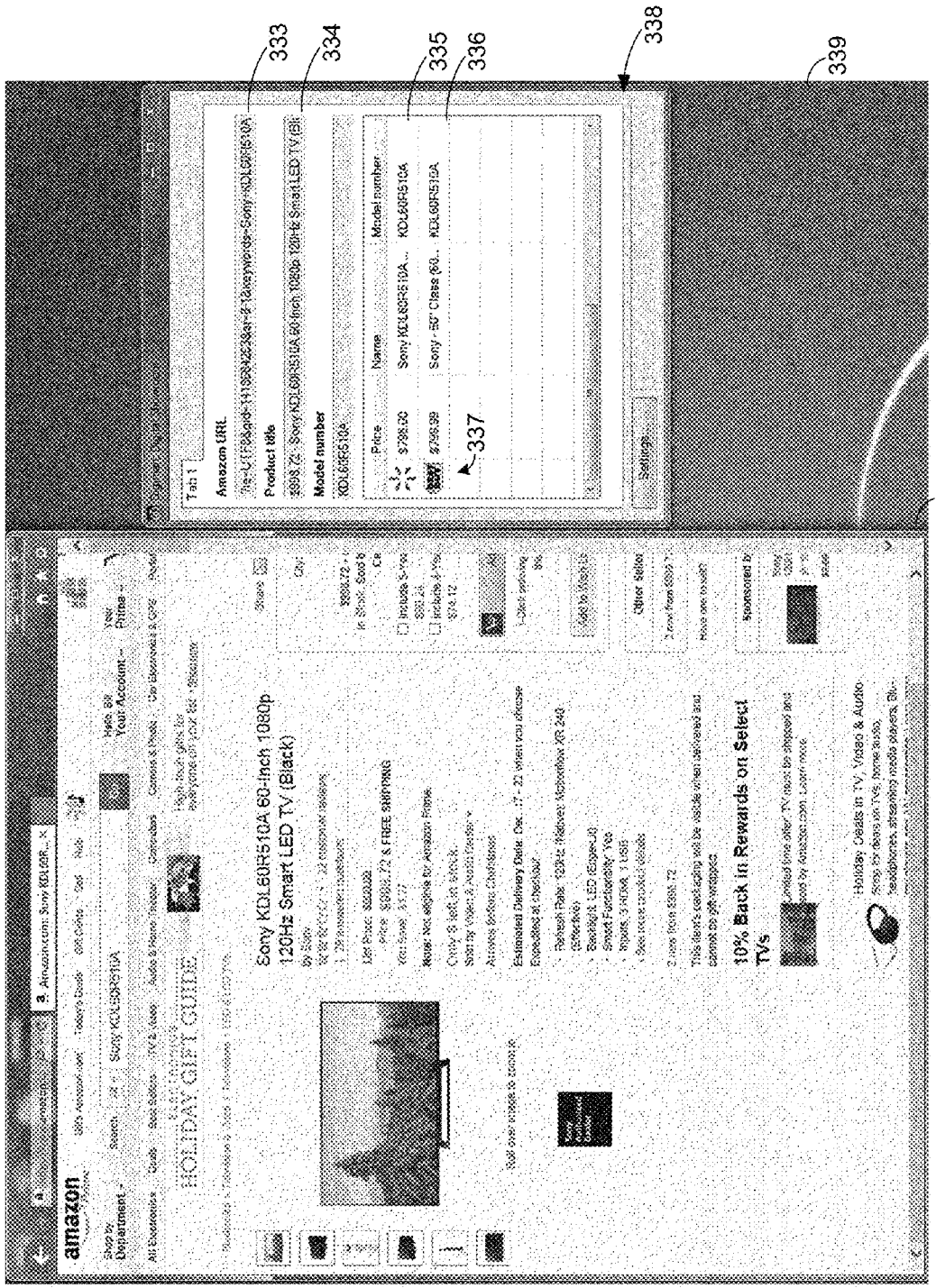
FIG. 33 is a screenshot from a computer display showing a browser window and a companion Digital Showrooming client application window.
Figure 33A:
FIG. 33A shows an alert tile that may be presented by the client application of FIG. 33, identifying local vendors who sell a product.

FIG. 33 shows a screenshot from a desktop computer display, including both a browser window 331, and an adjoining window 338 presented by the Digital Showrooming client software 322.

The user has directed the browser to an Amazon web page for a Sony KDL60R510A television, which Amazon offers for $998.72. The client software 322 extracts identification data from the browser (including the URL 333, and the product title 334), and queries Walmart and BestBuy APIs to obtain their pricing for these products. The results are shown on the desktop display, at lines 335 and 336 of window 337. This displayed data shows that the same television is available for less both at Walmart ($798) and BestBuy ($799.99).

The user can tap anywhere on lines 335 or 336 (including on icons 337) to obtain more information about local availability of this Sony television, including the number of units in stock, store location, hours, maps, etc., as discussed previously.

The client software can also present an alert tile (FIG. 33A) in a corner of the desktop display, showing logos of merchants from whom the same product is available. This tile is shown even if the window 338 is minimized. Clicking on the alert tile causes window 338—or another window with additional information—to appear. (In some implementations, the tile is presented whenever the Digital Showrooming client application is working; in others, the tile is presented only when the application has identified local availability of a product.)

Figure 34A:
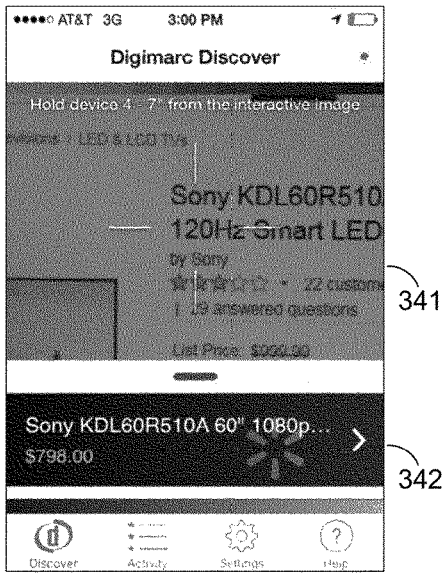
FIGS. 34A-34D show the Digimarc Discover mobile phone app in different phases of operation, based on camera sensing of the browser window in FIG. 33.
Figure 34B:
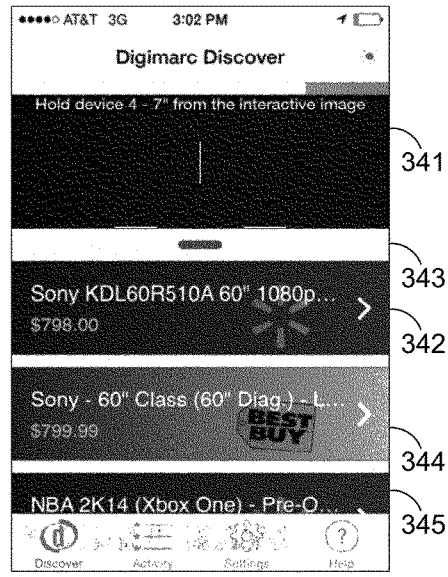
Figure 34C:
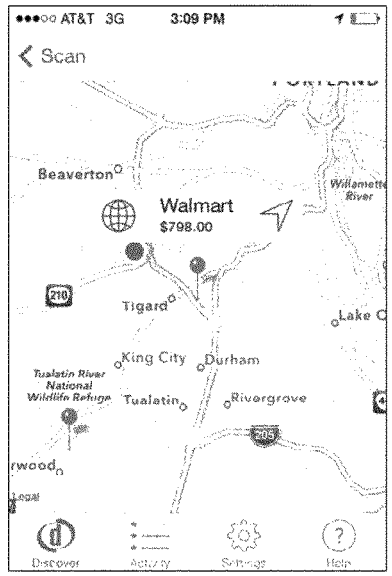

The user can also (or alternatively) obtain comparison shopping information using their mobile device. FIG. 34A shows use of the Digimarc Discover iPhone app. The user positions the phone so that part of the desktop display appears in the camera viewfinder 341. After the camera's auto-focus acquires a sharp image, the app decodes the watermark (earlier rendered across the desktop 339 by the client software 322), and sends the watermark payload to the remote database 324—to retrieve information earlier determined by the client software 322. In one embodiment, the app immediately presents a map of the local area, with pins identifying local availability of the product, and overlays showing the price for the item at each location (FIG. 34C).

In some embodiments, the retrieved information—whether presented in list form, map form, or another form, is color-coded, e.g., to visually distinguish higher and lower prices, or closer/further distances to the store, or faster/longer availability times (e.g., in-store now; available for pickup in an hour; available for pickup by 5 pm; available for pickup tomorrow, etc.). Green is best, red is worst.

The retrieved information is also stored in a "drawer" 342 in the Discover app user interface. This drawer is labeled with the product name and price. Artwork on the front of the drawer includes the Walmart logo. Drawers serve as historical repositories for information collected through use of the app.

Applicant's published patent application 20140357312 further describes the Digimarc Discover app, including this user interface. As there detailed, the drawer 342 is one in a stack of drawers, which reveals a recent history of discovery performed by the app. The user can slide a divider 343 vertically on the phone touch screen, to reveal more drawers in the stack. (So-doing reduces the size of the live viewfinder 341.) FIG. 34B shows a second drawer 344 revealed by this action, and part of a third drawer 345. The second drawer corresponds to the same Sony television, as available from BestBuy (corresponding to line 336 in FIG. 3). Again, the drawer presents the product title, price, and BestBuy logo.

Figure 34D:
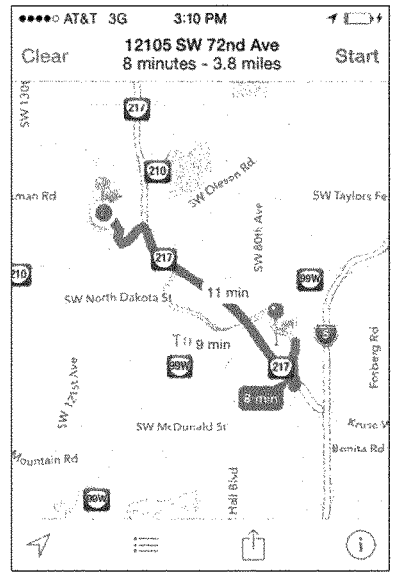

Any of the drawers can be slid to the right on the phone touchscreen to reveal additional information. Such action with the drawer 342 causes the app to again present the map user interface shown in FIG. 34C, indicating the location of the nearest Walmart store having the Sony television in stock. If the user taps the graphic "Walmart $798.00" presented on the map, the software launches a navigation function, determining the quickest route to that store from the user's present location, as shown in FIG. 34D.

The watermark that spans the screen display can be "blind"—referring to a watermark of uniform character across its spatial extent, without local variations in amplitude or chrominance (except for the watermark's natural randomness, e.g., as depicted by FIG. 30). Alternatively, the watermark can be locally-adapted based on the artwork over which it is presented (e.g., the web page artwork, read from the computer's screen buffer memory), and based on the human visual system. So doing allows the strength of the mark to be maximized (i.e., the signal to noise ratio between the mark and the underlying artwork), while maintaining a consistently low visibility to human users. Such adaptation can occur several times a second, or only when a window on the screen is otherwise redrawn. (Techniques for locally adapting the watermark to underlying imagery are detailed in the watermarking patents referenced herein, and in Hannigan, et al, "Digital watermarking using improved human visual system model," Photonics West 2001, International Society for Optics and Photonics, Proc. SPIE, Vol. 4314, pp. 468-474.)

While many embodiments employ a single watermark across the entire screen, some embodiments encode a different watermark payload at different locations at the screen. Such technique can be applied, for example, to a screen that shows multiple search results (as when a user types a general search request, and Amazon presents a results screen with multiple alternative products). Each different watermark can correspond to the particular product over which it is spatially-overlaid, and can cause the shopper's mobile device to present local availability information for that product, when that part of the screen is viewed by the smartphone.

In many embodiments, the client application includes a configuration option enabling the user to set various preferences, via a graphical user interface.

One preference concerns the vendors whose inventory and pricing should be searched for competing offers. Shopper A may want to see competitive offerings only from Walmart; Shopper B may select Walmart, Target and Macy's, etc. Another preference concerns the strength of the watermark overlay (i.e., its opacity). Stronger watermarks assure faster reads, but with some slight greying of the screen.

Other preferences concern the types of information presented on the smartphone. Shopper A may want just competing store, price, and street address information displayed. Shopper B may additionally want to see a map detailing the location of the vendors, and an image of the product. Shopper C may additionally want to see Amazon product reviews for the listed product(s).

Different users may also have different preferences about the degree of match required between the product offered on the Amazon page, and the product(s) found locally. Shopper A may specify that no local option is to be shown unless it includes the same model number as the product found on the Amazon page (e.g., UN39FH5000). Shopper B may be less restrictive, but still require that products displayed in the results be from the same vendor as the product found on the Amazon page (e.g., other Samsung TVs are acceptable, but not Sony, etc.). Shopper C may be interested in considering other alternatives—not limited to Samsung. The user interface can allow Shopper C to specify the word match count or percentage between the Amazon product title and competing products. For example, if the Amazon page offers a product entitled "Samsung UN39FH5000 39-Inch 1080p 60 Hz LED TV" (7 words) then a match percentage of 70% would allow matches to products having any five of these words in their title (e.g., "LG Electronics 39LB5600 39-Inch 1080p 60 Hz LED TV").

Figure 36:
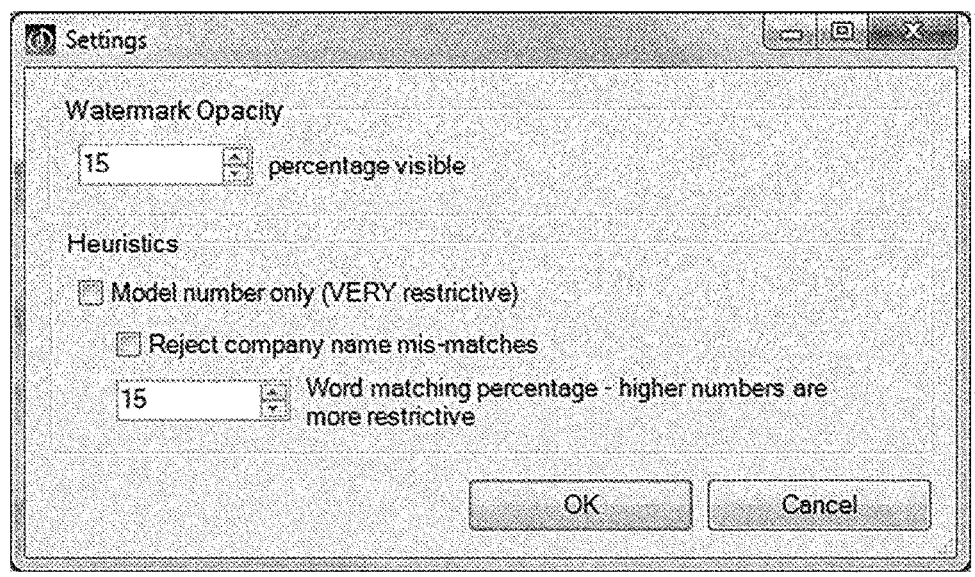
FIG. 36 shows a preferences window used in an illustrative implementation of the technology.

FIG. 36 shows a user interface of the sort that can be used to define certain of the above-noted user preferences.

While implementations using smartphones have been particularly described, it will be recognized that implementations can also use wearable appliances. A system including a headworn camera and display (e.g., Google Glass technology, or a camera-equipped Occulus Rift headset) can sense the watermark from the screen, and present responsive information for user viewing. The presented information can vary depending on the compass direction the user is facing, identifying the local vendor(s) towards which the user is facing, and the offered product/price. The interface allows the user to virtually zoom-in on the store, to explore further information—such as in-store location for the product, technical specs, etc. The software can employ virtual reality techniques that enable the shopper to virtually enter the store and complete the purchase—leaving only the task of picking-up the product when convenient (or having it delivered).

Little Screen as Pointing Device for Big Screen

Applicant earlier detailed how a Justap gesture (or a twitch gesture) with a smartphone can signal the user's interest in a product (or screen display) towards which the gesture is directed. In another embodiment, a smartphone is enhanced to enable a mouse-like pointing capability. This allows a user to indicate a particular location on a display screen (or, in some embodiments, on a product), with which a gesture should be associated (e.g., to press an on-screen button). Such smartphone mouse-like functionality also allows the user to signal using swiping motions.

In one particular arrangement, the computer (or other device with a screen) sends to the smartphone a copy of the artwork displayed on the screen display, e.g., as a bitmap or JPEG image file. (FIG. 29A shows such an image.) The smartphone uses this image as reference data to determine the affine distortion and translation (shift) of the imagery captured by the smartphone camera.

The affine distortion is discerned by identifying the pixel coordinates of three distinctive image points in the smartphone-captured image, and the pixel coordinates of corresponding image points in the reference image. (Corner point detection methods, such as the Difference of Gaussian technique commonly used in SIFT, are suitable for identifying distinctive image points.) Given the locations of such corresponding points, functions in most image processing toolkits can then be employed to determine the affine transformation between the two images (e.g., the function getRotationMatrix2D in OpenCV).

After the affine transformation has been determined, the smartphone-captured image is dewarped and re-scaled to remove the just-determined affine distortion, e.g., using a function such as warpAffine in OpenCV. FIG. 29B shows a smartphone-captured image after such processing. The translation between the two images (FIGS. 29A and 29B) is then determined, e.g., by correlation.

The correlation may yield the offset, in computer display pixels, from the upper left corner of the reference image, to the upper left corner of the smartphone-captured image, as shown by arrow 301 in FIG. 31. The smartphone knows the dimensions of imagery captured by its own camera (e.g., 1936×2592 pixels), so can add half of each of these values (arrow 302) to the just-noted offset to determine the location—on the computer display—corresponding to the center of the smartphone camera field of view (and the center of the smartphone display screen).

While the foregoing method was described as being performed by the smartphone, it likewise can be performed by the computer—with the roles reversed.

Using the foregoing method, the pose of the smartphone is related to a position on a computer's display screen (i.e., the latter position is the point to which the smartphone camera is pointed). Once this relationship is known, it can be communicated (e.g., by WiFi, Bluetooth, etc.) to cooperating software on the computer (e.g., a browser plug-in), and used in pointing, clicking, and other gesturing. For example, a twitch gesture with the phone can serve to press an on-screen button at the determined position on the computer display screen. (A frame of smartphone camera imagery, captured just before—or just after—the twitch gesture can serve to define the location on the computer display screen to which a virtual mouse click is to be applied.)

More generally, the smartphone in this mouse mode can do essentially anything a mouse does just by pointing the phone at the screen, moving a cursor around, and then left- or right-air tapping, when the user wants to click on something, or scroll through a displayed menu and select an item. (The granularity of on-screen positioning achievable with a smartphone won't initially rival that of a traditional mouse. In some embodiments the screen is segmented into a grid of 40×60 blocks, and the on-screen cursor is snapped to the center of the block to which the phone is discerned to be pointing.)

In a variant embodiment, the user taps at a location on the smartphone screen. Knowing the affine transformation that geometrically relates the smartphone screen to the computer display screen, such a tap can be mapped to a click at a corresponding position on the computer display screen.

While the smartphone's on-screen view of the computer display provides one form of graphical feedback to the user as to its pointing function, the computer screen itself can provide another form of feedback. For example, a cursor having the appearance of a smartphone can be presented in an otherwise-transparent window overlaid across the entire screen. The position of the cursor in this generally-transparent window can move in accordance with the above-described position-determining process (e.g., based on information sent from the smartphone). Alternatively, a spotlight-like effect can be produced, with transparency of the overlay window being set to 50% or 75%, except in a circular zone centered on the screen position to which the smartphone position corresponds. In that circular zone the transparency can be 100%. (A transition region can surround the circular zone, with transparency diminishing over a radius of 20 pixels or more, e.g., 200 pixels, to the ultimate 50% or 75% transparency value.)

Of course, the foregoing method is exemplary. More or less complex techniques can naturally be employed.

Further Remarks

It has always been theoretically possible, when shopping on-line, to manually research local product availability. However, this has been a labor-intensive, time-consuming process, e.g., involving finding phone numbers for local Walmart stores, calling one, waiting on hold to speak to a live person, waiting again after being transferred to a different extension, describing the product of interest to an often inexperienced clerk, waiting for the clerk to check availability and price, and obtaining such information from the clerk. And then repeating it all for the second local Walmart store, etc. And then arriving at a local store—only to find the clerk mis-understood which product was of interest, or mis-quoted the price. Etc., etc. No wonder people are so relieved to buy products from Amazon and similar online merchants.

In contrast, the present technology is not only quick, it is reliable. Identification can be based on multiple criteria—not just a product identifier. It can check stores that human users didn't even know are nearby or think to consult. Reliance on silicon processors, performing hundreds (or hundreds of thousands) of operations per second, yields results that are beyond human abilities in breadth and accuracy. Latency is negligible; the user knows which stores carry a product, and at what price, in less than five seconds—often in less than three seconds.

Moreover, it will be recognized that many embodiments address technical issues that are specific to computer technologies, and have no counterpart in the prior art (e.g., "telephone Walmart and ask") approaches. (OCRing from differently-pixelated display screens is but one example.)

Having described and illustrated the principles of our inventive work with reference to illustrative examples, it will be recognized that the technology is not so limited.

Figure 35:
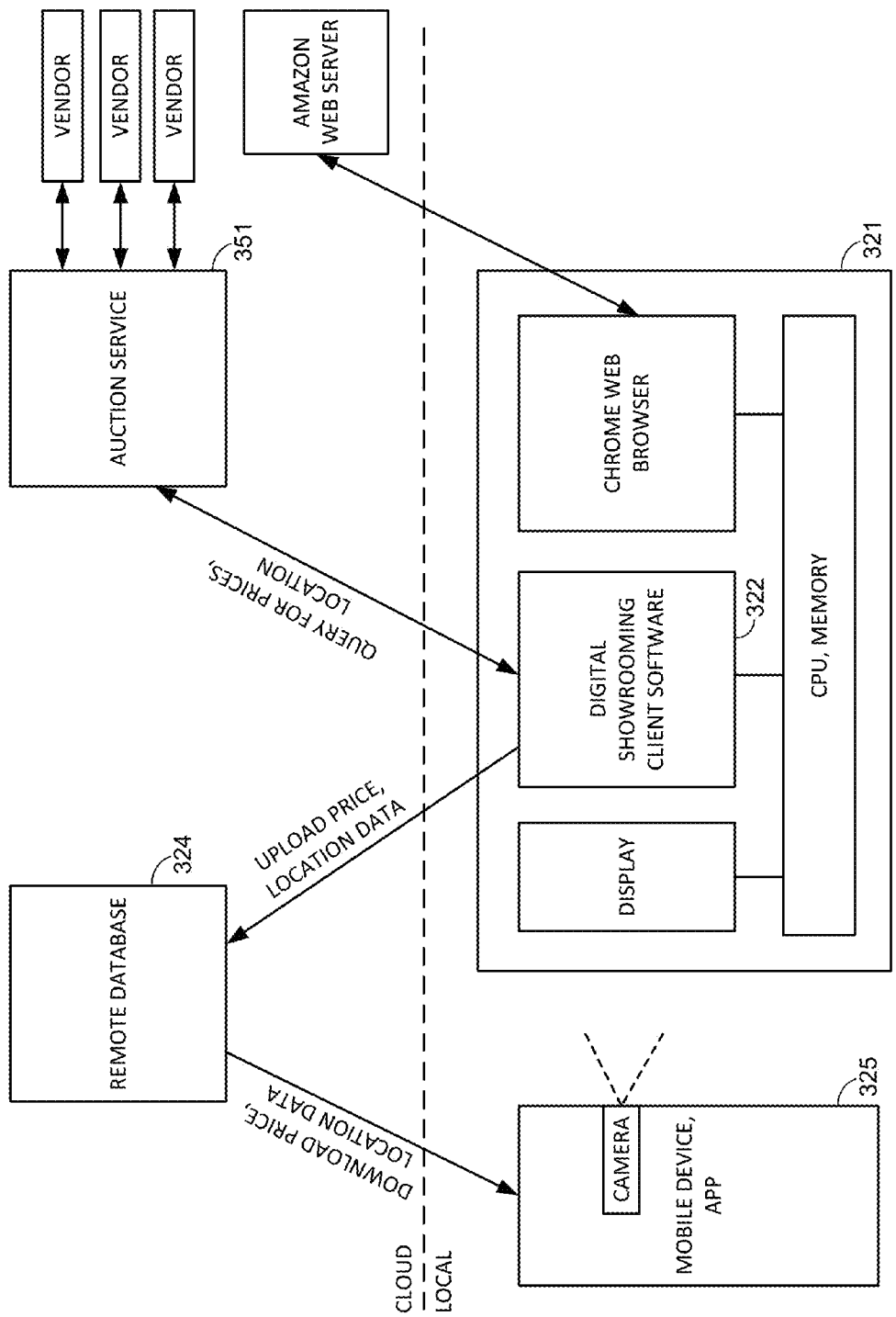
FIG. 35 shows a system according to another embodiment of the technology.

For example, in one variant embodiment, the software presents local availability information for a single merchant, but that single merchant is selected from plural merchants by a behind-the-scenes auction process. When a shopper invokes the present technology to identify alternative vendors, various merchants are alerted of the shopper's seeming interest in purchasing a particular product. Subject to appropriate privacy safeguards, information identifying the product, and optionally the online vendor, the web page, the displayed online price, and/or the delivery terms (and perhaps information about the shopper), is relayed to an auction site that presents this data to a pool of other merchants. They are given a limited time (e.g., 500 ms) to present competing offers. The process administering the auction selects a winning bid, and relays the information back to the shopper using one or the techniques detailed herein. (The process can select the winning bid by a multi-factor formula, which can consider price, local proximity, merchant reviews, and fees paid to the auction service provider—with different weightings, to make a final decision.) FIG. 35 depicts one such system, including an auction service 351 (which receives identification of the desired product from the client application, and communicates with plural vendors to solicit competitive product offers, and bids (e.g., payable to the service) for presenting an offer to the shopper).

In a related embodiment, no auction occurs. But a communication is still made to one or more vendors, e.g., detailing interest by a consumer in a particular product—optionally with other information about the transaction (subject to privacy safeguards). Thus, when Ryan uses the present technology to find local availability for a Samsung UN39FH5000 television, the fact of this search is communicated to Walmart, together with the URL of the Amazon page from which the transaction began, the price of the product from Amazon, Ryan's gender, and his zip code. Such data can be entered into Walmart's CRM (customer relationship management) software, for use in later data mining (e.g., in deciding what products should be stocked in which of its store locations; what age/gender demographic should be targeted by advertising for certain products, etc.). In some embodiments, the detailed information can be provided to one or more vendors, even if no competitive product offering from such vendor(s) was found, or presented to the user.

More generally, the user's interest in a particular product can be communicated to participating local merchants (and perhaps other online retailers) to facilitate their formulation and presentation of special offers to the shopper.

(While noted elsewhere, it bears repeating, that privacy of the user's personal information should be respected. In the detailed embodiments, user data should be employed only in manners pre-authorized by the user.)

Although an emphasis of this disclosure has been finding local retailers carrying a product found on an online-web site, the technology can also be employed to find other online retailers carrying such product.

While OCR, HTML parsing, and image recognition were particularly discussed as means for identifying a product from a web page, other techniques can also be employed. For example, many web page URLs incorporate semantic information (plain text) that helps identify the product promoted by the page. For example, the URL of the Amazon web page for the above-referenced Samsung model UN39FH5000 television is:

--- www<dot>amazon<dot>com/Samsung-UN39FH5000-39-Inch-1080p-Model/dp/B00CALLZK6/ref=sr_1_15?ie=UTF8&qid=1416526396&sr=8-15&keywords=39+inch+1080p+television

---

It will be recognized that this Amazon URL specifies the manufacturer (Samsung), the model number (UN39FH5000), and feature information about the product (39 inch 1080p). The URL also includes the Amazon ASIN identifier (B00CALLZK6), and the user's search terms that led to this product (39 inch 1080p television). Such information can be accessed by the web browser (or browser plug-in), by other software on the computer, and by the operating system. Much of this information can also be OCR'd from the address bar on the screen itself (whether imaged by a phone camera, or scraped from the computer's screen graphics buffer).

Similarly, each time a web page is loaded, multiple cookies are commonly stored on the user's computer. These cookies can include information about the page visited, the search terms the user entered that led to such page, etc. Again, such information can include product-identifying data.

Product identifying data can also be obtained by crowd-sourced human workers, such as those who offer their services through the Amazon Mechanical Turk service. Queries can be presented, and results can be collected, using the published APIs for such service. The URL of the page being viewed by the user can be sent to this service, and a worker can review the page and type product identifying information in response, which is then used to determine local availability.

Amazon sells from a vast catalog of merchandise. But most user searches are believed to target a much more limited set of popular products, perhaps numbering 5,000-10,000.

The Amazon web site is broken into "Departments" (e.g., Car Electronics). For each, Amazon provides a "Best Sellers" link, identifying the most popular items (e.g., an adapter cable for linking the latest Apple iPhone connector to a car's USB jack). The present service can cache data for each of these few-thousand best-selling products, including data by which the associated Amazon web pages can be identified, and even information about availability of the product at different locations of Walmart, Best Buy, etc. (Such availability data may be updated on a daily basis, or more frequently.) When a shopper uses the present technology to find such a best seller locally, the cached data can be consulted—speeding delivery of accurate results.

While the detailed processes were described as starting from an online vendor's web page, this is not required. The present technology can alternately work, e.g., from electronic billboards and even print advertising, provided that suitable techniques are employed to identify the product being promoted.

Still further, the technology can be practiced from entertainment content, such as television, video and movies. In one particular embodiment, text recognition is employed to identify an item depicted in such content. In another, a digital watermark is extracted from the content imagery or audio. The watermark can be an identifier that is resolved, by reference to a first database, to identify the content, and to identify a time-code within the content. With this information, a second database (or the same database) is consulted to identify a product that appears in that content, at that temporal position within the content. By such arrangement, a user can employ a smartphone to quickly determine local price and availability of an item encountered on TV, etc. (Most television is already encoded, by The Nielsen Company, with time-code watermarks of the sort referenced.)

Although watermarking technology was identified as a means for communicating information from, e.g., a desktop computer to a mobile device, watermarking can also be employed to identify the product itself. Product marketing literature, and product packaging, increasingly are being digitally watermarked to provide unambiguous product identification. For example, the plural-bit payload encoded by the watermark can resolve—through a remote database—to a collection of information about the product, including title, UPC/GTIN code, and other product metadata. This enables a user to capture imagery of a product in their kitchen, and learn price and availability information about that product from local vendors, using the arrangements identified above.

Similarly, promotional imagery for products can be digitally watermarked. If the promotional image for a Samsung television is digitally watermarked, and the image is displayed on the Walmart web page for that product (or the Amazon web page), a watermark decoder in the browser, or in a smartphone that captures imagery from the web page, can decode the watermark to obtain unambiguous, deterministic information identifying the product. Again, such information can be used to obtain local price and availability information. (Much of the commercial product imagery found on the web is originated by Gladson, LLC and ItemMaster, LLC. Patent publication 20140304122 details how such imagery can be watermarked, and fingerprinted, at this source of origin.)

Known image recognition techniques can be used similarly to aid in product identification.

In embodiments that use a mobile device to capture imagery, the imagery can be processed to remove certain affine distortions. Imagery of web pages, product packaging, advertising circulars, etc., typically include strong vertical and horizontal edges. Often quadrilateral shapes can also be discerned (e.g., the four edges of a display screen). These landmarks can be used as a guide in warping the image to counteract distortion introduced by the camera's viewpoint. So doing often aids in image recognition, OCR, etc. (If the image content includes a watermark signal, known impulse functions in the watermark signal can be used to reverse affine distortion, as detailed above.)

The user's interest may be determined, in part or whole, from audio information. In some embodiments, the user simply dictates information about a desired product (e.g., "I'm interested in a 32 inch Samsung 1080 p television"). Text output from a speech-to-text module then serves as input data from which a local product search is undertaken.

While certain embodiments referred to a "plug-in" for a web browser, it will be recognized that the detailed technology can be provided as a standard, integral feature of the web browser itself, or as part of other software, or as part of a computer operating system. Such a feature can be enabled (or disabled) during initial setup of the computer (or browser), and operate to examine web pages for product-identifying information. (Such examination can be conducted for all web pages, or only for web pages served from certain domains detailed in a reference list, such as amazon<dot>com and ebay<dot>com.) If product-identifying information is found, the software can check for local availability and pricing, and provide such information to the user on request. In some embodiments, an unobtrusive signal is presented to the user to indicate that the product is available locally. For example, a narrow green bar can be overlaid at the right edge of the screen, or a "LOCAL" button can appear in a top toolbar. When selected, such feature can present the local availability information—either on the device screen, or communicated to another user device, such as a smartphone. (Familiar communication techniques can be employed, including wireless radio, internet, ultrasonic, infrared, zeroconf service, etc. Profile data available to the browser/OS can indicate address information for the user's smartphone device.)

In one particular embodiment, availability of the product locally is signaled by a texture pattern that overlays some or all of the displayed web page. This texture pattern is a non-steganographic watermark pattern, which encodes a plural-bit identifier. The user can employ a smartphone or other device to image and decode the watermark to obtain the local availability information, as detailed herein. The presence of such a texture pattern signals to the user that the product is available locally; its absence indicates no local availability was found.

Computers sold by Walmart, Best Buy, and other vendors having bricks and mortar stores, can be pre-loaded with software that implements the presently-described technology, helping drive a virtuous cycle benefiting local retailers. The software can be provided with social networking hooks, allowing users to Like the software, and otherwise inform their social network friends of the software's usefulness, so as to encourage viral adoption.

In some embodiments, the local availability result information provided to the user includes the number of available units remaining at the local store(s) (e.g., "Only two left"). Software on the user's desktop or mobile device can enable the user to put a "hold" on one or more of these available units. Such action by the user (e.g., undertaken by manipulation of a user interface screen on a user device) causes an electronic reservation message to be sent to the local retailer. In response, the local retailer can pull the requested unit(s) from a shelf or backroom, and move it (them) to a customer service desk near the entrance of the store. On arriving at the store, the user can simply go to the customer service desk to pick up the product(s)—without entering the shopping aisles of the store. If the user does not pick up the unit within a predetermined interval of time (e.g., one or three hours), the store may return the item to its general inventory, for other patrons to purchase.

Depending on the particular implementation, the user may provide payment credentials in advance of arrival at the local store. For example, payment can be made by the same smartphone app used in discovering about local availability. In one exemplary implementation, an electronic wallet (such as the Google Wallet, or applicant's wallet technology detailed in published patent application 20140244514) is debited for the purchase.

Some local stores may provide curbside pickup for products (e.g., via a drive-up service window). A smartphone app used to learn about local availability of the product (or other software) may be authorized to inform the retailer as to the user's progress in driving to the store. When the user arrives at the store (e.g., as indicated by GPS coordinates sent by the app, or by the app's sensing of a beacon signal from the store), store staff can bring the product outside to the user's car.

Some local stores may offer same-day delivery of the product to the user's home or office—either free, or for a delivery charge. Third party local transportation providers, such as Uber and TaskRabbit, can be employed to make deliveries for a nominal charge.

Reference was made to the Walmart API. Its details are proprietary. However, details for such an API provided by Best Buy are available at the https web address:

developer<dot>bestbuy<dot>com/documentation/products-api (The given address is for documentation about the BestBuy Product API. BestBuy also publishes APIs to access information about Stores, Reviews, Categories and Recommendations.)

A copy of the cited BestBuy API web page—somewhat format-butchered due to conversion from HTML—is provided in the Appendix to application 62/083,115. Included in this documentation are sample API calls, e.g., to obtain information based on a product description, or model number.

In some embodiments, APIs from multiple parties may be used. For example, a Walmart API may be used to determine local availability and pricing of a product, and a Yelp API may be used to determine the hours of operation of the local Walmart store.

While the focus of many of the illustrative embodiments has been to identify a product sold on an Amazon web page, and then query Walmart for that product's local availability, the technology can be employed otherwise. For example, once a product on an Amazon web page has been identified, the product information can be provided to the Shopping feature on Google. Google then searches its databases to discover local price and availability of the product (as well as price and availability from other online merchants), and reports same back to the user. Using the arrangements detailed herein, the Google information can be displayed on the same screen used to present the Amazon page (e.g., a laptop screen), or another screen (e.g., a portable device screen).

Similarly, the Microsoft search engine Bing has local product search capability. Unlike Google, Bing's search facility is accessible through API calls, facilitating incorporation of such capability into the present technology. (The Bing data is based on the Krillion database, compiled by Local Corp. Participating retailers include BestBuy, Costco, Express, Fry's, Home Depot, Kmart, Lowe's, Nordstrom, Orchard Supply, Office Depot, Radio Shack, Rite Aid, Sears, Staples, Target, True Value and Walmart.)

Another source of local inventory information is Goodzer, which again provides an API to facilitate queries.

If desired, the information presented by the present technology (i.e., on the computer screen, and/or on the mobile device) can include not just the local price and availability of the product, but also product information (e.g., image, technical specs, consumer reviews, etc.). Also useful is identification of accessories that are frequently-purchased with that product (and their respective local availabilities/prices).

While the detailed arrangement focused on providing comparison shopping information for a product identical to that being viewed on Amazon, in many instances, products with the same or similar specifications, including products from other manufacturers, can suffice. Thus, if a shopper is looking at an Amazon page for a 50 foot roll of green vinyl-coated 1" rabbit wire fencing from the manufacturer Garden Zone, Inc., a 50 foot roll of green vinyl-coated 1" rabbit wire fencing from Jackson Wire Corp. may serve just as well (as might a similar such roll of 2" rabbit wire fencing). Thus, presenting information about the latter product(s) can extend the shopper's ability to obtain quick, local, fulfillment.

In some instances, the product of interest at Amazon is found to be available locally (e.g., at a BestBuy or Walmart location), but is offered for sale at a higher price. BestBuy, Walmart, and many other vendors have price-match guarantees, which allow a shopper to buy the product locally—but at the lower, Amazon price. In such instance, the information presented to the shopper via the user interfaces of the present technology can alert the shopper to such price-matching policy. The software of the present technology can be used to demonstrate the Amazon price to the local vendor. For example, the information transferred to the shopper's mobile device can include a link to the product on Amazon—to facilitate demonstration of the Amazon price by the shopper at the local store. Alternatively, the software can electronically send the Amazon link to the local retailer, so that when the shopper arrives to pick up the product, the retailer has already had time to confirm the Amazon price, and make a price adjustment for the shopper accordingly.

While the detailed technology identified retail locations that have the product of interest in-stock, Walmart and others offer services by which they will move product within their distribution network—on the same day—to ease customer pickup. Thus, if Walmart has a superstore on the edge of town that stocks a television desired by a shopper but is a long drive from the shopper, Walmart can transport the television to a small neighborhood market near the shopper's home or work—where it will be available for pickup after 5:00 pm. The user interface of the above-described software can present such local pick-up options.

It will be recognized that a "cat and mouse" game might develop in which a given web vendor, say Amazon, will take counter-measures if the present technology gains traction. For example, Amazon might try to make its web pages less friendly to automated recognition and data extraction (whether by OCR, HTML-scraping, image recognition, digital watermarking, machine learning, etc.). The present service would anticipate and respond to these counter-measures, e.g., by publishing event-driven updates to the software—similar in philosophy to virus-updating and other types of always-evolving security tools and software.

For example, as indicated above, Amazon presently uses the XML tag productTitle to denote the name of a product, and the present technology can search through the web page HTML looking for the productTitle tag to identify the item of interest to the user. Amazon may change this tag on a daily, or hourly, basis (e.g., to p9a8s7fga and then to ag808ga, etc.) as a countermeasure.

The present technology can employ a server that periodically loads sample Amazon web pages, and identifies the tag used to denote the product title (recognized from the rendered web page by its font size, font color, font boldness, and placement on the page). It can then publish the tag thus-discovered to Digital Showrooming client applications. For example, whenever a client application is used, it can first poll this server to learn the latest product identification tag, and then use that current tag in searching the web page HTML to identify the product title.

Another attack is to present certain identifying information (e.g., product numbers) in fragmentary form, displayed in quick succession with different fragmentary forms. For instance, the earlier-cited Samsung television may be identified as "U 9FH5000" at one instant, "UN 9FH5000" an instant later, "UN3 FH5000" a further instant later, etc. The human eye integrates these fragments into a complete identifier, but single-frame OCR never gets it right. Individual characters can also be decomposed into fragments, such as "H" into "1" and "1" and "-." Such attacks can be countered by accumulating or averaging pixel data over an extended interval (e.g., 50 or 100 milliseconds), and performing OCR on the resultant pixel map.

An online vendor may go so far as block access to its web site to IP addresses known to use the present technology. One of various work-arounds is for devices running the Digital Showrooming client application to be networked and share data with each other. If one device is blocked, it can use a second device as a proxy, to communicate with the online vendor on the first device's behalf. Clients can distribute traffic and share data among themselves, forming a shopping network.

As noted earlier, a web page may be loaded on a machine remote from the user (e.g., a cloud processor). The page can there by rendered on a virtual canvas (i.e., not on a physical display). Data resulting from this rendering (e.g., read from a memory that serves in the role normally performed by a screen buffer) is then OCR'd.

OCR operations typically yield a confidence for each character or word identification. If confidence about recognition of a particular item is below a threshold, the remote machine can zoom the rendering on the virtual canvas, to obtain a higher confidence recognition. More generally, OCR performed at two or more levels of zoom can be performed, and the results combined (e.g., in a confidence-weighted fashion) to yield a final result.

While reference was made to fingerprint-based identification of product images, it will be recognized that fingerprinting can be employed more broadly. For example known text fingerprinting techniques can be used to characterize a web page, and the resulting fingerprint compared with reference fingerprint data to identify the page, and the product to which it most likely corresponds.

Such techniques draw from well-established web indexing technologies, such as are used by Google, and detailed, e.g., in U.S. Pat. No. 7,730,316.

One issue with internet search engines is that some documents are found repeatedly, at many different web sites. One example is a news article distributed by the Associated Press. The same text may be encountered on the web sites of a hundred or more daily U.S. newspapers. To avoid presenting users with hundreds of similar (or identical) search result documents, Google, in its crawl of the web, checks each new document it finds against documents it earlier found, to see if the new document is a near-duplicate of one already in the index. If so, it may still be entered into Google's index, but it is flagged as a redundant entry. By such arrangement, the search engine can avoid presenting search result documents that aren't useful to the user.

In like fashion, the present technology can employ fingerprint techniques to recognize near-duplicates of web pages it has already encountered (whether encountered by crawling, or by interactions with previous shoppers), to enable quick access to associated information earlier determined (e.g., product identify, product pricing, local availability, etc.).

To increase reliability, the present technology can employ multiple strategies to identify the product (e.g., OCR, HTML, image recognition, URL, watermark decoded from product image, image fingerprints, text fingerprints, cookie data, etc.). If operation of one is hindered, operation of another may succeed. If two or more yield apparently valid results, they can be combined, e.g., by weighted voting, to yield a final result. (Weighting may be based on relative confidence of the respective results.)

More sophisticated approaches employ machine learning and Bayesian classifier techniques. For example, all the variant types of information collected through use of the system can be stored in a database (dictionary), together with the product(s) to which each is found to correlate. Supervised learning techniques, such as SVM, can then be employed to establish weighting factors for each such datum, relative to each possible product identification. When certain factors are detected in a new transaction, the classifier combines the corresponding weighting factors to produce a best-evidence statistical assessment of a product's identity.

Through such procedure, some evidence will come to be weighted heavily in identifying a particular product (e.g., a statistically unlikely text string, such as UN39FH5000), while other evidence will be weighted slightly—if at all (e.g., terms such as "television," "shipping" and "Prime.")

While the above paragraph refers to individual text terms, text phrases are also used as evidence. But text is just a small part of the evidence that can be considered by a trained classifier. The evidence also includes all other items of product-associated information referenced in this disclosure. Still other information can also be employed, such as browsing history (if the user has recently visited several pages about coffee grinders, this information helps support a hypothesis that the current product-of-interest is a coffee grinder), date (the possibility that the product-of-interest is outdoor Christmas lighting is greater in November than it is in June), user location (the possibility that the product-of-interest is an air conditioning unit is greater if the user is in Florida than if the user is in Alaska), etc.

Social network information can also be employed. If the user's Social Graph on Facebook shows that two close friends recently liked their purchases of Cole Haan shoes (and especially if an activity log shows that the user saw such information on Facebook within the previous ten minutes), this data can serve as some evidence supporting a hypothesis that the user is currently considering a purchase of Cole Haan shoes.

(Social networking can also be used in the selection and presentation of result information, about local shopping options. If a particular product that is to be listed in the results is the subject of a friend's social network posting, such fact can be identified in the results. Or the results can be presented in an order that is influenced by different items' popularity in the shopper's social network—with those that are most popular being presented more prominently.)

Yet another approach to product identification is by a bag-of-features arrangement, in which available elements of evidence about the user's current product interest are clustered into N (e.g., 1000) groups—each corresponding to a prototypical feature. A vector of occurrence counts of each of the groups (e.g., a histogram) is then determined, and serves as a sort of fingerprint that distills evidence about the product. This vector is then compared to vectors corresponding to known products, to identify a closest match (i.e., based on a Euclidean distance metric).

Bag of features techniques are familiar to artisans and detailed, e.g., in applicant's patent publication 20140293091, and in references identified below.

Evidence of product identification can include information—other than HTML text—drawn from a web page's DOM (Document Object Model). For example, the structure and organization of Amazon's web pages for shoes is different than the structure and organization of its web pages for software. Web page layout can thus serve as a further clue to product identification. So, too, can the order in which elements of the web page are fetched across the network, and the addresses of the servers from which each are fetched (e.g., network traffic analysis).

Moreover, certain of the objects used in assembling a web page have their own metadata. JPEG images, for example, commonly convey header information with various metadata fields. If metadata for an image indicates that copyright in the image is held by Apple, Inc., then this is some evidence that the user is considering an Apple product.

Evidence of product identification can even include encrypted information and other data from which no semantic meaning is evident. For instance, if a cookie with certain encrypted contents is written to a user's computer each time the user views web pages about Nike shoes, and a cookie with the same encrypted comments is written in a latter session, this is evidence that the later session also concerns Nike shoes.

Once a high-confidence product identification has been made, a fingerprint based on the data used in such identification (e.g., web page text, graphics, etc., etc.) can be computed, and stored in a database (dictionary) in association with such product identification, to speed product recognition the next time such data is encountered.

After such a product identification has been made, data about the shopper can assist in enhancing the subsequent shopping experience. For instance, if user history information reveals an interest in organic, or free range, foodstuffs, then the presented local shopping alternatives can take such preference information into account—listing "green" options ahead of non-"green" items.

Such profile information about the shopper can also be employed to enhance the in-store experience, when the shopper travels to a local shop to complete a purchase. For example, Amazon web pages commonly include a section identifying products recently-viewed on that Amazon account ("Recently Viewed Items"). If a shopper uses her work computer to investigate a Netgear router during lunch, and her husband looks at a Sony camera on his tablet using the same Amazon account, and the shopper later uses the family laptop at home to search for a Kingston USB drive, information about all such searches is evident in the "Recently Viewed Items" section of the latter Amazon page. Such previous information can be digested by the present technology's analysis of the HTML from the shopper's at-home laptop session, even though the present technology may not have been active on the shopper's work computer, or the husband's tablet. Subject to user permission, these other interests of the shopper can be shared with a local vendor, e.g., when the shopper commits to make a local purchase of the Kingston USB drive. When the shopper visits the local store to pick up the USB drive, the vendor can alert the shopper that the Netgear router and Sony camera are also available at the same store, and provide in-store pricing and guidance (e.g., map-based directions, on the shopper's smartphone), so that she may inspect these other items on the same trip.

Repeated reference has been made to "local" availability, "local" stores, etc. The bounds of "local" can be set by the user, or by a producer of the technology. Thus, for example, "local" may be set to mean within a circular region of, e.g., 2, 6 or 20 miles in radius, centered on the user's present location.

Sometimes the boundary of "local" will adapt automatically based on context, depending on the density of population, or retailers, surrounding the user. To illustrate, a database of population density may be accessed based on the user's zip code (which can be determined from GPS data using known databases, such as at zipinfo<dot>com and melissadata<dot>com/lookups/), to determine the number of people per square mile. "Local" can then be set to mean the circular area that would encompass 20,000, 60,000 or 200,000 people, given such density. Similarly, "local" can be set by reference to the distance to, e.g., the fifth-nearest U.S. Post Office. For a user in an urban setting, the fifth-nearest U.S. Post Office may be five miles away; for a user in a rural setting, it may be 30 (or 75) miles away.

Instead of being mileage-based, "local" can also be defined in terms of driving time. For example, "local" may mean that the commute time needed to reach a location is less than or equal to the commute time to, e.g., the second-nearest Walmart store. Services such as Google Maps, Bing Maps and Apple Maps can be queried for such driving time information.

The disclosure also referred to a window with "low opacity." Low opacity, as used herein, means less than 25% opacity. "Very low opacity" means opacity of 10% or less.

Reference was also made to a mobile device being in a "sleep" state. Such term is used to refer to an operational condition in which the display screen of the device is inactive (dark), and one or more other power-saving strategies have been taken. For example, GPS may be disabled. The main processor may be in a reduced-power state. Wireless transceivers such as Bluetooth and/or WiFi may be disabled, or operate on a reduced duty cycle.

Presently, phones can perform processing of motion and microphone sensor data while in a sleep state (e.g., phones using the Snapdragon/Hexagon heterogeneous architecture referenced herein). Extension of such capability to image processing is underway, and is expected to be commercialized within about three years. When such capability is available, some or all of the component product recognition operations may be completed while the phone is in a sleep state. The wireless transceiver may be woken as necessary, e.g., to learn about local availability. In such an implementation, the screen can be activated only if the product is available locally. If the product is not available locally, such fact can be signaled to the user by a lower power means, such an audio buzz or vibration.

Reference was made earlier to a screen watermark that conveys a user's public key (or a computer's public key) to a mobile device. The mobile device can use this key in various ways. One is simply as an identifier of the user or computer, e.g., to index a table or other data structure to access related information (such as user profile data, an IP address for the computer, etc.).

Additionally, or alternatively, the mobile device can use the public key to engage in cryptographically-secure communications with the computer. For example, the mobile device can verify a digital signature accompanying information sent by the computer (which was created with the computer's secret private key). Or the mobile device can use the public key to encrypt information sent to the computer, so that it can be decrypted only by the computer (again, with the computer's secret private key).

While the detailed embodiments contemplated that app software on a mobile device, or a browser plug-in on a laptop, would perform certain of the detailed functionality, in other embodiments these functions can naturally be performed otherwise—including by operating system software on such devices, by a server (e.g., at a social networking service), by another smartphone or computer device, distributed between such devices, etc.

In embodiments that work from imagery captured by a mobile device, the imagery can be captured and processed in response to a user's action—such as pressing a physical or on-screen button. Desirably, however, the mobile device is context-aware, and captures imagery and initiates the detailed functionality whenever circumstances seem to merit. For example, accelerometers and/or other sensors in the phone can detect that the phone has been moved, within the past 700 milliseconds, and is being held approximately stationary. Imagery from the cameras can then automatically be collected and examined. As noted, computer screens have distinctive color characteristics, e.g., due to the use of red, green and blue (R/G/B) phosphors in CRT display tubes, R/G/B color filters in LCD displays, etc. Detection of such unique chromatic characteristics in the captured imagery signal that the mobile device is pointing at another screen. This conclusion can alternatively be reached, or can be confirmed, by noting temporal strobing of the image, or associated rolling shutter artifacts—due to the progressive scanning or refreshing of the display. If imagery of such type is detected, a frame of captured imagery can be OCR'd to discern the presence of a dollar symbol, and/or the name or logo of one of several online merchants (or other keywords, such as "Prime")—indicating the user is online shopping. If such indicia of shopping is found, the remainder of the detailed comparison shopping process is launched, providing an experience in which the device seems to be operating by intuition.

In other embodiments, the presently-detailed functionality is integrated into other applications, e.g., an application whose functionality includes compiling shopping lists, or an application that issues reminders based on the user's geographic location.

When a user is presented comparison information about a product from a local merchant, the user can take an action—such as thru a graphical user interface (e.g., touching a "Choose This" button, or a gesture—that triggers addition of that product to a shopping list (or cart) for that merchant. (Alternatively, transfer of the information to the mobile device can serve to automatically add the product to a shopping list or cart.) Still further, the action can cause an alert to be set to remind the user of the product, whenever the user is within a certain distance (e.g., less than a mile, or less than 100 yards) from the local merchant's store. The software can present a map detailing locations where all products chosen through use of the technology are waiting to be picked-up, allowing the shopper to visualize how such pick-ups might be included with other planned trips around town. The software can propose an optimum route to visit all the locations, using known linear programming-based vehicle routing methods.

Regarding the twitch gesture, the detailed detection procedure can be employed for purposes other than initiating a content recognition operation (whether by watermark decoding or otherwise). For example, the detailed twitch can be used as user input to a process performed by a remote computer (e.g., a "cloud" computer), e.g., signaling that such a process should start, or stop, or signaling the user's agreement—or disagreement—that a process should continue.

Still further, the detailed twitch-detection procedure isn't limited to use with smartphones. The same principles can be applied elsewhere, e.g., to ring- and wristwatch-like devices (worn on the user's finger or wrist), etc.

To keep this specification concise, as required by the Patent Act, applicant has omitted certain mundane details that are straightforward to artisans implementing such technology. For example, in a case noted above, in which other artwork on a web page confuses a smartphone watermark detector and prevents a watermark from being read—prompting a browser plug-in to present a different watermark pattern instead—it will be recognized that various communications between devices are not expressly mapped. As artisans will understand, in this instance the smartphone must indicate to the browser plug-in, or to a remote system, that no watermark has been detected. The browser plug-in then requests from a remote system (or the remote system sends to the plug-in without such a request) an alternate watermark block pattern for use on the display screen. Metadata associated with the former watermark payload is copied into a database record for the alternate watermark payload. Such routine back-and-forth movement of information to where it is needed is inherent in this specification's descriptions of the technology, as understood by artisans in the field.

As should be evident, the technology detailed herein finds utility with all manner of devices—both portable and fixed. Tablets, laptop computers, digital cameras, wrist- and head-mounted systems and other wearable devices, servers, etc., can all make use of the principles detailed herein.

Particularly contemplated mobile devices include the Google Glass product; the Apple iPhone 6; smartphones following Google's Android specification (e.g., the Galaxy S6 phone, manufactured by Samsung, and the Google Moto X phone, made by Motorola), and Windows 8 mobile phones (e.g., the Nokia Lumia 1020).

Details of the Apple iPhone, including its touch interface, are provided in Apple's published patent application 20080174570.

The design of smartphones and other computers referenced in this disclosure is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee, Thread or Bluetooth, and/or wired, such as through an Ethernet local area network, etc.).

The processes and system components detailed in this specification can be implemented as instructions for computing devices, including general purpose processor instructions for a variety of programmable processors, such as microprocessors (e.g., the Intel Atom, the ARM A5, the Qualcomm Snapdragon, and the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. As noted, cloud computing resources can be used as well. References to "processors," "modules" or "components" should be understood to refer to functionality, rather than requiring a particular form of implementation.

A particular implementation employs the Qualcomm Snapdragon platform (system on a chip), such as one of the 800-series (e.g., the 805, model APQ8084). These devices include the low power Hexagon CPU/DSP (e.g., version QDSP6V5A). The Qualcomm Hexagon SDK development environment enables an artisan to code the Hexagon processor to execute the functionality described herein. Processing of the phone sensor data to discern Justap gestures desirably uses the Snapdragon Sensor Engine (aka Snapdragon Sensor Core). Image processing in such hardware environment can employ Qualcomm's FastCV computer vision library of software (i.e., the FastCV SDK).

An alternative to Qualcomm Snapdragon implementations are implementations using the Kirin 920 series devices by HiSilicon. Like the Snapdragon family, the Kirin 920 series devices employ a DSP that helps integrate and process data from different smartphone sensors.

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by non-transitory tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Another form of implementation is electronic circuitry that has been custom-designed and manufactured to perform some or all of the component acts, as an application specific integrated circuit (ASIC).

To realize such an implementation, the technology is first implemented using a general purpose computer, using software such as Matlab (from Mathworks, Inc.). A tool such as HDLCoder (also available from MathWorks) is next employed to convert the MatLab model to VHDL (an IEEE standard, and doubtless the most common hardware design language). The VHDL output is then applied to a hardware synthesis program, such as Design Compiler by Synopsis, HDL Designer by Mentor Graphics, or Encounter RTL Compiler by Cadence Design Systems. The hardware synthesis program provides output data specifying a particular array of electronic logic gates that will realize the technology in hardware form, as a special-purpose machine dedicated to such purpose. This output data is then provided to a semiconductor fabrication contractor, which uses it to produce the customized silicon part. (Suitable contractors include TSMC, Global Foundries, and ON Semiconductors.)

Essentially all of the functions detailed above can be implemented in such fashion, e.g., decoding a watermark payload from captured imagery, recognizing twitch gestures, querying databases, etc. However, because the resulting circuit is typically not changeable, such implementation is best used for component functions that are unlikely to be revised.

As indicated above, reference to a "module" that performs a certain function should be understood to encompass one or more items of software, and/or one or more hardware circuits—such as an ASIC as just-described.

As indicated, different configurations of the functionality can be implemented on different devices. For example, in a system in which a smartphone communicates with a computer at a remote location, different tasks can be performed exclusively by one device or the other, or execution can be distributed between the devices. OCR, twitch recognition, and extraction of watermark information from imagery, are examples of processes that can be distributed in such fashion. Parsing web page data for metadata is another. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud, distributed, etc.

As noted, the present technology can be used in connection with wearable computing systems, including head-worn devices. Such devices typically include one or more sensors (e.g., microphone(s), camera(s), accelerometers(s), etc.), and display technology by which computer information can be viewed by the user—either overlaid on the scene in front of the user (sometimes termed augmented reality), or blocking that scene (sometimes termed virtual reality), or simply in the user's peripheral vision. A head-worn device may further include sensors for detecting electrical or magnetic activity from or near the face and scalp, such as EEG and EMG, and myoelectric signals—sometimes termed Brain Computer Interfaces, or BCIs. (A simple example of a BCI is the Mindwave Mobile product by NeuroSky, Inc. Another is the Muse headband by Interaxon.) Exemplary wearable technology is detailed in U.S. Pat. No. 7,397,607, 20100045869, 20090322671, 20090244097 and 20050195128. Commercial offerings, in addition to the Google Glass product, include the Vuzix Smart Glasses M100, Wrap 1200AR, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

Embodiments of the present technology can also employ neuromorphic processing techniques (sometimes termed "machine learning," "deep learning," or "neural network technology"). As is familiar to artisans, such processors employ large arrays of neuron-like elements—interconnected to mimic biological synapses. Such processors employ programming that is different than the traditional, von Neumann, model. In particular, connections between the circuit elements are weighted according to correlations in data that the processor has previously learned (or been taught). When a pattern of data (e.g., a set of image or other sensor data) is applied to the processor (i.e., to inputs of several of the circuit elements), certain nodes may spike while others remain relatively idle. Each of these nodes may serve as an input to plural other circuit elements, triggering further spiking in certain other nodes—a chain reaction that ultimately provides signals to output nodes to indicate the results of the neuromorphic processing. (In addition to providing output signals responsive to the input data, this process can also serve to alter the weightings, training the network to better respond to certain patterns that it has seen (i.e., processed) before.) Such techniques are well suited for pattern recognition applications, among many others.

Additional information on such techniques is detailed in the Wikipedia articles on "Machine Learning," "Deep Learning," and "Neural Network Technology," as well as in Le et al, Building High-Level Features Using Large Scale Unsupervised Learning, arXiv preprint arXiv:1112.6209 (2011), and Coates et al, Deep Learning with COTS HPC Systems, Proceedings of the 30th International Conference on Machine Learning (ICML-13), 2013. These journal papers, and then-current versions of the "Machine Learning" and "Neural Network Technology" articles, are attached as appendices to patent application 61/861,931, filed Aug. 2, 2013.

OCRing and screen-scraping are familiar to artisans. A particular tool that performs both functions is the Screenshot Reader product offered by ABBYY USA. The present software can launch this tool to capture a screen shot of the web page being displayed, and to produce ASCII corresponding to the displayed text. Another tool that is well-adapted for OCRing in iOS and Android environments is Tesseract, free software available under the Apache open source license.

Applicant's Discover app, and related technology are detailed, e.g., in published patent applications 20110212717, 20110161076, 20120208592, 20130311329, 20140052555, and 20150016712.

Image recognition techniques suitable for use with the present technology are well known. SIFT, SURF, ORB and CONGAS (sometimes termed image fingerprinting) are some of the most popular algorithms. (SIFT, SURF and ORB are each implemented in the popular OpenCV software library, e.g., version 2.4.9. CONGAS is used by Google Goggles for that product's image recognition service, and is detailed, e.g., in Neven et al, "Image Recognition with an Adiabatic Quantum Computer I. Mapping to Quadratic Unconstrained Binary Optimization," Arxiv preprint arXiv: 0804.4457, 2008.)

Still other fingerprinting techniques are detailed in patent publications 20090282025, 20060104598, WO2012004626 and WO2012156774 (all by LTU Technologies of France).

Yet other fingerprinting techniques are variously known as Bag of Features, or Bag of Words, methods. Such methods extract local features from patches of an image (e.g., SIFT points), and automatically cluster the features into N groups (e.g., 168 groups)—each corresponding to a prototypical local feature. A vector of occurrence counts of each of the groups (i.e., a histogram) is then determined, and serves as a reference signature for the image. To determine if a query image matches the reference image, local features are again extracted from patches of the image, and assigned to one of the earlier-defined N-groups (e.g., based on a distance measure from the corresponding prototypical local features). A vector occurrence count is again made, and checked for correlation with the reference signature. Further information is detailed, e.g., in Nowak, et al, Sampling strategies for bag-of-features image classification, Computer Vision-ECCV 2006, Springer Berlin Heidelberg, pp. 490-503; and Fei-Fei et al, A Bayesian Hierarchical Model for Learning Natural Scene Categories, IEEE Conference on Computer Vision and Pattern Recognition, 2005; and references cited in such papers.

A color histogram-based image recognition arrangement is detailed in applicant's U.S. Pat. No. 8,004,576.

Use of such identification technologies to obtain object-related metadata is familiar to artisans and is detailed, e.g., in applicant's patent publication 20070156726, as well as in U.S. Pat. Nos. 6,947,571 and 7,206,820.

Applicant's other work that is relevant to the present technology includes that detailed in patent documents 20120214515 and 20140164124.

The task of identifying a product is akin to other media identification tasks. Accordingly, relevant teachings to implement the present technology can be drawn from other media identification technologies. Examples include Attributor's work in identifying pirated text (e.g., U.S. Pat. No. 8,707,459), and the work of ExBiblio/Google in identifying documents from text fragments (e.g., publication 20060122983).

This specification has discussed several different embodiments. It should be understood that the methods, elements and concepts detailed in connection with one embodiment can be combined with the methods, elements and concepts detailed in connection with other embodiments. While some such arrangements have been particularly described, many have not—due to the large number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

The present specification should be read in the context of the cited references. Those references disclose technologies and teachings that the applicant intends be incorporated into embodiments of the present technology, and into which the technologies and teachings detailed herein be incorporated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The claims submitted with this application address just a small fraction of the patentable inventions disclosed herein. Applicant expects many more, and broader, claims will be issued from this patent family.

In view of the wide variety of embodiments to which the principles and features discussed above can be applied, it should be apparent that the detailed embodiments are illustrative only, and should not be taken as limiting the scope of the invention. Rather, applicant claims as the invention all such modifications as may come within the scope and spirit of the following claims and equivalents thereof.

APPENDIX

Specification of Allowed U.S. Application Ser. No. 14/522,150, Filed Oct. 23, 2014, Published as 20150278980

Revised to Follow Figure Numbering of Preceding Specification

SCREEN WATERMARKING METHODS AND ARRANGEMENTS

Introduction

Digital watermark technology can facilitate in-person sharing of digital content.

Without digital watermarking, if a first person wants to find and obtain a copy of content displayed on a second person's desktop computer monitor or smartphone display (e.g., a game, a video, or a blog post), there is no straightforward way to do so.

The first person might verbally ask the second person for a URL, and then write it down to access later. But that's slow and error-prone.

Or the first person could ask the second person to send a URL (or the content itself) to an account of the first person, such as by text, email, a social networking account (e.g., Reddit, Digg, Pinterest, etc.), or by a proprietary data exchange technology (e.g., Apple's AirDrop or iCloud, or Google Drive). But that can also be tedious. Moreover, it involves interrupting the second person's activity and launching an associated communication tool on the second person's device.

Digital watermarking can be employed to enable the first person simply to snap an image of the second person's display screen with a smartphone, and obtain a copy of the content by reference to the captured imagery. (Software in the smartphone processes the captured imagery to decode an identifier of the displayed content (e.g., a URL), and then uses the smartphone browser to load the identified content.) The first person obtains a copy quickly, without disrupting the second person.

While such functionality has been possible in a technical sense for many years (e.g., as in patent publication 20100226526), various impediments have made it difficult as a practical matter.

One issue has been the task of encoding the content with the necessary digital watermark information. Each content author needed to take the extra step of adding a watermark to the content.

In accordance with one aspect of the present technology, the task of watermark encoding is not left to the content author. Instead, a watermark (e.g., specifying a URL for the content) is encoded in the displayed content without involvement of the content author.

Another issue has been one of physical scale, due to the differently-sized screens on which content might be displayed.

Imagery captured from a five inch smartphone display will represent an embedded digital watermark pattern at a much smaller scale than the same imagery captured from a 21 inch desktop monitor, posing difficulties to watermark decoding. (Related issues arise when a user re-sizes a display window, or uses a control to zoom-in or -out on displayed content.)

In accordance with another aspect of the technology, the physical scale of a digital watermark in electronic imagery is de-coupled from the physical size of the digital display (or the size of the display window, or the zoom level).

Watermarking is most commonly implemented in the content-creation process. U.S. Pat. No. 6,899,475, however, details an alternate approach—in which watermark encoding is performed in the rendering process (i.e., the process of outputting content to viewable form). In the patented system, a printer executes an interpreter that rasterizes PostScript-defined imagery for printing on paper. The interpreter also generates a pattern corresponding to a desired payload, computes a mask identifying excerpts of the imagery that can be modified without visual artifacts, and modifies the rasterized output to steganographically encode the pattern—processed with the mask—in the printed output. Such arrangement, however, is computationally intense.

Another alternate approach is used in digital cinema. The arrangement is similar to the Postscript printer example, except that the masking data is computed as part of the content creation process, and is then co-conveyed with the MPEG data stream. At the time of rendering, a processor generates a pattern corresponding to a desired payload (e.g., indicating the date, time and place of rendering), weights this pattern with the masking data, and combines it with the MPEG image data for rendering on a projection screen. This arrangement, however, burdens the content creation task.

In accordance with a further aspect of the present technology, watermarking is performed during rendering, but without the complexity of the foregoing techniques.

Cascading Style Sheets (CSS) is a style sheet language familiar to artisans, used for describing the look and formatting of a document written in a markup language. While most often used to style web pages and interfaces written in HTML and XHTML, the language can be applied to any kind of XML document. CSS serves primarily to enable the separation of document content from document presentation, including elements such as the layout, colors, and fonts.

In accordance with still another aspect of the present technology, CSS is employed to include a watermark pattern as part of a document's presentation at the time of rendering. The CSS instructions can define not only the size of the presented watermark pattern (e.g., the size of the component watermark tile), but can also specify the desired watermark tile by payload, or other parameter. This allows documents to be dynamically marked with different watermark patterns (e.g., triggering different actions), based on various factors, such as context.

The foregoing and a great variety of other features and arrangements will be more readily apparent from the following Detailed Description, which proceeds with reference to the accompanying drawings.

BRIEF DESCRIPTION OF THE DRAWINGS

FIGS. 37A, 37B and 37C show an image, watermarked using prior art methods, displayed on three different display devices.

FIGS. 38A, 38B and 38C show the differing scales of component watermark blocks in FIGS. 1A, 1B, and 1C, respectively.

FIGS. 39, 39B and 39C illustrate an aspect of certain embodiments of the present technology: consistent image watermark block size across different display devices.

FIG. 40 shows that the scale of a component watermark block is substantially consistent across all of FIGS. 3A, 3B and 3C.

FIGS. 41A and 41B illustrate that a translucent watermark image can be added atop other imagery (or that a flat watermark image and other imagery can be blended).

FIGS. 42A and 42B show a web page displayed at zoom levels of 75% and 110%.

FIG. 43A shows an example of CSS instructions used with one aspect of the present technology.

FIG. 43B shows an example of JavaScript instructions used with one aspect of the present technology.

FIG. 43C shows an example of HTML instructions used with one aspect of the present technology FIGS. 44A, 44B, and 44C show text in a display window, with zoom levels of 100%, 90%, and 110%.

FIG. 45 shows CSS instructions for use with the Firefox browser.

FIG. 46 illustrates an exemplary lookup table data structure, by which captured image content can be associated with online content.

FIG. 47 illustrates how a uniform pattern of dots appears distorted, based on the shape of a surface onto which it is projected.

DETAILED DESCRIPTION

Digital watermark technology is widely used in electronic and print media, e.g., to enable a smartphone to link to associated content. For example, a page in a magazine article may be digitally watermarked with a URL of a web site that has further information related to the subject of the article. A user captures an image of the printed page with the smartphone camera, and software extracts the URL and links to the corresponding web page. Such arrangements are detailed, e.g., in U.S. Pat. Nos. 6,947,571 and 8,620,021.

In print media, a digital watermark signal typically takes the form of a rectangular block pattern, about an inch on a side, which is repetitively tiled across the printed content. The pattern serves to vary the luminance or chrominance of the underlying print content to a very small degree—too small to be noticeable to a human viewer under normal conditions, but detectable by computer analysis of camera-captured imagery. Each block pattern encodes a data payload of about 50 or 100 binary bits. The tiling of many such identical block patterns across the print media allows the payload to be recovered from camera imagery captured from any location on the page; e.g., an 8×10" printed page may have 80 such watermark blocks across its extent. (Exemplary watermark technology is detailed in U.S. Pat. Nos. 6,590,996 and 8,199,969.)

Watermark detection software, such as on a smartphone, expects the watermark in captured imagery to be of a certain physical scale (e.g., corresponding to a camera-to-page viewing distance of six inches). However, the detector is robust to a range of scale states, e.g., varying between about 50% and 200% of the nominally-expected values. Thus, a print watermark may be read from a distance not just of six inches, but anywhere in a range of three to twelve inches.

The scale of a print watermark is fixed at the time of printing. The physical page size does not later change.

The situation is different for watermarks found in electronic imagery, such as at online web sites and videos. Such electronic imagery may be displayed on a 5 inch smartphone screen, or on a 21 inch desk monitor. Moreover, the user may cause the size of the rendered content to vary, such as by changing the size of a window in which the electronic content is presented, or by zooming-in/zooming-out. These actions can cause extreme variations in the physical scale at which the electronic imagery is displayed, and subsequently captured.

Like print imagery, electronic imagery is typically watermarked using tiled pattern blocks. But the size of each block can vary over a very large range, depending on the just-noted display conditions. While digital watermark detection software is robust across certain scale ranges, it is not suited for the 10:1, or more, variations in scale that may occur with display of electronic content.

This phenomenon is depicted in FIGS. 37A-37C, which show the familiar image of the American flag being raised on Iwo Jima. The image is encoded with a digital watermark, in conventional fashion (illustrated as dashed-line squares across the image, but essentially imperceptible to humans). When the image is shown on a smartphone display (FIG. 37A), it appears at a diagonal scale of about five inches. When the same image is shown on a tablet or desktop display (FIGS. 37B, 37C), it appears at a diagonal scale of about 12 or 21 inches, respectively.

The watermark pattern similarly scales with the image into which it is embedded. Thus, the width of a component watermark tile is about a half-inch in FIG. 37A, versus about 1.2 inches in FIG. 37B, and 2.3 inches in FIG. 37C. These different watermark scales are shown in FIGS. 38A-38C.

A similar scaling effect may occur if a window presenting the image, in the desktop display screen of FIG. 37C, is resized (e.g., by clicking a corner of the window and dragging, as is familiar from graphical user interfaces). Similarly, the rendering software may allow the user to zoom-in or zoom-out on the image, again changing the scale of the embedded watermark pattern.

FIGS. 39A-39C show the same image and watermark, in accordance with an aspect of certain embodiments of the present technology. In the depicted arrangement, the watermark is not encoded into the image data. Rather, it is separate. For example, the rendering software that controls presentation of information on the screen may present the watermark pattern as a translucent overlay, together with presentation of the underlying Iwo Jima image. (Blending of the Iwo Jima image with a watermark image of the same size, in a weighted arrangement—such as by weighted averaging—is another way this operation can be performed.)

Regardless of the size of screen on which the imagery is presented (e.g., smartphone, tablet, or desktop computer), the block size of the watermark pattern is maintained substantially constant. FIG. 40 shows the size of the resulting watermark block; it is essentially unchanged, irrespective of the display size. ("Substantially," as used herein, means within 20% of its original value. "Essentially" means within 10%.)

In the illustrated example, the resulting watermark block is one inch across. (In typical implementations, the watermark block may range from a half inch to two inches in width—or from about 5% to 20% of the longest physical dimension of the display screen, although values outside this range can also be used.) This block size is also maintained substantially constant despite re-sizing of display windows, and zooming.

Such arrangement is further illustrated in FIGS. 41A and 41B. In both, an image of a cat is blended, in weighted arrangement, with a similarly-sized frame of digital watermark pattern. In this case the watermark pattern appears—on human viewing—to be a flat, mid-grey. (There are actually subtle variations that escape human notice in the luminance or chrominance of the grey pixels across each of the component watermark blocks; it is these variations that encode the watermark payload.)

In FIG. 41A, there is a 90/10 weighting between the cat and the grey watermark images. In FIG. 41B, there is a 75/25 weighting between the cat and watermark images. (A 100/0 weighting is not visibly different than FIG. 41A, when rendered in the bitonal form of patent drawings; a 0/100 weighting appears as a flat gray frame.)

While the techniques of blending/overlay with a watermark frame can be used with any web content, other arrangements can also be used. One such alternative is next described, in the context of an online blog entry.

Blogging sites have gained enormous popularity since their introduction in the 1990s. The most popular at the time of this writing is WordPress, which serves here as an exemplary platform. Other popular blogging sites employ similar constructs. WordPress is familiar to those skilled in the art, so its operation is not much belabored.

One of the features that makes WordPress popular is its ease of use. Even those with nil experience in web authoring can put together a WordPress blog. In large part, this is due to its use of "templates" that define standardized structural features of the web presentation. By selecting different templates, a user can quickly re-cast the user's content into different forms, with various layouts, colors, fonts, etc. Collections of such features are termed a WordPress "theme."

To create a blog using WordPress, a user is prompted to pick a theme, and next enter text and pictures. WordPress then automatically authors and publishes a web page, with the user-submitted text and photos presented in a layout defined by the theme.

FIG. 42A shows such a web page 60. This theme includes a user-selected banner artwork 62' at the top of the page, and user-entered text 64 in a blog entry 65. (As is familiar, such a blog site typically presents several blog entries—commonly arranged by date or topic. Only one blog entry 65 is shown in FIG. 42A. If the blog entry is more than a paragraph or two, the page 60 commonly presents just the first part of the blog entry, with a "Read More" link that causes the web browser to load a new web page where the blog entry is presented in unabridged form.)

The remainder of the displayed web page is established by the user-selected theme, i.e., data stored in the corresponding template. This includes the size and font of the type for the user-entered text 64, the rectangular shape of the blog entry 65, the positioning of the blog entry relative to the banner artwork, a first textured pattern 66 that serves as a background for the blog entry (over which the blog text 64 is presented), and a second textured pattern 68 that serves as a background for the web page (over which the blog entries 65 are presented). There is a considerable amount of software instructions (e.g., HTML and the like) in the template that defines all of this layout and structure, but such detail is not typically exposed to the user.

In accordance with another aspect of the present technology, the background pattern(s) in such a web page is digitally watermarked. (Indeed, such a pattern may comprise a pure watermark pattern—with its random-seeming encoding of machine-readable data amplified to a level where it serves as a visible and aesthetically interesting texture pattern. Alternately, the watermark may be applied to a practically flat background, which appears to the user not to carry data, except under close scrutiny.)

In FIG. 42A, the pattern 68 that serves as the background to the web page is watermarked with payload data that causes a smartphone, when it captures an image of such pattern, to link to the blog web page. (One of the component blocks of this second watermark pattern 68 is outlined as item 69 in FIG. 42A.) The pattern 66 that serves as the background to the blog entry is watermarked with payload data that causes a smartphone, when it images such pattern, to link to the expanded blog entry (i.e., the expanded entry that results when the user clicks the "Read More" link at the bottom left of the blog entry 65).

As with the earlier-discussed examples of FIGS. 37A-C, and 41A-B, the physical size of the presented web page 60 of FIG. 42A will vary depending on the size of the display device, the size of the display window, and any zoom parameter with which the web page is viewed.

The FIG. 42A web page is displayed at a zoom level of 90%. FIG. 42B shows the same web page, with a zoom level of 125%. Note that the banner artwork 62, the text 64, and the size of the blog entry 66, are all proportionately larger.

But also note that the pattern 68, and the component block 69, are presented at the same scale in both FIGS. 42B and 42A. Although not as evident, the background pattern 66 is also presented at the same scale. These are the watermark patterns, whose scale is maintained substantially constant, despite zoom level, window size, and physical size of the display device.

FIGS. 43A-43C show one way of achieving such behavior, for the Google Chrome and Microsoft Explorer browsers.

FIG. 43A shows an excerpt of the CSS instructions for the web page of FIGS. 42A and 42B. As noted, CSS instructions are commonly used to define the look and formatting of documents authored in a markup language (e.g., XML, HTML).

The particular CSS instructions shown in FIG. 43A define a background watermark pattern, termed wm1. The background is characterized by a URL (which points to a data repository that stores data defining a watermark pattern block), and a size of the component block (in pixels). This URL and size data are inserted between the paired /* and */ markings in the Figure. (While the URL may point to a remote machine, it need not; the block pattern may be stored on the user's machine.)

Similarly, the CSS instructions include parameters for the div where the background watermark will appear.

A div is an HTML construct by which online content can be divided (thus the name) into different parts, e.g., to which different formatting can be applied. In FIG. 42A, the rectangular area of the depicted blog entry 65 is one such div. The watermark information just-noted forms part of this div's definition. FIG. 43A indicates that other parameters of the div, such as its width and height, are also detailed in the CSS instructions (again, inserted between the /* and */markings).

FIG. 43B shows JavaScript instructions defining a function redraw( ). These instructions start by defining variables desiredTileWidth, wmDiv, and ratio.

The first of these, desiredTileWidth, is the size at which the watermark blocks should be maintained, in pixels. (Again, the parameter is inserted between the /* and */.) The second, wmDiv, establishes the specific div that contains the watermark blocks as background. This variable is set equal to the value document.getElementByID("wm1")—a W3C convention for obtaining a reference to an element by its ID.

The third variable, ratio, is a factor by which the watermark block should be changed in size. As will be apparent, here the block size is changed based on the zoom factor (or display size or window size) so as to maintain a substantially fixed block size in all cases. In particular, the JavaScript code of FIG. 43B defines the variable ratio to be a value equal the fraction window.innerWidth divided by window.outerWidth.

Window.innerWidth is the pixel width of the content being displayed within a browser window. If a user zooms-in on the content, a smaller pixel width-portion of the content will be displayed (albeit at a greater size), so this value diminishes. Window.outerWidth, in contrast, is the pixel width of the browser window. This value does not vary with zoom factor.

This may be made clearer by reference to FIGS. 44A-44C. All of these figures show an identically-sized window, having a window.outerWidth value of 1440 pixels. Each shows four lines of text as the displayed content. (The arrows are not part of the displayed content; nor are the vertical and horizontal lines that serve as graticule markings.)

The top text line in each window gives two values of "width." The first is the pixel size of the content displayed within the window (i.e., window.innerWidth); the second is the pixel size of the window (i.e., window.outerWidth, or 1440).

In FIG. 44A, the content is displayed at 100% scale. Both of the width parameters are 1440.

In FIG. 44B, the content is zoomed-out, with a zoom value of 90%. As the window is zoomed-out, the size of the content shrinks. Thus, the text shown in FIG. 44B is smaller than in FIG. 44A. (This is illustrated by the overlaid black arrow, which points to the colon in the last line of text; note that it shifted to the left between FIGS. 44A and 44B.) Because the content is physically reduced in size, more of it fits within the depicted window. Thus, the first of the width parameters (in the first line of text)—the pixel width of content displayed within the window—is now 1600, instead of 1440.

FIG. 44C shows the opposite situation, with the content zoomed-in, here at a value of 110%. Reciprocally, the text shown in FIG. 44C is larger than in FIG. 44A. The black arrow (indicating the colon in the last next line) has shifted to the right. Because the content is enlarged in size, less of it fits within the window. Thus, the first of the width parameters (window,innerWidth) is now 1310, instead of 1440.

Each of FIGS. 44A-44C also shows, in the third line of text, the value of the ratio variable referenced in FIG. 43B. For FIG. 44A, it is 1; for FIG. 44B, it is 1.1111; and for FIG. 44C it is 0.9097.

This ratio is the factor by which the size of the watermark block needs to be changed, to counteract changes in size of the displayed content due to zooming. Thus, for example, in FIG. 44B, the displayed text has shrunk in size. To prevent the watermark blocks from shrinking by a similar amount, they must have an original scale of 1.1111 times their nominal size. (The nominal size may be one inch on a side, e.g., 72 pixels on a 72 dpi display, so the adjusted block should have a scale 1.1111 times this value, or 80 pixels.) When the shrinking factor exhibited by the text is likewise applied to such a watermark block, it is presented at its nominal scale, i.e. one inch in width.

Desirably, the re-sized block of pixels that make up a watermark block is an integral number of pixels in width. Due to this quantization to an integer value, there will be some variability in the physical size of the watermark block, at different zoom values. In the example just-given, the block will be 80 pixels on a side for zoom values between 1.1042 and 1.119, leading to blocks that vary from 0.9938" to 1.0062" in width. This is one of the reasons that a "substantially" consistent watermark scale is referenced across different zoom values, instead of an absolutely constant watermark block size.

Returning to FIG. 43B, it will be seen that the variable ratio is defined differently if the JavaScript is running on Microsoft's Internet Explorer (IE) browser. In this case, ratio is defined as the ratio of screen.logicalXDPI to screen.deviceXDPI. This approach is required due to a variant meaning given to window.outerWidth by IE; Microsoft's XDPI properties provide a work-around.

Continuing with FIG. 43B, the JavaScript instructions next define the variable size as the product of the earlier-referenced desiredTileWidth, and the just-discussed ratio. For example, the variable size has a value of 80 in the just-discussed example.

Continuing, the variable styleString is defined as the concatenation of the variable size (i.e., 80) with the text "px" concatenated again with size and the text "px." So in the example just given, this variable styleString has a value "80px".

Finally, the last line in FIG. 43B assigns this just-discussed string to wmDiv.style.backgroundSize.

FIG. 43C shows HTML that implements the just-discussed redraw( ) function.

These instructions begin by calling the redraw( ) function whenever an onresize event is detected. (This occurs whenever the browser window is resized.) So whenever the window is resized, the redraw( ) function computes the pixel dimensions of the watermark block, ensuring that it presents at a substantially consistent scale on the display.

Likewise, the FIG. 43C code calls the redraw( ) function on detection of an onload event (i.e., when a web page finishes loading). Thus, when a new web page is displayed, the JavaScript code will be called to establish the correct size of the watermark blocks.

The FIG. 43C code also establishes that these actions are to apply to the div identified by the ID "wm1."

Again, the code of FIGS. 43A-43C is employed in connection with the template used to present the blog page of FIG. 42A. The wm1 div corresponds to the blog entry 65, so this code serves to define and size the watermark blocks of background pattern 66. (Similar code effects similar functionality for the div that spans the body of the blog, including watermark background pattern 68.)

The just-discussed code is exemplary. The same or similar functionality can be implemented in a number of different manners (including, e.g., JQuery, Oracle Java, and Adobe Flash software), so this example code should in no way be regarded as limiting.

By an arrangement like that just-described, a user can select a template that includes associated watermarking instructions, to thereby yield a web page with watermark-based functionality—without any effort or expertise concerning digital watermarking.

(For use with the Firefox browser, the CSS instructions of FIG. 45 are employed. These instructions employ Mozilla's "dppx." This unit represents the number of dots per px unit. Due to the 1:96 fixed ratio of CSS in to CSS px, 1 dppx is equivalent to 96 dpi, which corresponds to the default resolution of images displayed in CSS as defined by image-resolution.)

FIG. 46 gives a basic overview of certain linking aspects of the present technology. A first user with a smartphone 91' captures an image of content 92' presented on a screen of a second user. In this example, the content is imagery of the Goat Rocks Wilderness from the web site of the Pacific Crest Trail Association (PCTA), displayed in a Google Chrome browser window. The code served from the web site, or code in the browser, scales watermark blocks based on the display size (e.g., as discussed in connection with FIGS. 43A-43C). CSS instructions cause the watermark blocks to be overlaid on the PCTA imagery as a translucent "div," as depicted in connection with FIGS. 41A and 41B.

App software in the smartphone 91' processes the captured imagery and extracts the payload encoded by the digital watermark pattern. In the present case, the payload is the hex string 2A34A.

The smartphone wirelessly transmits the payload data, and it is received by a remote server computer 93'. The server includes database software, here depicted as a table 94, which associates different watermark payloads with different URLs. The 2A34A watermark payload decoded by the smartphone 91' resolves, through the table, to a URL at Google Maps—detailing the area in the Goat Rocks Wilderness depicted by the captured image. This URL is sent back to the first user's smartphone 91', where that Google Maps content is presented by the browser on the smartphone.

Naturally, the watermark payload can link to any URL (or other code or metadata). In many implementations, the URL will point to the content originally captured by the smartphone camera from the second user's screen, e.g., the photo 92' depicting the Goat Rocks Wilderness.

In some applications, several URLs can be associated with a single payload in the table 94. A menu can then be presented on the smartphone screen detailing the different link choices, any of which the user may choose (e.g., a link to the original image 92', a link to the Google Maps page for the Goat Rocks Wilderness, a link to the Wikipedia page for the Goat Rocks Wilderness, etc.). Alternatively, stored rule data (either at the server 93', or in the smartphone 91') can be applied to automatically select between the available links.

In many implementations, the link returned to the smartphone will be determined in part based on context, such as information about the user. So a retired pensioner in Europe, capturing an image of the Goat Rocks Wilderness from another user's screen, will be routed to a different URL (e.g., the Wikipedia page) than a college student in Yakima, Wash. (who may receive, e.g., driving directions for the 20 mile trip).

Similarly, if a college student in Atlanta navigates to a web site for the Florida Department of Tourism, the web page may be dynamically CSS-marked with a watermark payload corresponding to an advertisement for Spring Break beachfront hotel packages. In contrast, if a 70 year from Atlanta navigates to the same web site, the page may be dynamically marked with a watermark payload leading to promotions for golfing packages.

In some embodiments, the watermark payload extracted from the content 92' may lead to presentation of several items of content on smartphone 91'. For example, the original image 92' may be depicted together with a bottom border that contains one or more watermarks that link to auxiliary content on the receiving smartphone, such as the noted map and Wikipedia pages, which the user can then choose between. Alternatively, the border may contain a banner ad for the backpack depicted in the image (e.g., which watermark-links to a corresponding page on the web site of The North Face outfitter).

As is familiar, ad placement on web pages is commonly performed by so-called "Supply Side Platforms"—software tools that discern information about a user who visits a web page (typically through use of cookie data), and determine which ad should fill an ad slot available in the web page delivered for that user's visit. In many instances, the software conducts a quick online auction to identify the vendor willing to pay the most. Such technology is familiar from the Google AdWord service. The AdWord service selects an advertisement for presentation with Google search results, based on the user context (e.g., demographic information and browsing history), and on the user's search query. Related ad serving technology is further detailed in published application 20140164111, and is likewise suited for use with the present technology.

In the arrangements just discussed, the data structure 94 may associate several different items of auxiliary content with a single watermark payload (and, e.g., the server or the smartphone can select between them based on rules and/or context information).

In another arrangement, the watermark blocks presented with content 92' can adapt to context, and convey different payloads. For example, the CSS instructions in FIG. 43A can select among different watermark blocks that should be presented with the content, based on data available to the system on which the content is being presented. To give a simple example, code on the device originally presenting the content 92' can query its operating system to provide the IP address of the device on which the content is presented. Using known techniques, the IP address typically allows the location of the device (e.g., metro Seattle), and the internet service provider (e.g., Comcast), to be identified. The content 92' can be presented with a watermark that is a function not only of the content, but also of the location and the ISP. (Indeed, in some instances, resolution of the watermark using database 94 may identify the location and ISP.)

Similarly, any context information discernable by the device can be used in selecting the watermark payload that should be presented. (Again, rule data can naturally be employed.)

Additional information about the retrieving and using links (and other metadata) based on watermark payloads extracted from content, is detailed in U.S. Pat. No. 8,364,720.

More on Blogs

WordPress charges a monthly fee to users who want enhanced blogging services. In a previous online marketing paradigm, this cost might have been reduced, or waived, if a user agreed to allow banner ad presentation with their blog. In accordance with another aspect of the present technology, such discount is provided to the user without presentation of banner advertising on the user's blog site. Instead, the blog is marked with a steganographic watermark that conveys a link to advertising material.

In such an arrangement, the hosting service (e.g., WordPress) alerts candidate advertisers to different blog pages, identifying the traffic each is drawing (including cookie data, where available), and keywords about the content displayed on the blog. If one blog page has a blogger's tribute to Jimmy Choo boots, and is found to be drawing a large viewership of 18-30 year old women, this information can be relayed (e.g., using known ad serving arrangements) to candidate advertisers. Nordstrom may offer a nickel for each viewer impression; Zappos Shoes may offer a dime. WordPress sells the rights to Zappos, and serves the blog page with code that causes a watermark to be presented. WordPress enters data in the database 94 causing this watermark to link code that both displays the blog content, and also presents a Zappos promotion for Jimmy Choo boots. Whenever any user captures an image of the blog with their smartphone, the smartphone app loads content from the blog and presents it on the smartphone, together with the Zappos promotion. Each time such a watermark is resolved by the database, Zappos pays WordPress a dime. (Or each time the Zappos promotion is served and displayed by the viewer's smartphone, Zappos pays a dime.)

In another arrangement, watermark-based linking is another enhanced feature for which the blogging service can charge a user. For example, a blogger may post images and travelogue text relating to a recent trip to Italy, but may want to provide a richer content experience than the blogger has time to author. In such case, the blogger may pay a fee, in exchange for which an automated ghostwriter algorithm spices up the blog by defining watermark-based hyperlinks for the user's content. For example, if the blogger posted a picture of a calamari dish enjoyed at a Venice restaurant, the ghostwriter may link such picture to the web site for the restaurant, or its online menu, by data entered in a database 94 in association with the watermark payload for that picture.

Display-Device Pairing

Display devices are becoming ubiquitous, and a great number are found in public spaces. Smartphones and wearables are highly capable computers, but one of their drawbacks is their small display size.

In accordance with another aspect of the technology, a user with a camera-equipped device (and optionally an external keyboard, such as a Bluetooth keyboard) captures an image of a public display screen. The software code that is controlling the screen applies a watermark pattern to whatever information is on the display, using the techniques detailed herein. This watermark pattern resolves, such as through a database 94, into an IP address to which the device can transmit data for display on the screen.

Library carrels at universities, for example, can be equipped with such display devices. A student may sit down and, using a smartphone camera, wirelessly pair the smartphone to the display. With an accessory keyboard the student can have the functionality of a desktop computer, but without the weight, and without fussing with cables. Moreover, the student's information (cookies, etc.) is not shared with the display or its associated processor; only the data needed for display is transmitted from the smartphone device.

Such pairing can alternatively be achieved through other data signaling technologies, including audio (such as an ultrasonic data signal or a low amplitude noise signal encoding the data), barcode, RFID/NFC, etc. Each can convey a payload that resolves—through a database—to an IP address to which display data for that screen device can be sent.

By such arrangements, a small device can easily cast its output to any display screen, increasing the utility of the former, and the use of the latter.

Other Arrangements

A further use of the present technology is for play-out monitoring, e.g., to confirm that correct content is playing on correct public displays at correct times.

Consider an airport, which may have plural electronic advertising signboards positioned along a concourse walkway. A ceiling-mounted surveillance camera with a wide angle lens may capture imagery from one or more of the signs. The location of the camera, and each of the signs, is known.

Rather than watermarking, at the time of content creation, each item of HTML advertising content that is to be displayed on such a screen, and hoping that the encoded watermark scale permits reading from a surveillance camera viewing that screen, the present technology can be employed. That is, the advertising can be created without regard to watermarking, but at the time of rendering, a watermark is applied. And the tile size for the displayed watermark (as well as its payload) can be established based on the screen's location.

Imagery captured by a surveillance camera can be analyzed to determine what content was presented on each sign at different times. Image fingerprinting techniques can be employed to identify the content (with the watermark simply indicating the screen from which the imagery was captured). Alternatively, the watermark selected for inclusion at rendering may serve to uniquely identify the content. (For example, the HTML instructions, or a particular tag therein (e.g., "<TITLE>"), can be hashed to generate an identifier that uniquely identifies that content. This identifier can index a data structure, which identifies a corresponding watermark tile that should be selected for inclusion in the rendered output. When that watermark is later detected, the same data structure can be consulted to determine the content hash, and thereby identify the content.)

The camera-captured imagery can be processed to effect some gross geometric correction (e.g., warping the imagery so that the rectangular screen is presented with approximately its correct aspect ratio, rather than with a perspective-skewed shape), before watermark decoding (and optionally finger-based content identification) is performed.

In some embodiments, each screen and camera is equipped with location-determining technology (e.g., GPS), so that each screen can automatically select an appropriate watermark scale based on a computed distance to the nearest camera (and on its own display dimensions).

Relatedly, the ability of the present technology to present a watermark readable from a particular distance allows beamforming-like applications, with different watermarks targeted to be decodable by viewers at different positions relative to a screen.

A simple example is a Times Square billboard that is programmed to splash different payloads to viewers at different distances—each yielding a different payoff. For viewers near such a sign, on one side of a street, the operator may provide watermark-triggered coupons to stores on that side of the street. For viewers remote from the sign—across the street, the operator may provide coupons to stores on that opposite side of the street.

Moreover, the code of FIGS. 43A-43C can be modified so that the width and height of the watermark tiles are separately modified, unequally. This allows the watermark to be pre-distorted, to compensate for distortion from off-axis viewpoints (i.e., viewpoints off the axis extending perpendicularly from the center of the screen). That is, a tile can be pre-distorted into a non-square shape such that, when viewed from an intended viewer's viewpoint, each tile appears square and of identical size.

A proprietary browser (or WebGL, such as used in Google Maps) can thus render a display in which the watermark tiles target (i.e., are decodable) by differently-located viewers at different times (e.g., each refresh of the screen targets a different viewing location, even if the underlying imagery is static).

(Related technology is detailed in applicant's U.S. Pat. No. 8,412,577, which describes how electronic billboards and other public displays can be operated to cyclically present watermarks at different scales, to facilitate detection by camera-equipped smartphones at different viewpoints.)

In some such embodiments, data can be passed to the FIG. 43B (or other) software, detailing parameters such as the viewing distance, optical parameters of a viewing camera (e.g., zoom, angular field of view, sensor dimensions in pixels, etc.), off-axis viewpoint angles (e.g., azimuth and elevation). The watermark tiles added during rendering can then be tailored in accordance with such information.

Another use of the present technology is at retailers of televisions and other screen-based devices. A Best Buy store may have dozens of televisions on display. The manager may periodically move televisions as new ones become available and older ones are discontinued.

Retailers are increasingly using in-store cameras to monitor customer traffic, and dwell times of customers at different locations within a store—generating heat map data to identify which products are getting the most attention. This heat map information is of limited information if it is uncertain what products are presently at positions where customers are dwelling.

Certain embodiments of the present technology overcome this uncertainty. Each television can present a different watermark overlay signal on the demo TV imagery, using the technology detailed herein. The scale of the watermark is tailored, e.g., based on the display size. The traffic analysis cameras (or other cameras) capture imagery including the presented watermarks. Watermarks are decoded from this imagery, and serve to identify the different televisions at different positions in the store (e.g., the 60 inch Samsung UN60H6350 TV is here, the 32 inch Vizio E320AR TV is there, etc.). Customer heat map data can then be related accurately to the products that draw customer attention.

Still more applications arise as wearable computers proliferate. Consider a customer in Best Buy wearing the Google Glass computer, or other such camera-equipped headworn device. Each screen the customer encounters may be overlaid with a different watermark, which is decoded by the wearable computer and stored in association with a time-stamp. (Watermarks decoded from printed signage, product packaging, etc., can be handled similarly.) These decoded watermarks serve as waypoints detailing the customer's path through the store, and dwell time at different points. (In a sense, the log of sensed watermark information serves like a cache of web cookies—detailing a user's visits to particular locations.) The customer may be incented (by coupons or otherwise) to share this log of waypoints with Best Buy. Or a competing retailer may make the customer a better offer to share this same information. (The same arrangement can be practiced with information about sensed audio watermarks or ultrasonic audio, where different watermark payloads/ultrasonic audio are used at different locations in a store.)

Wearable computers (such as Glass) are commonly equipped with position and motion sensors, such as GPS, and 3D-magnetometers, -gyroscopes, and -accelerometer sensors. If the position of an electronic screen is known (e.g., latitude/longitude and compass direction it faces), and the same information is known for the camera of the wearable computer, then also known is the relative geometry, which defines the perspective with which the camera views the screen, and establishes the resulting distortion of the view. The wearable can transmit its position information (e.g., by Bluetooth, shortrange ultrasonic audio, etc.), and the store can use this information in changing the geometric presentation (e.g., the scale and affine pre-distortion) of the watermark on screens within the camera's view. Additionally, or alternatively, the store can similarly transmit a screen's position information, and the wearable can use this information in de-warping imagery captured by the camera so that watermark information can be more easily decoded therefrom.

Still further, a store system with a fixed camera (e.g., on the ceiling) can use image classification techniques to determine whether a shopper depicted in the camera's imagery is or is not wearing a headworn computer. If the shopper is wearing such an apparatus, imagery from the fixed camera can be analyzed to estimate the position and orientation of the headworn computer (substituting for information transmitted from the wearable, in the preceding paragraph). Watermarks in displays within 20 feet of the shopper can then be properly pre-distorted for decoding by the shopper. (The perceptible image can also be pre-distorted in this fashion, yielding something akin to a "forced perspective" display—providing an illusion that the viewer is looking at the screen's presented artwork head-on, instead of from an oblique perspective.)

While the focus of this disclosure has been on screen displays, principles thereof are also applicable to projected displays.

Projected displays are familiar from the Kinect home gaming system, where they are used to perform 3D sensing and gesture detection. Applicant believes they also have utility in retail stores, e.g., where they can project information for reading onto store products and shelves.

The Kinect system is a form of structured light scanner, using a random-looking array of infrared projected dots. In accordance with the present technology, the projected pattern (which may be infrared, or not) encodes payload information. Different payloads can be encoded in different spatial regions of the projected field. Watermark, barcode, or other forms of machine-readable data encoding can be employed.

These payloads can correspond to different products, and the locations to which these payloads are projected may indicate where different products should be shelved. Cheerios cereal should be found in these locations; Wheaties cereal should be found in those locations; etc. Store "planograms" commonly are used to specify what products (typically identified by their respective "SKU"s) should be shelved where. Planogram data can serve as the input from which the project pattern is derived, with each differently-encoded region corresponding to a different SKU.

The projected patterns can be sensed by a smartphone or other camera-equipped device conveyed by a store clerk, and used in stocking the store shelves. While the projector may form part of the camera unit carried by store clerk (with the projected pattern dynamically updated based on sensed location of the device), the projector may more often be fixedly mounted to the store infrastructure, such as mounted on the ceiling or to a shelf. In this case, the pattern may be pre-distorted (i.e., before projection) so that it has an intended, undistorted appearance when viewed from the surface on which it is expected to be projected, using a camera with an expected viewpoint. That viewpoint may be looking horizontally at a store shelf, from the same elevation as the shelf. Or it may be looking at the shelf (up or down, depending on shelf height) from an elevation of 40 inches. Etc. (FIG. 47 shows what happens when a uniform grid of dots is projected onto a surface (in this case curved), and viewed from a different angle—without such pre-distortion. Reversing the role of camera and projector, FIG. 47 may also be viewed as a pre-distorted pattern that—if viewed from the other angle, would appear as a uniform grid of dots.)

In a particular embodiment, different pre-distortions are cyclically applied (e.g., by suitable WebGL browser instructions that have knowledge about the shape and location of the shelving), to permit reading of the projected SKU information from different viewpoints. As planogram information is revised, the projected pattern—derived from the planogram—is similarly revised.

In checking stocked shelves for compliance with a planogram, some implementations do not require the store clerk to judge if a product is out of place. Instead, camera data from which the SKU placement information is discerned can also be applied to an image recognition engine (e.g., based on image fingerprinting and stored reference data) to identify what product is actually found in a given region of a captured image frame. Or the product may be identified by decoding a steganographic digital watermark from its packaging. If the identified product does not match the corresponding projected SKU information, the mis-placed product can be flagged. (E.g., a flashing red rectangle may be overlaid around the depiction of the mis-placed product on the device display, in augmented reality fashion, and/or an audible alert may be sounded to draw the clerk's attention to a shelving error.)

In some embodiments, the task of checking compliance with store planogram information is performed by a camera-equipped robot that traverses store aisles at night. Its computer compiles a hit list of items needing correction, which can later be attended to by a store clerk.

(Additional information about projectors in retail stores is detailed in applicant's published application 20140052555.)

Concluding Remarks

Having described and illustrated the principles of our inventive work with reference to illustrative examples, it will be recognized that the technology is not so limited.

For example, while the detailed embodiments focused on presentation of HTML pages, applicant's inventive work can be applied to any electronic information (including games, videos, text, images, etc.), displayed in any manner.

Moreover, while the detailed embodiments focused on reading watermark information from displayed content using a camera-equipped device, the same principles can likewise be applied to decoding watermarked data directly from the digital content—without any need for image capture.

Certain of the examples given above employed a flat grey watermark pattern. This is suitable for many embodiments. However, in others, it is desirable to adapt the strength (e.g., RMS amplitude) of the watermark signal based on features of the underlying image content, to reduce watermark visibility.

Consider an image that includes grass in the foreground, and sky above. Since the grass imagery is highly random, the randomness introduced by the watermark signal will not be noticed; a very strong watermark can be applied in that area. In contrast, a strong watermark should not be applied to the sky, lest the randomness of the watermark be conspicuous in the normally-flat texture of the sky.

In some embodiments of the technology, the watermark pattern accessed by the URL in FIG. 43A can be tailored based on the image with which it is to be presented, to adapt its strength based on the data hiding capacity of the image. The FIG. 43A-43C code can be arranged to access a stored spatial mask that defines the strength at which the watermark should be applied at different local regions of the image. Masks of different scales can be obtained, based on the size of the presented content.

Instead of (or in addition to) locally adapting the strength of the watermark to the host imagery, the chrominance of the watermark can be adapted so as to better hide within such content. Again, plural such watermark patterns can be pre-computed, based on different scale factors, and a scale-appropriate one can be selected based on the scale of the associated content.

More information about adaptation of an image watermark based on the underlying host image content is provided in the watermarking references cited herein.

In some implementations, CSS code can fetch plural different watermark blocks—each encoding the same payload, but at different scales. These can be cached in the local device, and switched-between, e.g. as the content is zoomed, or the display window is re-sized.

Although the technology has frequently been described as maintaining a substantially consistent watermark block scale, this is not essential. Since watermark readers are commonly robust over a finite variety of scale states, a relatively few watermark blocks of different scales can enable linking over a large range of display scales. For example, one watermark block scale may be used for zoom values between 20% and 35%; a second for values between 35% and 60%; a third between 60% and 100%; a fourth between 100% and 170%; and a fifth between 170% and 290%.

In some embodiments, the instructions (e.g., of FIGS. 43A-43C) can specify what payload should be encoded in the watermark block. Such a parameter can be passed, e.g., by the CSS instructions to a remote server. The server can then create a watermark block which encodes the specified payload on the fly, and return it (or its URL, etc.) to the calling CSS code (at the requested scale).

As suggested, the watermark payload (or metadata with which it is associated in a data structure) can be of numerous types. Such information can be arbitrary, or identify the user, or user demographic information, or the user's hardware, or the content being viewed, or auxiliary content related to the viewed content, or the date/time, or location (latitude, longitude, elevation), and/or compass orientation of the screen, etc., etc.

Artisans will recognize that different displays have different densities of pixels-per-inch. Early Apple products used 72 ppi (to correspond with the "point" system of typesetters). Recent Retina displays by Apple employ PPIs of between 220 PPI (for the MacBook Pro) up to 326 (for the smallest devices, such as iPhones). A watermark block that is one inch wide, when rendered on an early Apple display, will render at less than a fourth of this size on an iPhone, due to the smaller physical size of pixels in the latter screen. Many devices and software cope with this variability by assuming that the display has 96 pixels per inch, for purposes of compatibility. Interpolation can be used to fill pixels between these 96 PPI locations.

While functions window.innerWidth, window.outerWidth, window.innerHeight, and window.outerHeight, were particularly mentioned, the present technology can use other functions, including document.body.clientWidth and window.screen.availWidth.

Moreover, various hacks can be employed to determine the physical pixel density of the display device (e.g., requesting the user to zoom a reference image of known pixel dimensions until it fills the width of a browser window, and then using the window.innerWidth and window.outerWidth functions to deduce the physical pixel width). Alternately, various smartphone operating systems and software development kits make available methods that can be used to query the current device for the scale at which it displays content, for its width and height in pixels, etc. Still other such functions can be used in objective C, Java, etc. By such arrangements, the scale of watermark blocks can be maintained substantially consistent, across display devices having diverse pixel densities, and across different hardware/software environments.

Principles of the present technology can be applied in situations that make no use of watermarking. For example, a pattern that serves as a background for a web page can be identified by fingerprinting, e.g., using SIFT points. A data structure can again correlate different background patterns to different content, such as URLs and advertising. (The scale of such a pattern can be maintained at a fixed size, irrespective of the scale of the primary content, although this may be less important with fingerprinting.)

The displayed content need not be presented for viewing on an electronic screen. For example, it can be projected onto a passive surface. Similarly, while repeated reference was made to web pages, it will be recognized that such pages needn't be delivered over the internet.

Moreover, principles of this technology can be applied in connection with content rendered in a non-electronic form, such as printed on paper. Constructs analogous to the W3C structures exist for print rendering, e.g., the PostScript page description language, and can be employed in similar fashion. (Applicant's U.S. Pat. Nos. 6,899,475 and 7,142,691 also concern watermarking using page description languages.)

While FIG. 46 shows a simple lookup table as the database 94, more elaborate data structures will likely be used in actual practice. This may include federated databases—employing information stored at different locations by different parties.

The artisan will recognize that translucency is supported by the RGBA form of image data, where the "A" channel (alpha) indicates the degree of opacity with which such imagery is to be applied to the display device.

Although reference was made to app software on a smartphone as performing certain of the detailed functionality, it will be recognized that these functions can naturally be performed otherwise—including by operating system software on a smartphone, by smartphone hardware, by a server (e.g., at a social networking service), by another smartphone or computer device, by dedicated hardware, distributed between such devices, etc.

While reference has been made to smartphones, it will be recognized that this technology finds utility with all manner of devices—both portable and fixed. Tablets, laptop computers, digital cameras, wrist- and head-mounted systems and other wearable devices, servers, etc., can all make use of the principles detailed herein. (The term "smartphone" should be construed herein to encompass all such devices, even those that are not telephones.)

Particularly contemplated smartphones include the Apple iPhone 6; smartphones following Google's Android specification (e.g., the Galaxy S4 phone, manufactured by Samsung, and the Google Moto X phone, made by Motorola), and Windows 8 mobile phones (e.g., the Nokia Lumia 1020, which features a 41 megapixel camera).

Details of the Apple iPhone, including its touch interface, are provided in Apple's published patent application 20080174570.

The design of smartphones and other computers employed in embodiments of the present technology is familiar to the artisan. In general terms, each includes one or more processors, one or more memories (e.g. RAM), storage (e.g., a disk or flash memory), a user interface (which may include, e.g., a keypad, a TFT LCD or OLED display screen, touch or other gesture sensors, a camera or other optical sensor, a compass sensor, a 3D magnetometer, a 3-axis accelerometer, a 3-axis gyroscope, one or more microphones, etc., together with software instructions for providing a graphical user interface), interconnections between these elements (e.g., buses), and an interface for communicating with other devices (which may be wireless, such as GSM, 3G, 4G, CDMA, WiFi, WiMax, Zigbee or Bluetooth, and/or wired, such as through an Ethernet local area network, etc.).

The processes and system components detailed in this specification can be implemented as instructions for computing devices, including general purpose processor instructions for a variety of programmable processors, such as microprocessors (e.g., the Intel Atom, the ARM A5, the Qualcomm Snapdragon, and the nVidia Tegra 4; the latter includes a CPU, a GPU, and nVidia's Chimera computational photography architecture), graphics processing units (GPUs, such as the nVidia Tegra APX 2600, and the Adreno 330—part of the Qualcomm Snapdragon processor), and digital signal processors (e.g., the Texas Instruments TMS320 and OMAP series devices), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules"

or "components" should be understood to refer to functionality, rather than requiring a particular form of implementation.

Software instructions for implementing the detailed functionality can be authored by artisans without undue experimentation from the descriptions provided herein, e.g., written in C, C++, Visual Basic, Java, Python, Tcl, Perl, Scheme, Ruby, JavaScript, HTML5, etc., in conjunction with associated data. Smartphones and other devices according to certain implementations of the present technology can include software modules for performing the different functions and acts.

Known browser software, communications software, imaging software, and media processing software can be adapted for use in implementing the present technology.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. For example, in a system in which a smartphone communicates with a computer at a remote location, different tasks can be performed exclusively by one device or the other, or execution can be distributed between the devices. Extraction of watermark information from imagery is one example of a process that can be distributed in such fashion. Thus, it should be understood that description of an operation as being performed by a particular device (e.g., a smartphone) is not limiting but exemplary; performance of the operation by another device (e.g., a remote server), or shared between devices, is also expressly contemplated.

In like fashion, description of data being stored on a particular device is also exemplary; data can be stored anywhere: local device, remote device, in the cloud (on a remote server), distributed, etc.

As noted, the present technology can be used in connection with wearable computing systems, including headworn devices. Such devices typically include one or more sensors (e.g., microphone(s), camera(s), accelerometers(s), etc.), and display technology by which computer information can be viewed by the user—either overlaid on the scene in front of the user (sometimes termed augmented reality), or blocking that scene (sometimes termed virtual reality), or simply in the user's peripheral vision. A headworn device may further include sensors for detecting electrical or magnetic activity from or near the face and scalp, such as EEG and EMG, and myoelectric signals—sometimes termed Brain Computer Interfaces, or BCIs. (A simple example of a BCI is the Mindwave Mobile product by NeuroSky, Inc.) Exemplary wearable technology is detailed in patent documents U.S. Pat. No. 7,397,607, 20100045869, 20090322671, 20090244097 and 20050195128. Commercial offerings, in addition to the Google Glass product, include the Vuzix Smart Glasses M100, Wrap 1200DX, and Star 1200XL systems. An upcoming alternative is augmented reality contact lenses. Such technology is detailed, e.g., in patent document 20090189830 and in Parviz, Augmented Reality in a Contact Lens, IEEE Spectrum, September, 2009. Some or all such devices may communicate, e.g., wirelessly, with other computing devices (carried by the user or otherwise), or they can include self-contained processing capability. Likewise, they may incorporate other features known from existing smart phones and patent documents, including electronic compass, accelerometers, gyroscopes, camera(s), projector(s), GPS, etc.

The artisan is presumed to be familiar with the web authoring constructs employed in the illustrative examples of the present technology, including CSS, JavaScript, HTML5, and other W3C standards.

References were made to context. The artisan will understand that context refers to any information useful in characterizing the situation of an entity (an entity being a person, place or object that is considered relevant to an interaction between a user and an application, including the user and application themselves).

Context information can be of many sorts, including computing context (network connectivity, resource availability, processor type, CPU contention, etc.), user context (user profile, location, actions, preferences, nearby friends, social network(s) and situation, etc.), physical context (e.g., lighting, noise level, traffic, sensed sounds, recognized speech, etc.), temporal context (time of day, day, month, season, etc.), history of the above, etc.

Another taxonomy of context progresses from simple and concrete, to complex and abstract, starting with location, then physical context (as determined by sensors, e.g., device orientation and motion, temperature, infrared, video, 3D ambient audio, ultrasonic, humidity, gases and other chemical), then user or device actions (e.g., writing, talking, reading, searching, navigating, pointing), then proximities (e.g., to people, vehicles, buildings, perimeters, jurisdictions, other devices), then somatic (e.g., live datastreams of biometric information), then data feeds (e.g., subscriptions and RSS feeds, social network follows, alerts and updates), then emergent live data (e.g., from external sources, such as calls, text, email, weather forecasts), and finally n-dimensional context history—encompassing some or all of the foregoing.

Context arrangements suitable for use with the present technology are further detailed in the documents incorporated by reference.

The techniques of digital watermarking are presumed to be familiar to the artisan. Examples are detailed in documents identified above, as well as in patent documents U.S. Pat. Nos. 6,614,914, 6,122,403, 20100150434, 20110274310 and 20140052555. Such watermarks are commonly imperceptible, meaning they are not noticeable to a viewer examining watermarked content under typical viewing conditions (e.g., office lighting, at a distance of 20 inches).

In addition to the documents identified above, applicant's other work that is relevant to the present technology includes that detailed in pending patent application Ser. No. 14/244,287, filed Apr. 3, 2014 (published as 20150286873), 62/044,736, filed Sep. 2, 2014, and published patents and applications U.S. Pat. No. 8,516,533, 20120218444, 20120046071, 20130311329, 20130314541, 20120284012 and 20140106710.

This specification has discussed several different embodiments. It should be understood that the methods, elements and concepts detailed in connection with one embodiment can be combined with the methods, elements and concepts detailed in connection with other embodiments. While some such arrangements have been particularly described, many have not, due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the statutory requirement of conciseness, applicant incorporates-by-reference each of the documents referenced herein. (Such materials are incorporated in their entireties, even if cited above in connection with specific of their teachings.) These references disclose technologies and teachings that can be incorporated into the arrangements detailed herein, and into which the technologies and teachings detailed herein can be incorporated. The reader is presumed to be familiar with such prior work.

The invention claimed is:

1. A method comprising the acts:
using a camera of a first, portable, computer device, capturing imagery depicting a screen of a second computer device, said screen of the second computer device presenting a first web page of a first party's web site, the screen of the second computer device presenting an on-screen portion of said first web page, but another portion of said first web page being off-screen, wherein the imagery captured by the camera of the first computer device depicts none of the off-screen portion of the web page;
performing optical character recognition on said imagery captured from the on-screen portion of the web page, to extract text therefrom;
conducting a keyword search on said web site of said first party, using said extracted text as keywords, to identify a counterpart web page;
fetching, on a computer device different than said second computer device, the counterpart web page identified in said keyword search;
parsing HTML included in said fetched counterpart web page to obtain text therefrom, said obtained text including text from the off-screen portion of the first web page;
conducting a search, based at least in part on said text from the off-screen portion of the first web page; and
presenting results of said search on a screen of the first, portable, computer device;
wherein a search function that was originally based on text from a web page visible to a portable device camera, is enhanced through use of text from said web page that is not visible to said portable device camera.

2. The method of claim 1 in which the counterpart web page is the same as the first web page.

3. The method of claim 1 in which the counterpart web page is different than the first web page.

4. The method of claim 1 in which said act of fetching comprises fetching on said first, portable, computer device.

5. The method of claim 1 in which said act of fetching comprises fetching on a computer device different from said first, portable, computer device.

6. The method of claim 1 wherein:
the first web page promotes online sale of a product;
the second web page also promotes online sale of said product;
the obtained text includes first metadata;
said act of conducting a search comprises identifying, from a different party's web site, second metadata corresponding to said product, said second metadata including a price, and stock availability information, for said product at a bricks and mortar store of the different party; and
said act of presenting results includes presenting at least some of said second metadata on a screen of the first, portable, computer device;
wherein the portable computer device captures imagery of a web page detailing price and availability of said product from a first party that is offering to sell the product online, and in response, delivers information detailing price and availability of said product from a different party that is offering to sell the product in a bricks and mortar store.

7. The method of claim 6 in which said identifying comprises searching the different party's web site, using said first metadata, to identify a web page corresponding to said product, and obtaining the second metadata from said identified web page of the different party's web site.

8. The method of claim 6 that further includes comparing text extracted from said optical character recognition with elements of the first metadata, to help confirm that the web page identified through said keyword search corresponds to said first web page of the first party.

9. The method of claim 8 that further includes comparing elements of the first metadata with elements of the second metadata, to help confirm that the second metadata corresponds to the product promoted for online sale by the first party.

10. The method of claim 6 that further includes comparing elements of the first metadata with elements of the second metadata, to help confirm that the second metadata corresponds to the product promoted for online sale by the first party.

11. A non-transitory computer readable medium, containing computer instructions for configuring a computer system to perform a search based on imagery captured by a camera of a first portable computer device, which imagery depicts a screen of a second computer device that is presenting a first web page of a first party's web site, the screen of the second computer device presenting an on-screen portion of said first web page, but another portion of said first web page being off-screen, wherein the captured imagery depicts none of the off-screen portion of the web page, said computer instructions configuring the computer system to perform acts including:
  instituting a keyword search on said web site of said first party, using text extracted from depiction of the on-screen portion of the first web page in the captured imagery, to identify a counterpart web page;
  fetching, on a computer device different than said second computer device, the counterpart web page identified in said keyword search;
  parsing HTML included in said fetched counterpart web page to obtain text therefrom, said obtained text including text from the off-screen portion of the first web page;
  instituting a second search, based at least in part on said text from the off-screen portion of the first web page; and
  sending results based on said second search to the first, portable, computer device, for presentation on a screen thereof;
  wherein the computer instructions enhance a search function that was initiated using text from a web page visible to a portable device camera, to also make use of text from said web page that is not visible to said portable device camera.

12. A system for performing a search based on imagery captured by a camera of a first portable computer device, which imagery depicts a screen of a second computer device that is presenting a first web page of a first party's web site, the screen of the second computer device presenting an on-screen portion of said first web page, but another portion of said first web page being off-screen, wherein the captured imagery depicts none of the off-screen portion of the web page, the system comprising:
  first means, responsive to text recognized from the depicted on-screen portion of the first web page, for determining text from the off-screen portion of the first web page; and
  second means, for providing result information to the first device, based in part on said determined text from the off-screen portion of the web page.

* * * * *